United States Patent [19]

Bickel

[11] Patent Number: 5,263,120

[45] Date of Patent: Nov. 16, 1993

[54] ADAPTIVE FAST FUZZY CLUSTERING SYSTEM

[76] Inventor: Michael A. Bickel, R.R. 1, Box 1005, Dickinson, Tex. 77539

[21] Appl. No.: 692,735

[22] Filed: Apr. 29, 1991

[51] Int. Cl.$^5$ .............................................. G06F 15/18
[52] U.S. Cl. .......................................... 395/11; 395/2; 395/10
[58] Field of Search .......................... 395/10, 11, 2, 900

[56] References Cited

U.S. PATENT DOCUMENTS

| | | | |
|---|---|---|---|
| 4,326,259 | 4/1982 | Cooper et al. | 395/24 |
| 4,805,219 | 2/1989 | Baker et al. | 395/2 |
| 4,945,494 | 7/1990 | Penz et al. | 395/23 |
| 4,982,340 | 1/1991 | Oyanagi et al. | 395/11 |
| 5,027,408 | 6/1991 | Kroeker et al. | 395/2 |
| 5,179,624 | 1/1993 | Amano et al. | 395/11 |

OTHER PUBLICATIONS

Kahle et al, "The Connection Machine Model CM1 Architecture", IEEE Trans. on Systems, Man and Cybernetics, v. 19, N. 4 Jul./Aug. 1989.

Primary Examiner—Allen R. MacDonald
Assistant Examiner—George Davis
Attorney, Agent, or Firm—Harrison & Egbert

[57] ABSTRACT

A parallel processing computer system for clustering data points in continuous feature space by adaptively separating classes of patterns. The preferred embodiment for this massively parallel system includes preferably one computer processor per feature and requires a single a priori assumption of central tendency in the distributions defining the pattern classes. It advantageously exploits the presence of noise inherent in the data gathering to not only classify data points into clusters, but also measure the certainty of the classification for each data point, thereby identifying outliers and spurious data points. The system taught by the present invention is based upon the gaps between successive data values within single features. This single feature discrimination aspect is achieved by applying a minimax comparison involving gap lengths and locations of the largest and smallest gaps. Clustering may be performed in near-real-time on huge data spaces having unlimited numbers of features.

14 Claims, 38 Drawing Sheets

FFC INPUT DESIGN DETAIL
TASKS, SUBROUTINES and DATA SETS

FFC PROCESS LOOP DESIGN DETAIL
TASKS, SUBROUTINES and DATA SETS

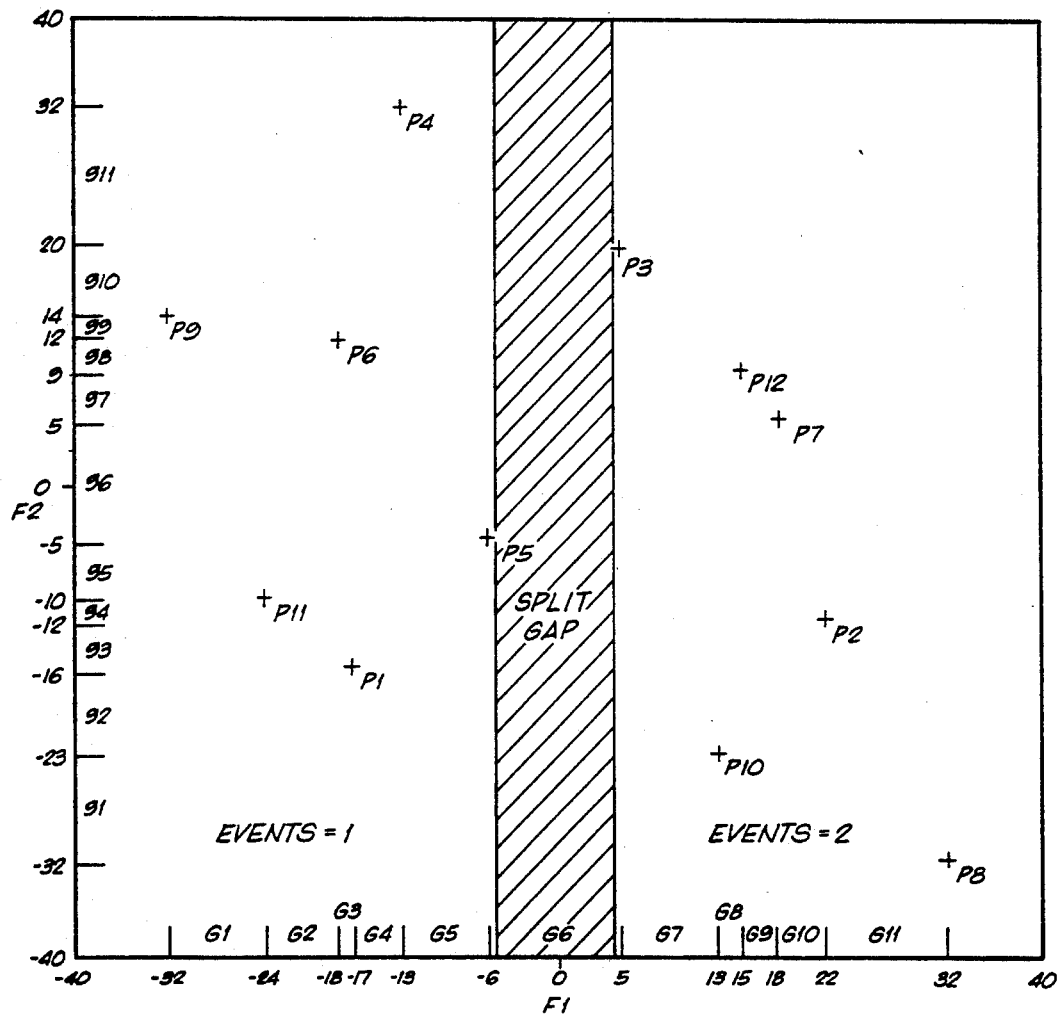

FIG. 5B

| INDEX | MAT F1 | MAT F2 | LINK1 F1 | LINK1 F2 |
|---|---|---|---|---|
| 1 | -17 | -16 | 9 | 8 |
| 2 | 22 | -12 | 11 | 10 |
| 3 | 5 | 20 | 6 | 1 |
| 4 | -13 | 32 | 1 | 2 |
| 5 | -6 | -5 | 4 | 11 |
| 6 | -18 | 12 | 5 | 5 |
| 7 | 18 | 5 | 3 | 7 |
| 8 | 32 | -32 | 10 | 12 |
| 9 | -32 | 14 | 12 | 6 |
| 10 | 13 | -23 | 7 | 9 |
| 11 | -24 | -10 | 2 | 3 |
| 12 | 15 | 9 | 8 | 4 |

FIG. 5C

| INDEX | GAPMAT F1 | GAPMAT F2 | LINK2 F1 | LINK2 F2 |
|---|---|---|---|---|
| 1 | 8 | 9 | 3 | 4 |
| 2 | 6 | 7 | 8 | 9 |
| 3 | 1 | 4 | 9 | 8 |
| 4 | 4 | 2 | 4 | 3 |
| 5 | 7 | 5 | 10 | 7 |
| 6 | 11 | 10 | 2 | 5 |
| 7 | 8 | 4 | 5 | 10 |
| 8 | 2 | 3 | 1 | 2 |
| 9 | 3 | 2 | 7 | 1 |
| 10 | 4 | 6 | 11 | 6 |
| 11 | 10 | 12 | 6 | 11 |

FIG. 5D

| INDEX | LINK2 | | MODES | | | BIGGAPS | |
|---|---|---|---|---|---|---|---|
| | F1 | F2 | F1 | F2 | | F1 | F2 |
| 1 | 3 | 4 | | | | 11 | 10 |
| 2 | 8 | 9 | LM=3 | LM=4 | | | |
| 3 | 9 | 8 | RM=9 | RM=9 | | | |
| 4 | 4 | 3 | | | | | |
| 5 | 10 | 7 | | | | | |
| 6 | 2 | 5 | | | | SPLITINDEX | |
| 7 | 5 | 10 | | | | F1 | F2 |
| 8 | 1 | 2 | | | | 11 | 10 |
| 9 | 7 | 1 | | | | | |
| 10 | 11 | 6 | | | | | |
| 11 | 6 | 11 | | | | | |

FIG. 5E

| INDEX | MAT | | | EVENTS | | INDEX | MAP |
|---|---|---|---|---|---|---|---|
| | F1 | F2 | | | | | |
| 1 | -17 | | | 1 | | 1 | 1 |
| 2 | 22 | | | 2 | | 2 | 7 |
| 3 | 5 | | | 2 | | 3 | 8 |
| 4 | -13 | | | 1 | | 4 | 2 |
| 5 | -6 | | | 1 | | 5 | 3 |
| 6 | -18 | | | 1 | | 6 | 4 |
| 7 | 18 | | | 2 | | 7 | 9 |
| 8 | 32 | | | 2 | | 8 | 10 |
| 9 | -32 | | | 1 | | 9 | 5 |
| 10 | 13 | | | 2 | | 10 | 11 |
| 11 | -24 | | | 1 | | 11 | 6 |
| 12 | 15 | | | 2 | | 12 | 12 |

FIG. 5F

| INDEX | MAP EVENT | | MAPMAT | | | MAPLINK1 | | | UNMERGE MAPLINK1 | |
|---|---|---|---|---|---|---|---|---|---|---|
| | | | F1 | F2 | | F1 | F2 | | F1 | F2 |
| 1 | 1 | | -17 | -16 | | 5 | 10 | | 5 | 1 |
| 2 | 1 | | -13 | 32 | | 6 | 11 | | 6 | 6 |
| 3 | 1 | | -6 | -5 | | 4 | 1 | | 4 | 3 |
| 4 | 1 | | -18 | 12 | | 1 | 7 | | 1 | 4 |
| 5 | 1 | | -32 | 14 | | 2 | 6 | | 2 | 5 |
| 6 | 1 | | -24 | -10 | | 3 | 3 | | 3 | 2 |
| 7 | 2 | | 22 | -12 | | 8 | 9 | | 8 | 10 |
| 8 | 2 | | 5 | 20 | | 11 | 12 | | 11 | 11 |
| 9 | 2 | | 18 | 5 | | 12 | 4 | | 12 | 7 |
| 10 | 2 | | 32 | -32 | | 9 | 5 | | 9 | 9 |
| 11 | 2 | | 13 | -23 | | 7 | 8 | | 7 | 12 |
| 12 | 2 | | 15 | 9 | | 10 | 2 | | 10 | 8 |

FIG. 6B

| INDEX | MAT F1 | F2 | | LINK1 F1 | F2 |
|---|---|---|---|---|---|
| 1 | -17 | -16 | | 5 | 1 |
| 2 | -13 | 32 | | 6 | 6 |
| 3 | -6 | -5 | | 4 | 3 |
| 4 | -18 | 12 | | 1 | 4 |
| 5 | -32 | 14 | | 2 | 5 |
| 6 | -24 | -10 | | 3 | 2 |
| 7 | 22 | -12 | | 8 | 10 |
| 8 | 5 | 20 | | 11 | 11 |
| 9 | 18 | 5 | | 12 | 7 |
| 10 | 32 | -32 | | 9 | 9 |
| 11 | 13 | -23 | | 7 | 12 |
| 12 | 15 | 9 | | 10 | 8 |

FIG. 6C

| INDEX | GAPMAT F1 | F2 | | LINK2 F1 | F2 |
|---|---|---|---|---|---|
| 1 | 8 | 6 | | 3 | 4 |
| 2 | 6 | 5 | | 4 | 2 |
| 3 | 1 | 17 | | 2 | 1 |
| 4 | 4 | 2 | | 5 | 3 |
| 5 | 7 | 18 | | 1 | 5 |
| 6 | | | | | |
| 7 | 8 | 9 | | 8 | 10 |
| 8 | 2 | 11 | | 9 | 7 |
| 9 | 3 | 17 | | 10 | 8 |
| 10 | 4 | 4 | | 7 | 11 |
| 11 | 10 | 11 | | 11 | 9 |

FIG. 6D

| INDEX | LINK2 F1 | LINK2 F2 | MODES F1 | MODES F2 | | BIGGAPS F1 | BIGGAPS F2 |
|---|---|---|---|---|---|---|---|
| 1 | 3 | 4 | LM=3 | LM=2 | | 0 | 17 |
| 2 | 4 | 2 | RM=4 | RM=4 | | 0 | 17 |
| 3 | 2 | 1 | | | | | |
| 4 | 5 | 3 | | | | | |
| 5 | 1 | 5 | | | | | |
| 6 | | | | | | SPLITINDEX F1 | SPLITINDEX F2 |
| 7 | 8 | 10 | LM=8 | LM=7 | | | |
| 8 | 9 | 7 | RM=9 | RM=10 | | 1 | 4 |
| 9 | 10 | 8 | | | | 1 | 11 |
| 10 | 7 | 11 | | | | | |
| 11 | 11 | 9 | | | | | |

FIG. 6E

| INDEX | MAT F1 | MAT F2 | EVENTS | INDEX | MAP |
|---|---|---|---|---|---|
| 1 | | | 1 | 1 | 1 |
| 2 | | | 1 | 2 | 2 |
| 3 | | | 1 | 3 | 3 |
| 4 | | | 1 | 4 | 4 |
| 5 | | | 1 | 5 | 5 |
| 6 | | | 1 | 6 | 6 |
| 7 | | -12 | 2 | 7 | 7 |
| 8 | | 20 | 3 | 8 | 10 |
| 9 | | 5 | 3 | 9 | 11 |
| 10 | | -32 | 2 | 10 | 8 |
| 11 | | -23 | 2 | 11 | 9 |
| 12 | | 9 | 3 | 12 | 12 |

FIG. 6F

| INDEX | MAP EVENT | MAPMAT F1 | MAPMAT F2 | MAPLINK1 F1 | MAPLINK1 F2 | UNMERGE MAPLINK1 F1 | UNMERGE MAPLINK1 F2 |
|---|---|---|---|---|---|---|---|
| 1 | 1 | -17 | -16 | 5 | 1 | 5 | 1 |
| 2 | 1 | -13 | 32 | 6 | 6 | 6 | 6 |
| 3 | 1 | -6 | -5 | 4 | 3 | 4 | 3 |
| 4 | 1 | -18 | 12 | 1 | 4 | 1 | 4 |
| 5 | 1 | -32 | 14 | 2 | 5 | 2 | 5 |
| 6 | 1 | -24 | -10 | 3 | 2 | 3 | 2 |
| 7 | 2 | 22 | -12 | 10 | 8 | 9 | 8 |
| 8 | 2 | 32 | -32 | 9 | 9 | 7 | 9 |
| 9 | 2 | 13 | -23 | 12 | 7 | 8 | 7 |
| 10 | 3 | 5 | 20 | 11 | 11 | 10 | 11 |
| 11 | 3 | 18 | 5 | 7 | 12 | 12 | 12 |
| 12 | 3 | 15 | 9 | 8 | 10 | 11 | 10 |

FIG. 7B

| INDEX | MAT F1 | F2 | | LINK1 F1 | F2 |
|---|---|---|---|---|---|
| 1 | -17 | -16 | | 5 | 1 |
| 2 | -13 | 32 | | 6 | 6 |
| 3 | -6 | -5 | | 4 | 3 |
| 4 | -18 | 12 | | 1 | 4 |
| 5 | -32 | 14 | | 2 | 5 |
| 6 | -24 | -10 | | 3 | 2 |
| 7 | 22 | -12 | | 9 | 8 |
| 8 | 32 | -32 | | 7 | 9 |
| 9 | 13 | -23 | | 8 | 7 |
| 10 | 5 | 20 | | 10 | 11 |
| 11 | 18 | 5 | | 12 | 12 |
| 12 | 15 | 9 | | 11 | 10 |

FIG. 7C

| INDEX | GAPMAT F1 | F2 | | LINK2 F1 | F2 |
|---|---|---|---|---|---|
| 1 | 8 | 6 | | 3 | 4 |
| 2 | 6 | 5 | | 4 | 2 |
| 3 | 1 | 17 | | 2 | 1 |
| 4 | 4 | 2 | | 5 | 3 |
| 5 | 7 | 18 | | 1 | 5 |
| 6 | | | | | |
| 7 | 9 | 9 | | 7 | 7 |
| 8 | 10 | 11 | | 8 | 8 |
| 9 | | | | | |
| 10 | 10 | 4 | | 11 | 10 |
| 11 | 3 | 11 | | 10 | 11 |

FIG. 7D

| INDEX | LINK2 F1 | LINK2 F2 | MODES F1 | MODES F2 | | BIGGAPS F1 | BIGGAPS F2 |
|---|---|---|---|---|---|---|---|
| 1 | 3 | 4 | | | | 0 | 17 |
| 2 | 4 | 2 | LM=3 | LM=2 | | 0 | 0 |
| 3 | 2 | 1 | RM=4 | RM=4 | | 0 | 0 |
| 4 | 5 | 3 | | | | | |
| 5 | 1 | 5 | | | | | |
| 6 | | | | | | SPLITINDEX F1 | SPLITINDEX F2 |
| 7 | 7 | 7 | | | | | |
| 8 | 8 | 8 | NONE | | | 1 | 4 |
| 9 | | | | | | 1 | 1 |
| 10 | 11 | 10 | NONE | | | 1 | 1 |
| 11 | 10 | 11 | | | | | |

FIG. 7E

| INDEX | MAT F1 | MAT F2 | | EVENTS | | INDEX | MAP |
|---|---|---|---|---|---|---|---|
| 1 | | -16 | | 1 | | 1 | 1 |
| 2 | | 32 | | 4 | | 2 | 4 |
| 3 | | -5 | | 1 | | 3 | 2 |
| 4 | | 12 | | 4 | | 4 | 5 |
| 5 | | 14 | | 4 | | 5 | 6 |
| 6 | | -10 | | 1 | | 6 | 3 |
| 7 | | | | 2 | | 7 | 7 |
| 8 | | | | 2 | | 8 | 8 |
| 9 | | | | 2 | | 9 | 9 |
| 10 | | | | 3 | | 10 | 10 |
| 11 | | | | 3 | | 11 | 11 |
| 12 | | | | 3 | | 12 | 12 |

FIG. 7F

| INDEX | MAP EVENT | MAPMAT | | MAPLINK1 | | UNMERGE MAPLINK1 | |
|---|---|---|---|---|---|---|---|
| | | F1 | F2 | F1 | F2 | F1 | F2 |
| 1 | 1 | -17 | -16 | 6 | 1 | 3 | 1 |
| 2 | 1 | -6 | -5 | 3 | 3 | 1 | 3 |
| 3 | 1 | -24 | -10 | 5 | 2 | 2 | 2 |
| 4 | 4 | -13 | 32 | 1 | 5 | 6 | 5 |
| 5 | 4 | -18 | 12 | 4 | 6 | 5 | 6 |
| 6 | 4 | -32 | 14 | 2 | 4 | 4 | 4 |
| 7 | 2 | 22 | -12 | 9 | 8 | 9 | 8 |
| 8 | 2 | 32 | -32 | 7 | 9 | 7 | 9 |
| 9 | 2 | 13 | -23 | 8 | 7 | 8 | 7 |
| 10 | 3 | 5 | 20 | 10 | 11 | 10 | 11 |
| 11 | 3 | 18 | 5 | 12 | 12 | 12 | 12 |
| 12 | 3 | 15 | 9 | 11 | 10 | 11 | 10 |

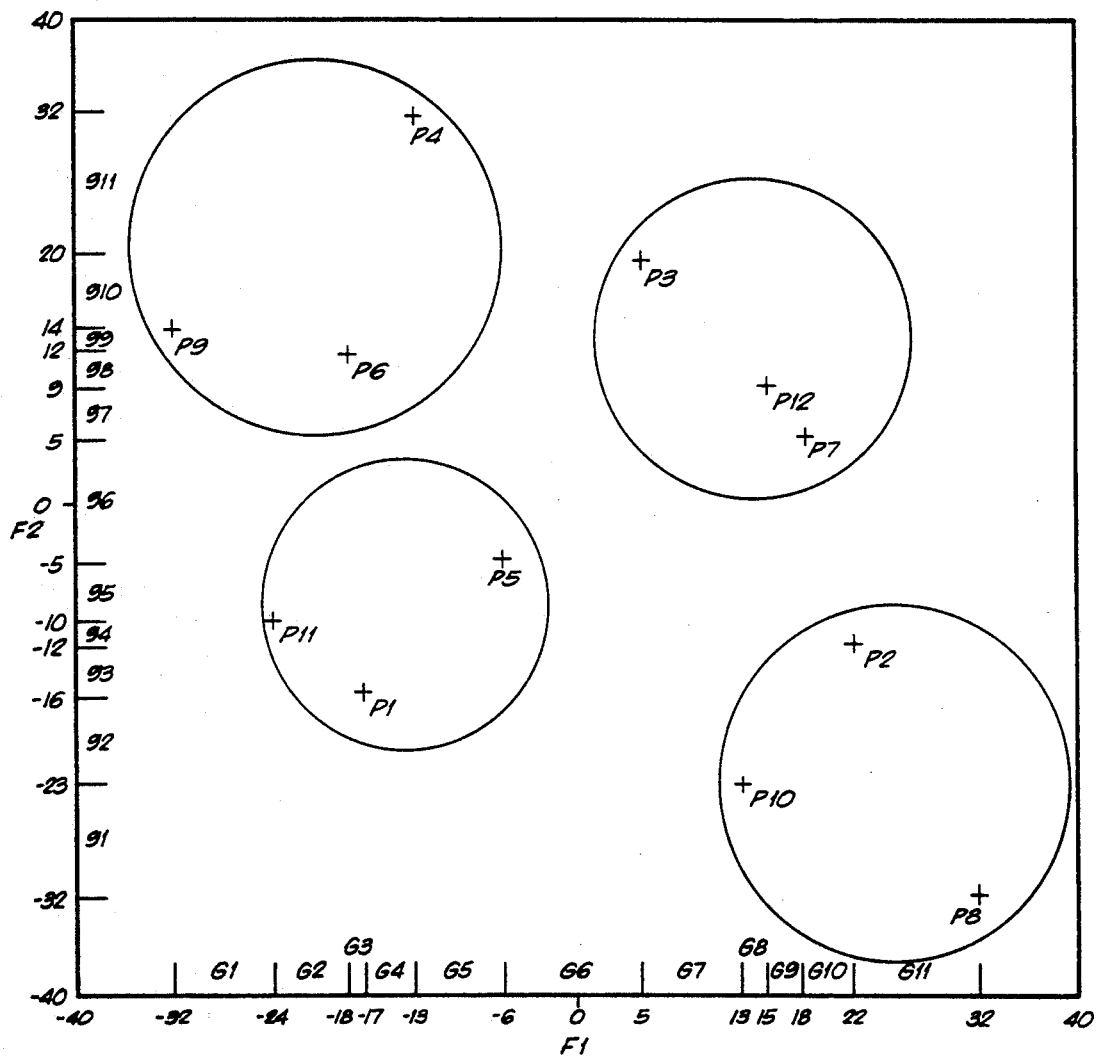

FIG. 8B

| INDEX | MAT F1 | F2 | | LINK1 F1 | F2 |
|---|---|---|---|---|---|
| 1 | -17 | -16 | | 3 | 1 |
| 2 | -6 | -5 | | 1 | 3 |
| 3 | -24 | -10 | | 2 | 2 |
| 4 | -13 | 32 | | 6 | 5 |
| 5 | -18 | 12 | | 5 | 6 |
| 6 | -32 | 14 | | 4 | 4 |
| 7 | 22 | -12 | | 9 | 8 |
| 8 | 32 | -32 | | 7 | 9 |
| 9 | 13 | -23 | | 8 | 7 |
| 10 | 5 | 20 | | 10 | 11 |
| 11 | 18 | 5 | | 12 | 12 |
| 12 | 15 | 9 | | 11 | 10 |

FIG. 8C

| INDEX | GAPMAT F1 | F2 | | LINK2 F1 | F2 |
|---|---|---|---|---|---|
| 1 | 7 | 6 | | 1 | 2 |
| 2 | 11 | 5 | | 2 | 1 |
| 3 | | | | | |
| 4 | 14 | 2 | | 5 | 4 |
| 5 | 5 | 18 | | 4 | 5 |
| 6 | | | | | |
| 7 | 9 | 9 | | 7 | 7 |
| 8 | 10 | 11 | | 8 | 8 |
| 9 | | | | | |
| 10 | 10 | 4 | | 11 | 10 |
| 11 | 3 | 11 | | 10 | 11 |

FIG. 8D

| INDEX | LINK2 F1 | LINK2 F2 | MODES F1 | MODES F2 | | BIGGAPS F1 | BIGGAPS F2 |
|---|---|---|---|---|---|---|---|
| 1 | 1 | 2 | NONE | | | 0 | 0 |
| 2 | 2 | 1 | | | | 0 | 0 |
| 3 | | | | | | 0 | 0 |
| 4 | 5 | 4 | NONE | | | 0 | 0 |
| 5 | 4 | 5 | | | | | |
| 6 | | | | | | SPLITINDEX F1 | SPLITINDEX F2 |
| 7 | 7 | 7 | NONE | | | / | / |
| 8 | 8 | 8 | | | | / | / |
| 9 | | | | | | / | / |
| 10 | 11 | 10 | NONE | | | / | / |
| 11 | 10 | 11 | | | | / | / |

FFC STOPS

FIG. 9

|  | FFC PASS 1 | FFC PASS 2 | FFC PASS 3 | FFC PASS 4 |
|---|---|---|---|---|
| SPLIT CLUSTER | EVENT=1 | EVENT=2 | EVENT=1 | FFC HALTS |
| SPLIT FEATURE | F1 | F2 | F2 | NONE |
| SPLIT VALUE | -6 | -12 | -5 | NONE |
| SPLIT INDEX | 11 | 11 | 4 | NONE |
| SPLIT GAP | G6 | $g_4+g_5+g_6$ | $g_6+g_7+g_8$ | NONE |
| CLUSTER 1 | P1 P4 P5 P6 P9 P11 | P1 P4 P5 P6 P9 P11 | P1 P5 P11 | P1 P5 P11 |
| CLUSTER 2 | P2 P3 P7 P8 P10 P12 | P2 P8 P10 | P2 P8 P10 | P2 P8 P10 |
| CLUSTER 3 | / | P3 P7 P12 | P3 P7 P12 | P3 P7 P12 |
| CLUSTER 4 | / | / | P4 P6 P9 | P4 P6 P9 |
| FIGURES | 5A thru 5E | 6A thru 6E | 7A thru 7E | 8A thru 8D |

History of FFC Splits for the 12 Point Example

FIG. 10

|  | FFC PASS1 | FFC PASS2 | FFC PASS3 | FFC PASS4 | FFC PASS5 | FFC PASS6 | FFC PASS7 |
|---|---|---|---|---|---|---|---|
| SPLIT CLUSTER | P1C1 | P2C1 | P3C3 | P2C2 | P5C2 | P5C5 | P3C1 |
| SPLIT FEATURE | Y | Z | X | X | Z | Z | X |
| SPLIT VALUE | -2551 | -3703 | -4775 | -3098 | -420 | -4319 | -1933 |
| CLUSTERS "*" denotes no further splits | P2C1 P2C2 | P2C2 P3C1 P3C3 | P2C2 P3C1 P3C3 | P3C1 *P4C3 *P4C4 P5C2 P5C5 | P3C1 *P4C3 *P4C4 P5C5 *P6C2 *P6C6 | P3C1 *P4C3 *P4C4 *P6C2 *P6C6 *P7C5 *P7C7 | *P4C3 *P4C4 *P6C2 *P6C6 *P7C5 *P7C7 *P8C1 *P8C8 |

History of Splits for the 400 Point Example
(Note: PnCm denotes Pass n Cluster m)

ADAPTIVE FAST FUZZY CLUSTERING SYSTEM

BACKGROUND OF THE INVENTION

This invention relates to adaptive pattern recognition methodologies, and more particularly relates to an improved apparatus and method for clustering data points in continuous feature space by adaptively separating classes of patterns.

It is well known in the prior art that there are myriad applications related to recognizing and classifying collections or groups of multivariate data. Some representative examples include speech recognition in acoustics; classifying diseases based upon symptomatology in health care; classifying artifacts in archaeology; interpreting extraterrestrial electrical signals in space; and interpreting radar.

In the instance of interpreting extraterrestrial electromagnetic signals from space, perhaps pursuant to searching for extraterrestrial intelligence, an adaptive methodology is needed which performs its recognition and classification functions in the absence of a priori templates of these signals. Since the underlying distribution thereof is unknown, it would be advantageous for those skilled in the art to use a methodology which presumes none. An effective search of such a multi-dimensional feature space would preferably depend from all of the collected signals, enabling efficient searching for repetitive and drifting signals intermingled with random noise.

Similarly, in the instance of radar clutter removal, such a methodology could function as an adaptive filter to eliminate random noise signals, i.e., outliers, thereby enhancing signals with high information content. Another application is image restoration which attempts to correlate edge-information between successive images. Such information could be used to enhance edges within an image or across multiple images in real-time.

Other uses of such a methodology include rapid image matching and other processing for locating targets using small infrared detectors and radar transmitters and receivers for military purposes, and in the field of cryptology wherein the goal is to reduce computation times for calculating the greatest common divisor to encrypt or decrypt messages and codes. Another particularly advantageous application is prescreening of data received from monitoring satellites without prematurely dismissing data designated as being spurious.

In still another significant application, there are optical character recognition problems, in which documents are scanned as bitmap images and then converted to machine-readable text. After the images of individual characters have been separated, they are classified as particular characters based upon a multidimensional feature space. Typical features include darkened pixel density, width to height ratio, and Fourier components of its image density projected onto the horizontal and vertical axes. Another interesting illustration is a robotic control system in which feedback from a video camera integrated into a real-time image processing system is used to identify the robot's position in space. This position is obtained from a twofold description thereof: kinematic vector in three-dimensional space and a visual vector in twelve dimensional space of image dot locations.

G-C. Rota in his report entitled "Remarks on the Present of Artificial Intelligence", prepared under the auspices of the Massachusetts Institute of Technology Industrial Liaison Program and published May 11, 1985 as Document No. MIT ILP 500, observed that "the estimation procedures used in today's expert systems are not qualitatively different from the mathematical technique for grouping and clustering that for several years now have been used to automatically catalogue and look up journal articles and scientific citations." Ergo, cataloging and retrieving journal articles based on keywords, as is commonly performed in the art, may be construed as being tantamount to performing cluster analysis on nearby keywords.

Typically, in the prior art, analysis proceeds by applying conventional statistical methodology to sets of measurements of observable characteristics. As is familiar to those skilled in the art, pattern recognition problems are characterized as having data obtained from groups which are either known or unknown a priori. Classifying data into groups which are already known is referred to as supervised pattern recognition or learning with a teacher. The statistical methodology pertinent to this supervised pattern recognition is referred to as discriminant analysis. On the other hand, classifying data into groups which are unknown a priori is referred to as unsupervised pattern recognition or learning without a teacher. The statistical methodology pertinent to this unsupervised pattern recognition is referred to as cluster analysis.

Cluster analysis as heretofore practiced in the prior art has lacked the benefit of unifying principles. Indeed, the various attempts to effectuate cluster analysis have been directed toward heuristically applying procedures to solve specific problems, resulting in limited success.

The state of the art of cluster analysis has been articulated by the distinguished members of the NRC Panel on Discriminant Analysis, Classification, and Clustering, in the paper entitled "Discriminant Analysis and Clustering" which appeared in Statistical Science, February 1989, vol. 4, no. 1, pp. 34–69. As is well known to those skilled in the art, like discriminant analysis, cluster analysis has received considerable attention, with the objective of developing reliable methodologies therefor. However, unlike discriminant analysis, cluster analysis is lacking in a proven methodology, and virtually devoid of concomitant underlying theories therefor. Indeed, in addition to there being no commonly accepted definition of clustering, the clustering methodologies which have been taught in the prior art have suffered from the disadvantage of being limited to the vagaries and unreliability of the ad hoc nature thereof.

More particularly, the inherent complexity and elusivity of performing an effective cluster analysis is attributable to the data-dependent nature of a set of unknown clusters, and their dispersion and relative positions in the data space. Cluster analysis focuses on the underlying organization of collections of observations, whereby similar observations are preferably grouped together into the same "cluster." Thus, clustering may be visualized as a process of homogenizing collections of data into groups of closely related observations. Accordingly, after such a homogenation is performed, each of a myriad collection of observations is associated with one and only one cluster in a data space which is partitioned into a plurality of separate heterogeneous clusters.

The prior art teaches three methodologies for clustering data: hierarchical, partitioning and overlapping. The hierarchical methodology represents data in a tree structure called a dendrogram. At the apex of the tree, each observation is represented as a separate cluster. At intermediate levels of the tree, observations are aggregated into correspondingly fewer clusters. At the base of the tree, observations are, in turn, aggregated into one cluster. If the dendrogram is horizontally cut at a particular level in its structure, a partitioning of its underlying data is achieved. While there are other hierarchically oriented approaches known in the prior art, the paucity of reliable joining and splitting criteria and, of course, the resulting expense of applying these criteria to the observations, limit the derivation of the cluster or clusters which characterize the data.

The partitioning methodology purports to organize observations based upon presumed cluster-centers. After an initial assumption is made regarding the location of the cluster-centers, data is partitioned by assigning each observation to its nearest cluster-center. In this approach, the location of the cluster-centers is iteratively refined, and then the observations are reassigned thereto. These iterative refinements continue until predefined stability criteria are reached. As is well known in the prior art, the partitioning method is slow and depends, inter alia, upon the initial selection of cluster-centers and their susceptibility to change.

The overlapping methodology, at least conceptually, purports to accommodate observations which presumably have overlapping clusters, and accordingly, which cannot be derived from either of the hereinbefore described hierarchical or partitioning methodologies. This approach has, unfortunately, received minimal attention by those skilled in the art.

It should be clear to those skilled in the art, that notwithstanding these limited algorithmic approaches to clustering data, there have been other approaches successfully applied to achieve a grouping of observations. For example, after a presumption is made about the underlying nature of the multivariate data, whereby it is projected onto a two or three dimensional space of greatest dispersion, one method then seeks to ascertain the clusters thereof by visual recognition. Another such methodology, is dynamic graphic systems that seek clusters using the underlying data to be viewed from a plurality of different perspectives. J. W. Tukey and P. A. Tukey, in their paper entitled "Computer Graphics and Exploratory Data Analysis: An Introduction", published in the Proceedings of the Sixth Annual National Computer Graphics Conference, Dallas, Tex. on Apr. 14–18, 1985, pp. 772–784, discuss the prior art's inability to emulate via computer the human eye's perception of dominant patterns and deviations therefrom in multiple-aspect data, without any a priori ideas or information about such patterns. After emphasizing the need for computers to sort out myriad displays for calculating diagnostics quantities for guidance purposes (coined "cognostics"), and the advantage of combining numerical information inherent in distances with the ordered information inherent in ranks, they indicate that, inter alia, the prior art would be advanced by guidance regarding what, how and why to compute, and how to choose what to display. Accordingly, they conclude that good cognostics is a prerequisite, providing useful ideas about types-and-styles of display.

Developing the ability to systematically project the observations upon axes apt to provide clustering direction, and coordinating it with the hereinbefore described human visual identification of data patterns, could provide an effective clustering methodology, particularly in view of the improvements in multi-processor computers, disk storage capacity and access speeds, and the availability and cost of memory.

These clustering methodologies known in the prior art are implemented in three distinct steps: input, process (clustering), and output. In the input step, there occurs selecting, transforming and scaling of variables. Frequently, commitment to a particular distance metric occurs in this input step. Accordingly, the selection of relevant variables is indigenous to an effective clustering analysis. Unfortunately, it is a limitation of the prior art that there is a paucity of statistical procedures to provide guidance selecting variables for clustering. To compensate for this shortcoming, there have been attempts by those skilled in the art to commence clustering with an abundance of variables, with only minimal selection criteria therefor. This approach, has tended to merely dilute the analysis and typically interfere with the normal behavior of the underlying algorithms. Another problem which continues to plague practitioners in the prior art includes how to normalize variables across disparate measurements. Furthermore, the said analyses known in the prior art are limited by and intertwined with the scaling of the features or establishing equivalences, and the selection of the distance measure therefor.

It is generally accepted in the prior art that classification precedes measurement. Known or prior classification is prerequisite for statistically meaningful calculations and for making probability judgments. Ergo, averaging apples with oranges clearly yields a meaningless statistic. A simple example is predicting that a toss of a coin yields "heads" with a probability of $\frac{1}{2}$ because it is classified with other recalled similar coin tosses, half of which yielding "heads" and the other half yielding "tails." But statistics cannot provide a complete foundation for classification. It provides, in the context of clustering, an a posteriori means for examining and testing the efficacy of purported clustering results. That is, statistics explores how well particular methodologies function when applied to certain collections of observations.

Misclassification of data points into clusters can occur for two different types of reasons. First, two distinct neighboring clusters may overlap on their boundaries and, as a result of these clusters, may not be recognized as separate. In this clustering concept, the term "fuzz" is used to denote these misleading boundary data points. Second, spurious data points, belonging to no cluster, may be dispersed throughout the data space. Assigning these spurious data points to the nearest cluster distorts the shape and, thus, the statistics which characterize this cluster. In this clustering concept, the term "fuzz" is also used to denote these misleading spurious data points which belong to no cluster.

The remaining data points, i.e., the non-fuzzy data points, have a high probability of correct classification into clusters. However, because classification precedes measurement, it is generally impossible to distinguish these two type of misleading fuzzy data pints from non fuzzy data points, until after the clusters are identified. It is advantageous to identify both types of fuzzy data points during the clustering, and use this information to better recognize "true" cluster boundaries. Accordingly, it would be advantageous if a clustering methodology were available in which classification does not precede measurement of fuzz, and treated fuzz as a Gestalt: as a function of its position in the data space.

As is well known to those skilled in the art, agglomerative methods of clustering can be poor estimators of high density clusters. They typically invoke the complete-linkage method, representing the distance between clusters as the maximum distance between points in adjacent clusters. Unfortunately, being easily upset by the fuzz of observations between high density regions, this complete-linkage approach is the worst of all the conventional methods for determining high density clusters. During the workings of this method, pertinent information about the distribution of points is lost. By contrast, the average-linkage method, representing the distance between clusters as the average distance between pairs of points in adjacent clusters, is more sensitive than the complete-linkage to population distribution because the distance metric is affected by the number of points in the clusters. Thus, if two neighboring clusters are formed in the vicinity of a high density region, then the intercluster distance will be smaller than usual because of the plurality of proximal points, whereby these neighboring clusters will tend to be aggregated.

The prior art further teaches that there are disjoint high density clusters only if the density is multimodal. Accordingly, a rough test for the presence of clusters is seeking multimodality in the data space or some lower dimension projection; this modus operandi corresponds to a kind of visual, squinting search for clustered observations. In the case of a one dimensional data space, these unimodal and bimodal densities may be estimated by a maximum likelihood fit. But, as is known to those skilled in the art, it is difficult to deal with the disproportionate influence upon this density fit by small intervals between neighboring observations. Two or three extremely close data points not near any mode distort this statistic, which presumes that points disposed remote from a mode are, in turn, disposed apart from each other. It is typically a superior approach to use the dip test, which measures the maximum difference between the empirical distribution function, and the unimodal distribution function chosen to minimize the said maximum difference. The dip approaches zero for unimodal distributions, and a non-zero value for multimodal distributions. There has been posited a theory that the uniform distribution is the appropriate null modal distribution because the dip is asymptotically stochastically larger for the uniform than for other unimodal distributions.

It is still another limitation of the prior art that the dip test does not generalize to multidimensional data space. The minimum spanning tree method provides a distance ordering of n sample points for which a dip statistic may be calculated. While a purported optimal mode is located with an estimate of the fit of this unimodal hypothesis, which appears to correspond to the one dimensional dip test, the asymptotic extension of the dip test to multidimensional data is unknown in the art.

If the components of a normal mixture in a multidimensional data space are sufficiently separated, there is typically one multidimensional mode for each such component. It should be observed that several modes may coincide after projection onto a subspace or an axis. Hence, the number of one dimensional modes of a single variable may be less than the number of components or clusters. As should be apparent to those skilled in the art, the number of clusters and the number of components or multidimensional modes will be equivalent. Clusters separated in n-dimensions may project onto the same one dimensional mode in the graph of a single variable, termed "spectrum".

For instance, in a paper entitled "O(log n) Bimodality Analysis" by T. Phillips, A. Rosenfeld and A.C. Sher, which was published in Pattern Recognition, vol. 22, no. 6, pp. 741-746 (1989), describes a method to split a population into two subpopulations based upon exhaustive divide-and-conquer calculations. This method attempts to detect the presumed bimodality of a large population of visual features by applying the Gestalt principle of similarity-grouping whereby a display is construed to be comprised of an admixture of two different species of elements, e.g., large and small dots, horizontal and vertical lines. The crux of this methodology is the definition of a measure of the bimodality of a population based upon its partitioning into two subpopulations that have maximal Fisher distance, provided that the underlying population is an admixture of two Gaussians with sufficiently large Fisher distances. The said divide-and-conquer methodology involves computing a set of subpopulation sizes, means and variances. More particularly, the population is recursively partitioned until the maximal value of the square of the Fisher distance thereof is obtained. In a single Gaussian population, this metric reaches a maximum where the population is partitioned into an outlier farthest from the mean and the remainder thereof. Unfortunately, this one dimensional splitting modus operandi provides no clue whether the underlying population is indeed an admixture of Gaussians, or whether it is bimodal.

Furthermore, the authors acknowledge that applying this methodology to large bimodal populations with more than two clusters of visual properties is difficult and may be impractical because it engenders a combinatorial problem of subdividing populations into more than two partitions. If an outlier event comprises the second partition, then it is not clear whether the population is actually bimodal. Since the bimodal designation implies that there are two clusters in a population, on what basis can a singleton partition be discarded?. By not considering the events as a Gestalt, merely a possible component of the boundary fuzz is isolated. As an example, this procedure may be falsely classifying events as outliers, notwithstanding such events being simply offset from their respective cluster center in one dimension. If, however, there exists an offset in all dimensions, then the cumulative fuzz is more significant, and a spurious outlier event may in actuality exist.

Those skilled in the art are familiar with software packages which implement algorithms and procedures purportedly designed to accomplish cluster analysis. For example, the NT-SYS and NTSYS-pc packages contain the conventional hierarchical agglomerative methods of cluster analysis. As other examples, the BMDP, SAS, and SPSS-X packages provide procedures for conventional hierarchical agglomerative methods and iterative partitioning. Another, more versatile software package for cluster analysis, is CLUSTAN which not only offers procedures for conventional hierarchical agglomerative methods and iterative partitioning, but also offers procedures for decomposition of normal multivariate mixtures using the minimum spanning tree. CLUSTAN provides a plurality of cluster-oriented utilities including validation criteria, diagnostics, and similarity coefficients. Notwithstanding this diverse assortment of clustering procedures and functions, it unfortunately affords merely minimal direction for selecting a procedure to apply to a set of observations.

Another software package, MICRO-CLUSTER, provides several hierarchical agglomerative methods and an iterative partitioning method to effect clustering. A particularly interesting class of cluster analysis computer programs are those intended to process large collections of data, where there are at least 500 data points. In spite of this intent to entertain real world, large-scale problems, clustering methods known in the prior art are limited to analyzing only about 200 cases simultaneously.

Furthermore, there are few packages which estimate local density, with no probability distribution assumptions. For example, ALLOC, a package which computes allocation rules as a function of density estimation, uses multivariate normal kernels with a diagonal covariance matrix. IMSL, a package which performs linear and quadratic discriminant analysis, is capable of performing density estimate analysis. The IMSL nearest neighbor procedures are particularly useful when distributions deviate far from normal. These nearest neighbor procedures, functionally related to nonparametric density estimates, are also available in the SAS package.

As is apparent to those knowledgeable in the art, none of these available software packages provides guidance for selecting clustering method and relevant data, organizing the observation data, resolving outlier criteria, or selecting similarity metrics. Hence, there is a need in the prior art for an effective interactive exploratory graphic package for ascertaining classifications of large numbers of observations. It should also be apparent that a useful clustering tool is also needed to facilitate selecting relevant variables and to distinguish observations as belonging to a particular cluster or being an outlier thereof.

It should be clear that the prior art lacks a foundation and a standard, reliable methodology for cluster analysis. Indeed, a methodology is needed whose results are independent of the vagaries of the multivariate observations in n-dimensional data space, such as scaling. As hereinbefore described, each of the clustering methodologies heretofore known to those skilled in the art yield different classes of patterns depending upon the algorithms invoked thereby, with its concomitant presumptions regarding a distance metric and scaling. Unfortunately, the prior art lacks an objective mechanism for measuring the efficacy of such classifications determined in the absence of a prior knowledge.

It is accordingly a disadvantage of the teachings of the prior art that insufficient experience is available pertaining to attempting clustering under circumstances for which there is limited, if any, a prior knowledge about the distribution of the underlying observations. It should be clear that unsupervised learning involves considerably more sophistication, including convergence criteria, than does supervised learning.

An attempt to overcome the limitations of the prior art is described by M. D. Eggers and T. S. Khoun of the Massachusetts Institute of Technology Lincoln Laboratory in their paper entitled "Adaptive Preprocessing of Nonstationary Signals" which was published in Technical Report 849 on May 9, 1989. Eggers and Khoun sought to produce a compact feature vector by providing a preprocessor for large volumes of signal data as a precursor to automated decision-making, without any foreknowledge of the underlying statistical distribution or expert rules. In particular, their methodology sought to reduce the said large data volumes without destroying the integrity of the information contained therein. As an improvement over the single window method known to those skilled in the art, there is used a dual window approach incorporating a cumulative sum statistic therein, whereby drift properties are exploited based upon a functional relationship with changes in spectral characteristics. This approach purports to overcome the inherent disadvantages of the said single window procedure caused by using the difference in the absolute mean as a measure of spectral behavior. However, its adaptiveness quotient is limited because a prior learning parameters must be presumed before the window sizes may be established. Furthermore, neither of these windows are adjusted during the execution of the procedure. Accordingly, while the Eggers-Khoun method affords an adaptable procedure for producing a compressed feature vector, it fails to provide an adaptive clustering technique heretofore unknown in the art, particularly a methodology with a natural grouping based upon and adaptively interdependent with the totality of data space and, of course, not restricted to windowing assumptions.

In U.S. Pat. No. 3,457,552, Asendorf discloses a learning method characterized as an "adaptive self-organizing pattern recognition system." Modifying output responses during its training phase to enable known patterns to be recognized, the Asendorf system strives to produce a unique output signal associated with a particular known pattern. Prerequisite to this method, however, is that patterns are recognized based upon pretaught patterns whose classification is known with absolute accuracy. Furthermore, the training aspect of the Asendorf invention is limited to data for which output signals related to different patterns may be distinguished from each other, by a human teacher particularly without increasing the complexity and cost of the system. Thus, providing the means to learn to recognize or classify patterns based soley upon a prior data, Asendorf's system is not adaptive, but adaptable in the sense that the threshold for screening output signals is adjusted to enable the classification thereof.

Cooper, et al., in U.S. Pat. No. 4,326,259, teach a system for a self-organizing general pattern class separator and identifier. In a multidimensional event space, each event is represented by a signal vector which is received by a plurality of input terminals interconnected with a plurality of junction elements and a summing device. Notwithstanding this "self organizing" nomenclature, the Cooper system cannot function in its normal trained mode of operation without its precursor training mode. Ergo, human intervention is prerequisite to iteratively selecting a proper scalar factor from observed events during this training mode, to properly filter out unwanted outputs and thereby eliminate errors of separation and identification. Indeed, based upon classification of events by an omniscient observer, a feedback loop between the summing device and junction elements effects the variation of the elements' transfer function, thereby modifying the said scalar factor. It should be apparent that the self-organizing feature of the Cooper invention, purportedly to separate and identify a particular group of events of related classes of events, does not attach until virtually all of the pattern recognition has been learned and organized.

By contrast, in U.S. Pat. No. 4,038,539, Van Cleave teaches a means and method for adaptively filtering input pulse signals occurring at unknown times and having unknown durations. By controlling the characteristic of the filtering means, the output thereof delivers signals corresponding to pulse signals of the input signals with concomitant minimum noise signals. The Van Cleave method invokes polynomial transformations for processing of the input signals and adaptively filtering the orthogonal signal components for providing at the output thereof, pulse signals present in the input signals with reduced noise therein. It is a disadvantage of this method, however, that there are inherent time delays during the signal analysis and orthogonal component filtering steps, and that a priori selection of preprogrammed threshold constants must be made prior to commencing operation thereof.

In U.S. Pat. No. 4,730,259, Gallant discloses an expert system in which an inference engine is controlled by a matrix of learning coefficients. Prerequisite to its operation, however, the Gallant engine's learning must be supervised. More particularly, its operation is governed by a matrix generated by training examples or a priori rules. Not only must its primary and goals variables be known a priori, but also the system goals are not determined adaptively. Gallant's intermediate and goal variables may require expert-generated dependency lists for its operation, but there is no assurance of convergence thereof nevertheless. That is, as stated therein, it may not always be possible to construct a matrix satisfying all of the prerequisite training examples. This could occur if some clusters overlapped in their outer regions.

It should be apparent that another limitation of Gallant's engine is that it seeks cause and effect relationships which can easily be destroyed by misclassified outliers and the like. In addition, it inherently has no internal provision for evaluating the integrity and reliability of a learning example. This shortcoming, when unreliable examples are invoked, clearly will produce contradictory supervisory rules. In view of these disadvantages and limitations, Gallant's invention functions more like an adaptable assistant, requiring human intervention for even a chance at convergence, rather than an inference engine as originally described therein.

Due to the requirement that its features be specified in advance as primary variables, the Gallant engine precludes adaptively finding goals. This, of course, follows from its a priori definition of goal variables as well as primary variables, and its underlying model of cause and effect relationships. It is also a limitation of Gallant that his engine would probably fail with increasing examples because of the corresponding increasing probability of misclassification of outliers, and the consequent contradictory rules and uncertain convergence there related.

Another attempt to improve the prior art is disclosed by Penz, Gately and Katz, in U.S. Pat. No. 4,945,494, in which neural networks are applied to cluster a plurality of radar signals into classes and a second neural net to identify these classes as known radar emitters. As is well known in the prior art, when neural nets are implemented on digital computers, the training procedures (learning phases) tend to be very slow. In addition, the proper choice of multiple hidden layers of neurons lacks guidance so that predicting the outcome of these choices is virtually impossible. Penz overcomes these two limitations by using programmable resistive arrays to implement the neural network instead of a digital computer. This resistive array has no hidden layers and can be trained very quickly.

An unavoidable limitation of neural networks, however, is their tendency to saturate. As Penz, points out, the well learned Eigenvector, i.e., the cluster with many observations, will be recalled, while the poorly learned Eigenvector i.e., the cluster with few observations, will be lost. After the input vectors are learned by the neural network, the clusters of vectors must still be separated from each other. Unfortunately, this separation can fail due to saturation. A sparse, small cluster bordering a large, dense cluster will tend to be absorbed and thereby lost during this separation phase.

But a limitation more critical than saturation is neural networks' inability to be effectively scaled. The number of connections required between each pair of neurons preclude the use of neural networks to cluster data vectors having thousands of components. In other words, building resistive neural networks to handle very large sensor arrays is a problem because of the huge number of connections. For example, a resistive array having 1,000 neurons requires about half a million connections to represent the matrix of $T_{ij}$ values and this exceeds the capability of today's chip fabricators. This is clearly elucidated in the Defense Advanced Research Project Agency (DARPA) Neural Network Study conducted under the auspices of the MIT Industrial Liaison Program published by Lincoln Laboratory, P. J. Kolodzy and J. Sage September 1989. Two approaches still under development for overcoming this limitation on scaling are to fabricate 3-D chips and to connect large numbers of chips optically.

The present invention overcomes these limitations of saturation and scaling in neural networks. In addition, the digital implementation of the present invention is as fast in the learning phase as the implementation of a neural network using resistive arrays. Moreover, the present invention implemented with content addressable memories is faster than any neural network, and is more intuitive regarding the prediction of the outcome of the clustering based upon parameter choices.

Thus, as is well known by those skilled in the art, there has heretofore been no unsupervised pattern recognition system applicable to large data sets of at least one thousand (1,000) observations. Those systems which have been developed for small data sets, typically constituting two to five hundred (200–500) observations, suffer from memory and execution constraints. In the book, "Clustering of Large Data Sets" by J. Zupan, it is reported that such an attempted clustering of five hundred (500) objects representing infrared spectra using one hundred sixty (160) features consumed forty (40) hours of computer time on a PDP 11/34 machine. Clearly, a means and method are needed which can solve classification problems of these and even larger magnitude within minutes or less by using parallel processors.

As hereinbefore described, it is also a limitation of the prior art that the separations and concomitant classifications achieved by clustering methodologies known in the prior art can and usually do depend from the selection of feature scaling factors and distance metrics. It should be apparent that the pattern of classes obtained from a clustering methodology should preferably be independent of such selections.

The present invention can also be scaled to cluster vectors having an unlimited number of components with no loss of speed and no increase in circuit complexity, i.e., neuron-neuron connections. This scaling is achieved by using a separate, isolated processing unit for each component of the data vector, which, of course, cannot be done within the paradigm of neural networks, since each neuron must communicate with every neuron.

The present invention also avoids the problem of saturation since it does not seek to identify classes of vectors before separating them. Indeed, the present invention partitions the data space into regions based upon voids in the data space. This contrasts with neural network data space partitions which essentially seek the histograms of the clusters before attempting to separate them. Saturation is the overwhelming effect that a well learned cluster has upon a poorly learned nearby cluster. If the two histograms are not different enough to cause a separation of these clusters, then the poorly learned histogram will be merged with the well learned histogram, resulting in a single cluster. Thus, the present invention seeks to separate clusters without attempting to identify the modes in the multidimensional histograms which characterize these clusters. Instead, the large gaps between the modes in the histogram are sought, and, only after this separation is finished, are the histograms used to determine the centers or modes of these clusters.

Accordingly, these limitations and disadvantages of the prior art are overcome with the present invention, and improved means and techniques are provided which are especially useful for clustering of large numbers of data points in continuous real numerical feature space by adaptively separating classes of patterns.

SUMMARY OF THE INVENTION

The present invention provides an improved means and method for clustering data points in continuous real numerical feature space by adaptively separating classes of patterns. In accordance with the preferred embodiment of the present invention, there is provided a fast fuzzy clustering technique, hereinafter referred to as "FFC" for convenience, whereby event classes, which can be characterized by real continuous features generated by high-resolution sensors, can be adaptively recognized in near real-time. In addition to being non-parametric, FFC has only one a priori requirement for each distribution which characterizes each class of events: each such distribution must have a central tendency in all of its features.

In order for FFC to perform in virtually real-time, there should preferably be a minimum of one processor per feature (See FIG. 26). This is in addition to an integrating processor. This plurality of processors operators independently of each other and should preferably be designed with an architecture capable of quickly ordering many thousands of integers. These processors could include content addressable memories to perform this ordering while reading the data. As will become apparent to those skilled in the art, FFC can execute with only one processor, but not in near real-time.

The distinction between real-time and near real-time is attributable to FFC's requiring a learning period of sufficient duration for the sampling of each class of events many times, whereby clusters may be calculated. As should be apparent to those skilled in the art, a low to medium event rate generally requires a longer sampling period than the computation of clusters in the second part of this learning period. Hence, near real-time specifically refers to the period of data collection and reduction, prior to real-time on-line classification. FFC requires that the learning sample be presented as a Gestalt. Accordingly, FFC attempts to discriminate classes of events only subsequent to the completion of the sampling period. It is generally assumed that classes of events are stationary, i.e., that the features characterizing each event class do not drift. If, however, such drifting of event classes occurs, it is preferable for FFC to periodically relearn the patterns, while a second Computer performs the classification. Thus, depending upon both amount of drift and the event rate, FFC may continuously learn while simultaneously classifying.

In accordance with the present invention, FFC learns to classify the events in a sample of a population without requiring a teacher. FFC adaptively recognizes and classifies events in a manner heretofore unknown in the art. More particularly, FFC learns to classify on the basis of this unsupervised learning period, and, unlike the prior art, does not require further information about the underlying distribution from an omniscient observer to define classes.

As will become clear to those skilled in the art, FFC learns to define classes by assuming the events belonging to the same class have similar features, and that events belonging to different classes have dissimilar features. In accordance with the present invention, for two events to be dissimilar, it is necessary that they differ on at least one feature. If two events agree with respect to all features, then it is assumed that they have measured events from the same class. Indeed, if such events approximately agree with respect to all features, it is further assumed that any differences are due to measurement error and noise.

The replication of measurements, required by the scientific method during an experimental verification of a theory, is an example of central tendency. Repeated measurements should clump or cluster around an ideal measurement. If this central tendency is normally distributed, the errors or measured differences from the "true" measurement are assumed to have a normal distribution. As is well known in the art, these errors are referred to as "noise". Of course, as suggested by the term "error," noise is generally regarded as being bad. Indeed, those skilled in the art, typically expend much effort to minimize the occurrence of noise.

Teaching contrary to the art, FFC advantageously exploits the occurrence of noise, and, indeed, requires the presence of noise to effectively cluster the underlying classes of data. Thus, under rare conditions in which there exists perfect central tendency, in the absence of noise, FFC cannot function.

As will hereinafter be described in detail, FFC distinguishes outlier events from events entrenched within their respective classes by a unique mini-max procedure that analyzes the sample population as a Gestalt. Ergo, FFC construes the outlier events as being diametrically disposed of the said events entrenched in their clusters.

The present invention provides an improved methodology for clustering real continuous features, which unlike discrete distributions, are characterized by a vector of real numbers with continuous frequency distributions. Such vectors are provided by features having at least sixteen (16) bits of resolution accurate to within one or two bits. The said distributions of each features having a central tendency dispersion, which is large in comparison with the analog-to-digital error. Thus, a class of events having no central tendency in one of its features is probably indicative of an irrelevant feature or of a family of classes instead of an individual, well-defined class.

It should also be apparent to those skilled in the art that central tendency makes no assumptions about the normality of the underlying population. For instances, it is clear that while normal distributions have a central tendency, not all central tendency is characterized by normal distributions, for example, the double exponential. FFC, in accordance with the present invention, using "gaps," clusters both normally distributed and abnormally distributed data.

To demonstrate the relationship between gaps and the combination of central tendency and cluster location, consider a hypothetical data space containing exactly two disposed classes of events, both possessing central tendencies on all features. It follows from the disposition of the classes that at least one feature contains two disposed distributions each possessing central tendency; otherwise, these event classes would not be disposed from each other in the data space. That is, two classes with the same location but different dispersions would not be disposed, e.g., one event class containing the other.

Consider further, the one dimensional graph of this disposed feature's values and focus upon the intervals or "gaps" between successive data points along this one dimensional graph. It follows from the disposition and the central tendencies of both distributions that there exists two distinct regions on this graph where these gaps have relatively short lengths. These two regions are separated by a middle region containing relatively longer gaps, as a result of disposition and central tendency. This third, middle region of long gaps can be used to partition the data space into two sections, each substantially containing a single event class. Thus, under the preferred embodiment of the present invention, it is assumed that event classes have distributions which are disposed from each other, and further, that the dispersions of these distributions possess central tendency. As should be apparent to those skilled in the art, this assumption assures the existence of relatively large and small gaps, which are the basis for the partition clustering methodology of the present invention.

Accordingly, the present invention provides an improved system for clustering data points in continuous real numerical feature space by adaptively separating classes of patterns.

It is an object of the present invention to provide a clustering methodology in which a distance metric is unnecessary.

It is an object of the present invention to provide a clustering methodology in which a feature scaling known in the prior art is unnecessary.

It is also an object of the present invention to provide a means and method of adaptively separating classes of patterns which is scalable, thereby enabling unlimited numbers of features to be used.

It is a further object of the present invention to provide a clustering methodology which overcomes the inherent limitations of saturation in neural networks.

It is an object and feature of the present invention that a means and method is provided which advantageously exploits the presence of noise inherent in data gathering to not only classify data points into clusters, but also measure the certainty of the classification for each data point.

It is also an object of the present invention to identify outlier and spurious data points in a data space.

It is also an advantage and feature of the present invention that classes of patterns may be adaptively separated and clustered in near real-time on huge data spaces having unlimited numbers of features.

It is a further object of the present invention to provide a system in which the events constituting a data space are analyzed and partioned as a Gestalt, whereby gaps are used as indicia of the placement of clusters in the underlying data space.

It is to another object and feature of the present invention that a system for clustering data points in continuous real numerical feature space by adaptively separating classes of patterns is provided in which no a priori knowledge of the underlying distributions is necessary.

It is yet another feature and object of the present invention that a means and method is provided for clustering data spaces in which unsupervised learning enables classes of patterns to be separated adaptively.

It is yet another object of the present invention to provide a dynamic measure of fuzz, whereby cluster centers and concomitant outlier events may be readily identified.

It is yet another object of the present invention to provide a means and method for prescreening data to separate spurious data points from non-spurious but unexpected clusters.

It is a specific object of the present invention to provide a parallel processing computer system for clustering N data points in continuous M-dimensional feature space by adaptively separating classes of patterns, comprising: decomposing said M-dimensional feature space into M 1-dimensional feature spaces, with each said 1-dimensional feature space having a range of feature values; linearly scaling said range of feature values in each said 1-dimensional feature space between the range of integers expressible on said parallel processing computer system, and then assigning one of said integers to each said feature value in each said feature space; ordering each said feature value in each of said 1-dimensional feature spaces in ascending sort sequence; calculating the gap lengths for said ordered feature values by subtracting each said ordered feature value from its successive feature value, to obtain a sequence of $N-1$ said gap lengths for each said M 1-dimensional feature space; partially-ordering said gap lengths within each of said 1-dimensional feature spaces by segregating a first portion of the smallest of said gap lengths and further segregating a second portion of the largest of said gap lengths; selecting a plurality of tentative split-gaps from said partially-ordered gap lengths by searching said first portion of the smallest of said gap lengths as a Gestalt for the extreme left mode and the extreme right mode thereof, and searching said second portion of the largest of said gap lengths sequentially from the largest to the smallest thereof, until a gap length corresponding to a tentative said split-gap is obtained which is disposed medially of said extreme left mode and said extreme right mode; further selecting a split-gap from said plurality of tentative split-gaps by picking a split-gap corresponding to the substantially largest of said plurality of tentative split-gaps; splitting a portion of said N data points corresponding to said split-gap on its associated feature; and iteratively repeating said calculating, partially-ordering, selecting and splitting steps until said classes of patterns are separated.

These and other objects and features of the present invention will become apparent from the following detailed description, wherein reference is made to the figures in the accompanying drawings.

IN THE DRAWINGS

FIG. 5A depicts a two dimensional plot of a twelve event data space with the sampled values of two features and also the first split-gap ascertained during the first pass of FFC.

FIG. 5B tabulates data values for two features and their respective orders in ascending value, for the first pass of FFC depicted in FIG. 5A.

FIG. 5C tabulates gap lengths for two features and their respective orders in ascending gap lengths, for the first pass of FFC depicted in FIG. 5A.

FIG. 5D tabulates modes, tentative split-gaps, and split-indexes for two features, for the first pass of FFC depicted in FIG. 5A.

FIG. 5E tabulates events and the MAP permutation used during Unmerge, for the first pass of FFC depicted in FIG. 5A.

FIG. 5F tabulates the result of applying permutation MAP to the tables EVENTS, MAT, and LINK1 and also the result of Unmerging MAPLINK1, for the first pass of FFC depicted in FIG. 5A.

Figure 6A:
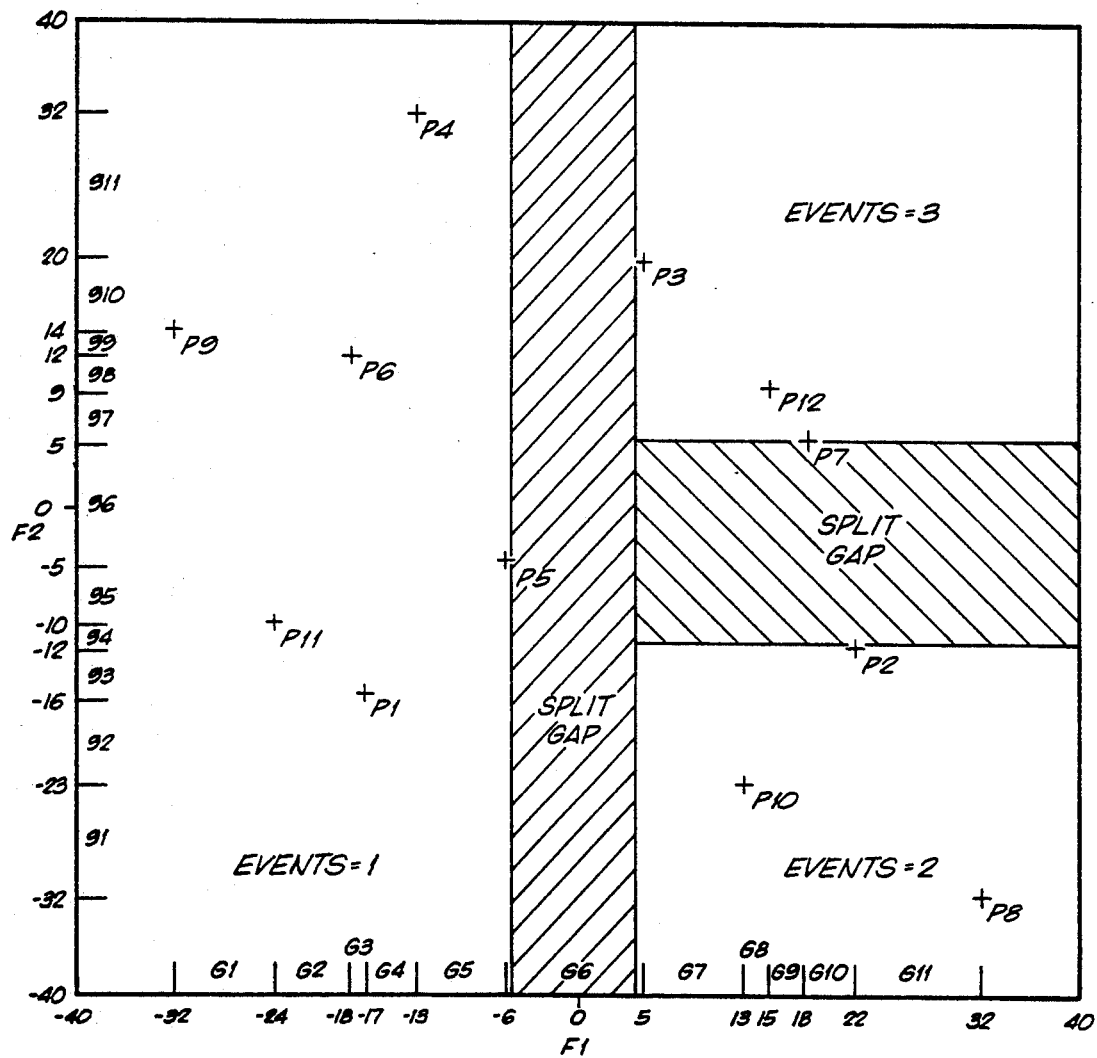

FIG. 6A depicts a two dimensional plot of a twelve event data space with the sampled values of two features and also the second Split-gap as ascertaining during the second pass of FFC.

FIG. 6B tabulates data values for two features and their respective orders in ascending value, for the second pass of FFC depicted in FIG. 6A.

FIG. 6C tabulates gap lengths for two features and their respective orders in ascending gap lengths, for the second pass of FFC depicted in FIG. 6A.

FIG. 6D tabulates modes, tentative split-gaps, and split-indexes for two features, for the second pass of FFC depicted in FIG. 6A.

FIG. 6E tabulates events and the MAP permutation used during Unmerge, for the second pass of FFC depicted in FIG. 6A.

FIG. 6F tabulates the result of applying permutation MAP to the tables EVENTS, MAT, and LINK1 and also the result of Unmerging MAPLINK1, for the second pass of FFC depicted in FIG. 6A.

Figure 7A:
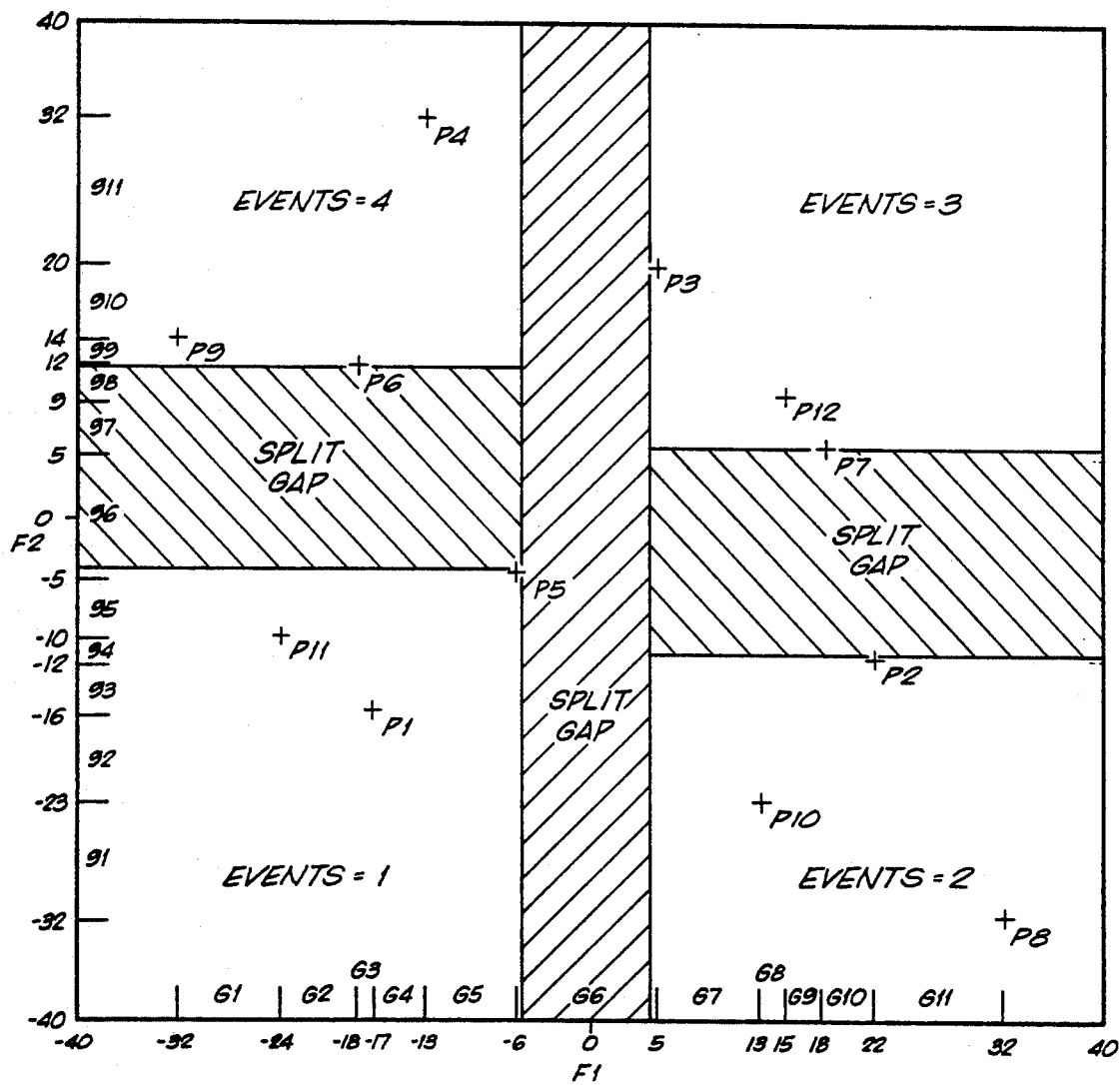

FIG. 7A depicts a two dimensional plot of a twelve event data space with the sampled values of two features and also the third split-gap ascertained during the third pass of FFC.

FIG. 7B tabulates data values for two features and their respective orders in ascending value, for the third pass of FFC depicted in FIG. 7A.

FIG. 7C tabulates gap lengths for two features and their respective orders in ascending gap lengths, for the third pass of FFC depicted in FIG. 7A.

FIG. 7D tabulates modes, tentative split-gaps, and split-indexes for two features, for the third pass of FFC depicted in FIG. 7A.

FIG. 7E tabulates events and the MAP permutation used during Unmerge, for the third pass of FFC depicted in FIG. 7A.

FIG. 7F tabulates the result of applying permutation MAP to the tables EVENTS, MAT, and LINK1 and also the result of Unmerging MAPLINK1, for the third pass of FFC depicted in FIG. 7A.

FIG. 8A depicts a two dimensional plot of a twelve event data space with the sampled values of two features and the final clusters, ascertained during the fourth pass of FFC.

FIG. 8B tabulates data values for two features and their respective orders in ascending value, for the fourth pass of FFC depicted in FIG. 8A.

FIG. 8C tabulates gap lengths for two features and their respective orders in ascending gap lengths, for the fourth pass of FFC depicted in FIG. 8A.

FIG. 8D is a tabulation depicting that no modes, tentative split-gaps, or split-indexes were found for two features, for the fourth pass of FFC depicted in FIG. 8A.

FIG. 9 tabulates the history of FFC splits for the twelve point example depicted in FIG. 5A.

FIG. 10 tabulates the history of FFC splits for the 400 point example.

Figure 11:
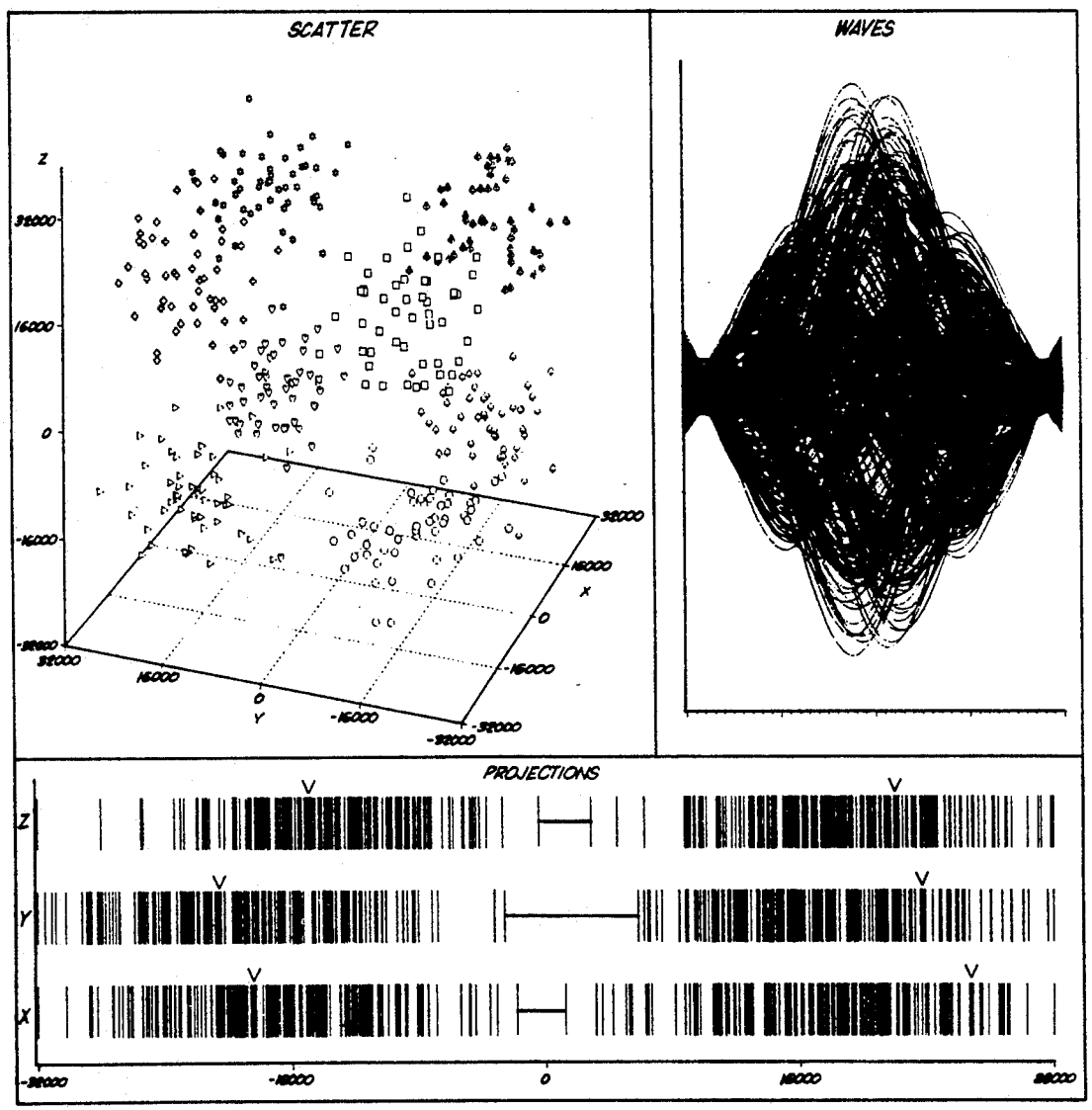

FIG. 11 depicts a tripartite representation of a 400 data point three-dimensional Euclidean space in equivalent scatter diagram and wave forms, and corresponding one-dimensional projections, of cluster 1 during pass 1 of the preferred embodiment of the present invention.

Figure 12:
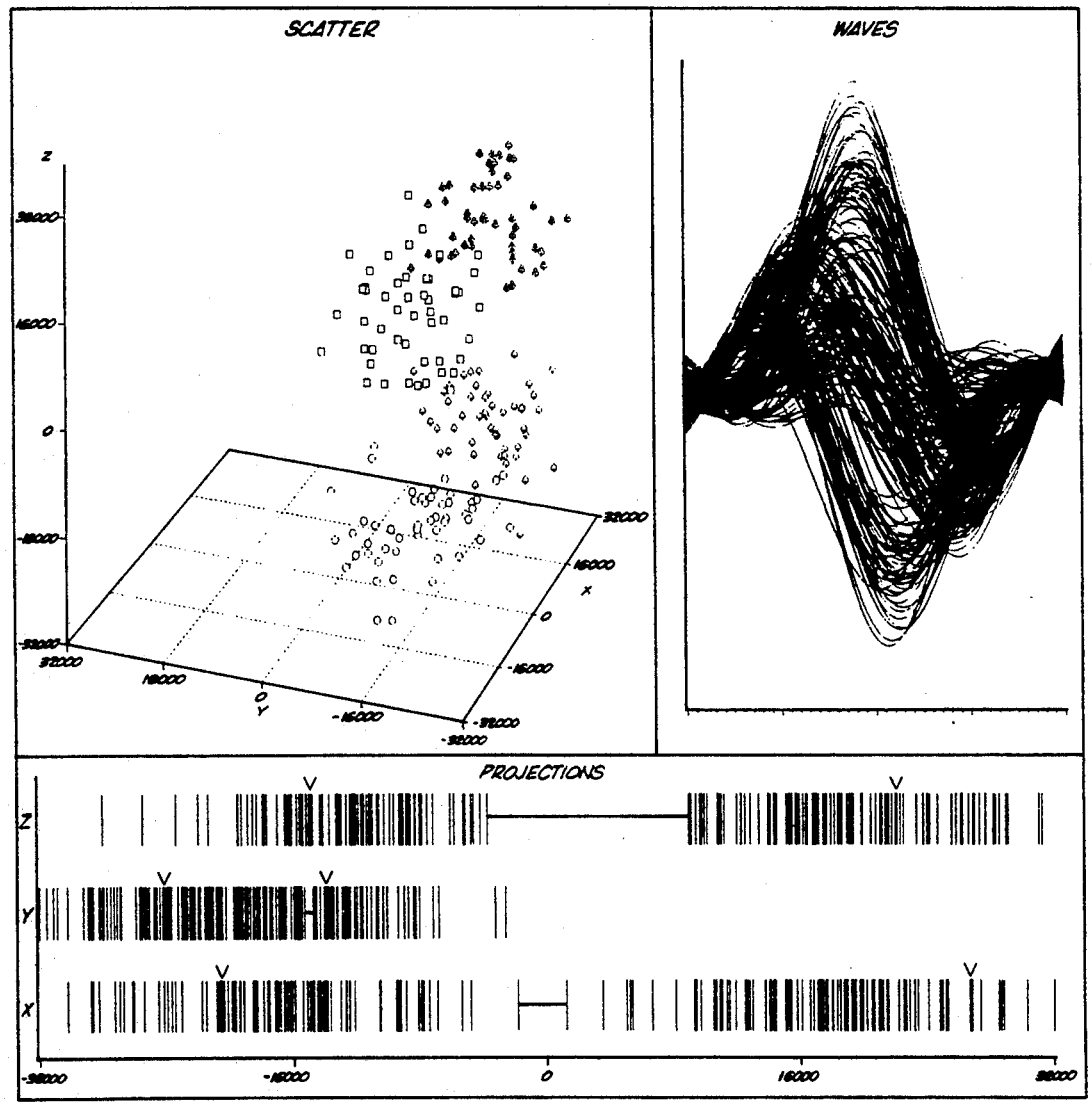

FIG. 12 depicts a tripartite representation of a 400 data point three-dimensional Euclidean space in equivalent scatter diagram and wave forms, and corresponding one-dimensional projections, of cluster 1 during pass 2 of the preferred embodiment of the present invention.

Figure 13:
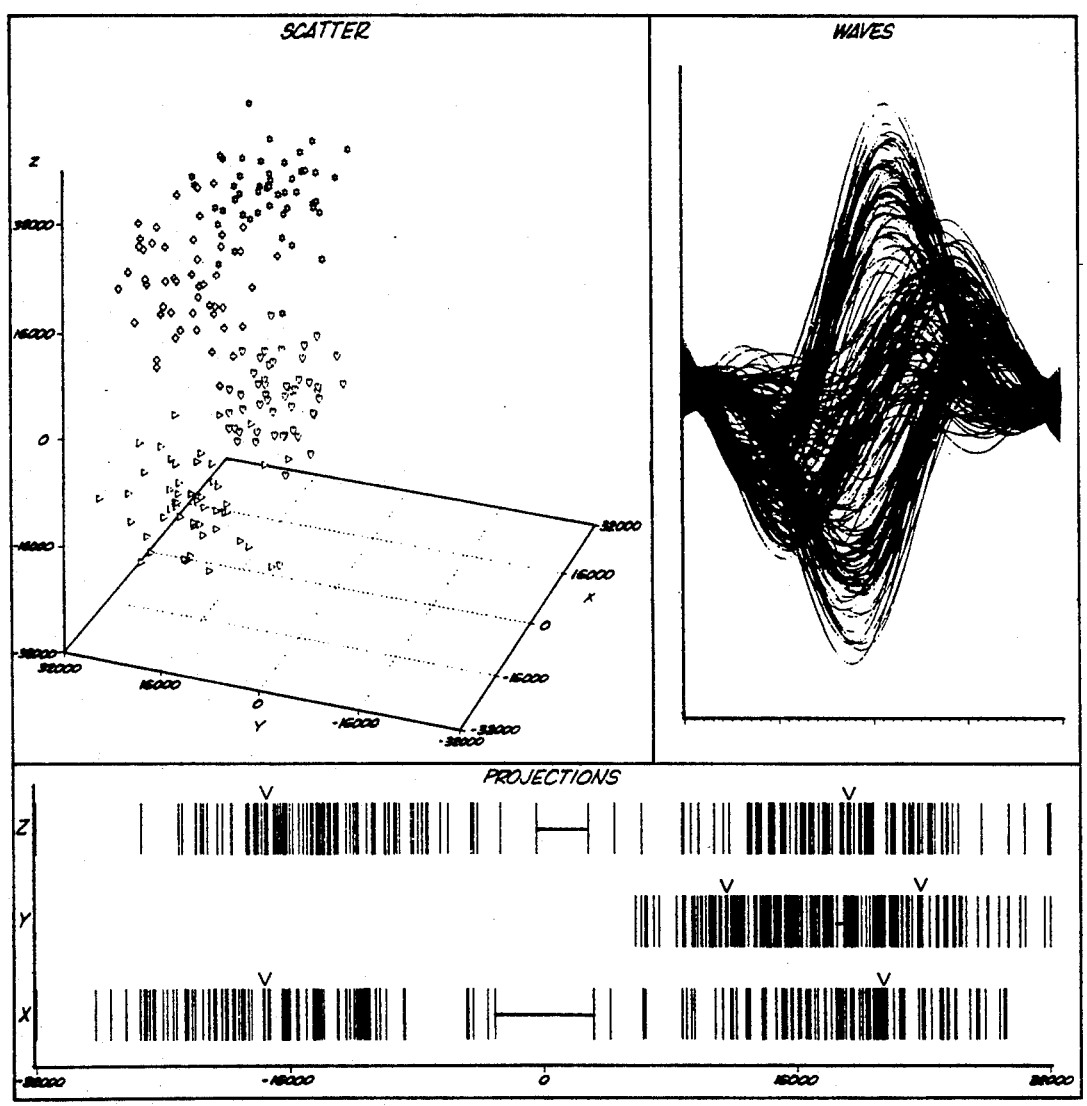

FIG. 13 depicts a tripartite representation of a 400 data point three-dimensional Euclidean space in equivalent scatter diagram and wave forms, and corresponding one-dimensional projections, of cluster 2 during pass 2 of the preferred embodiment of the present invention.

Figure 14:
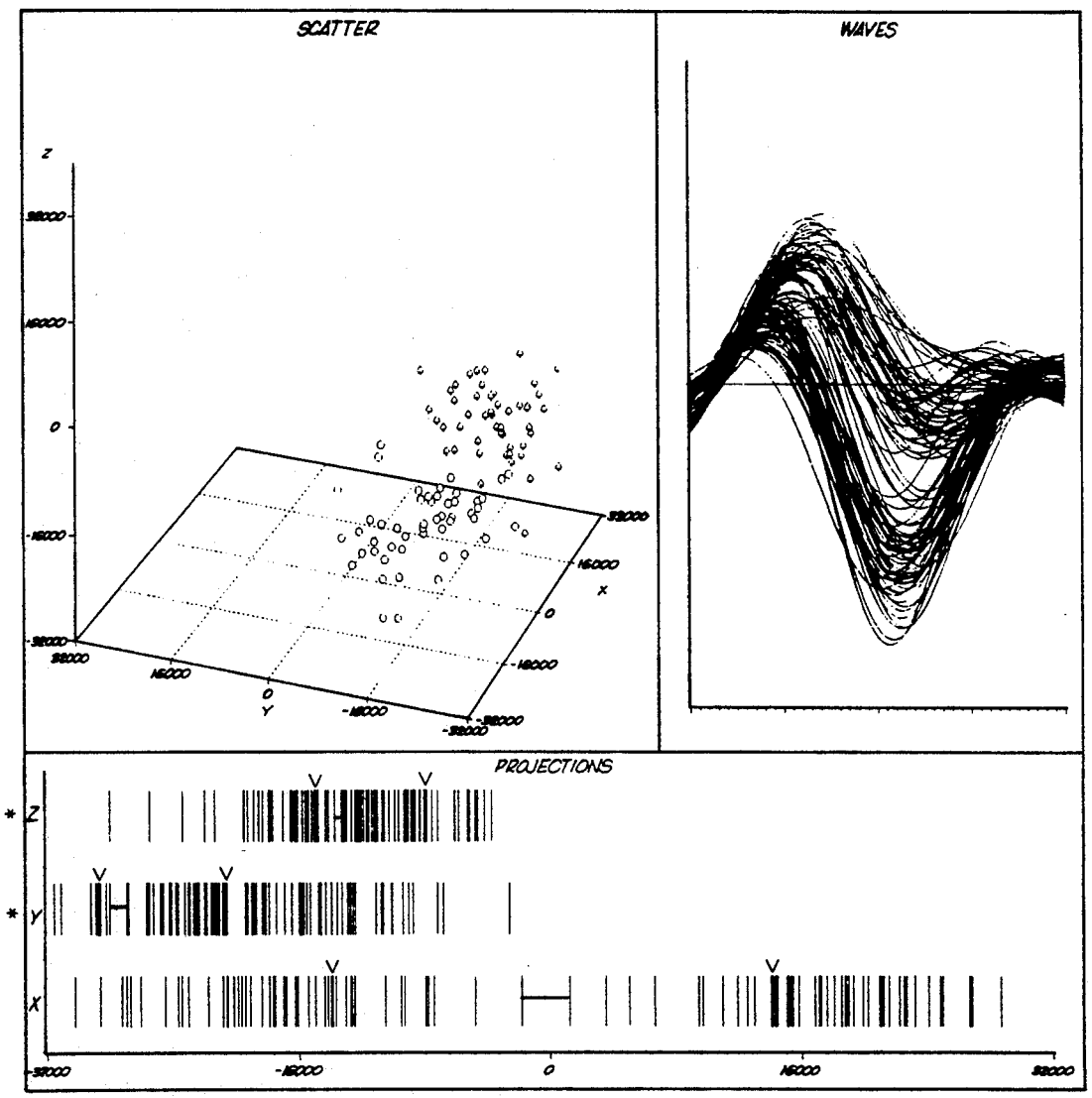

FIG. 14 depicts a tripartite representation of a 400 data point three-dimensional Euclidean space in equivalent scatter diagram and wave forms, and corresponding one-dimensional projections, of cluster 1 during pass 3 of the preferred embodiment of the present invention.

Figure 15:
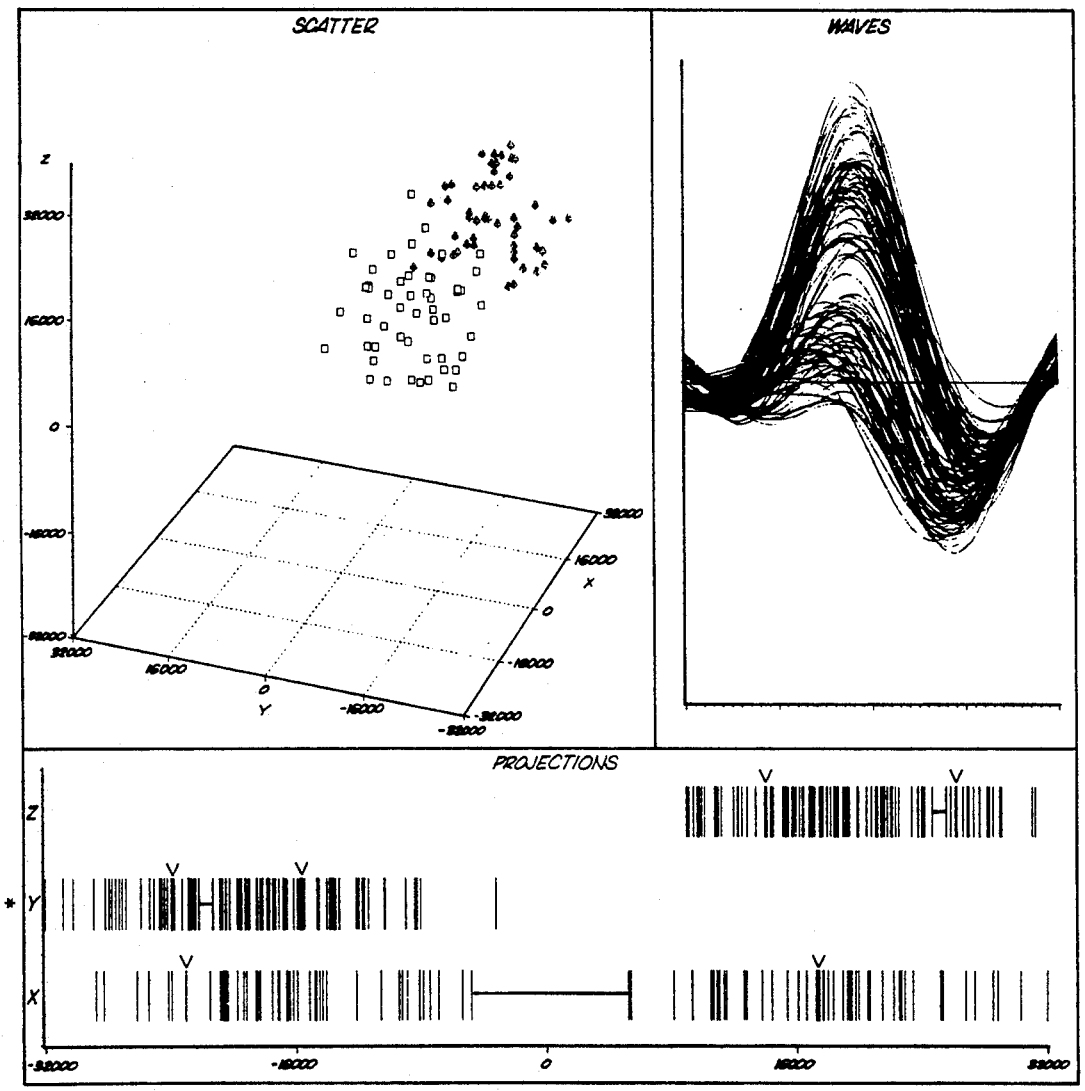

FIG. 15 depicts a tripartite representation of a 400 data point three-dimensional Euclidean space in equivalent scatter diagram and wave forms, and corresponding one-dimensional projections, of cluster 3 during pass 3 of the preferred embodiment of the present invention.

Figure 16:
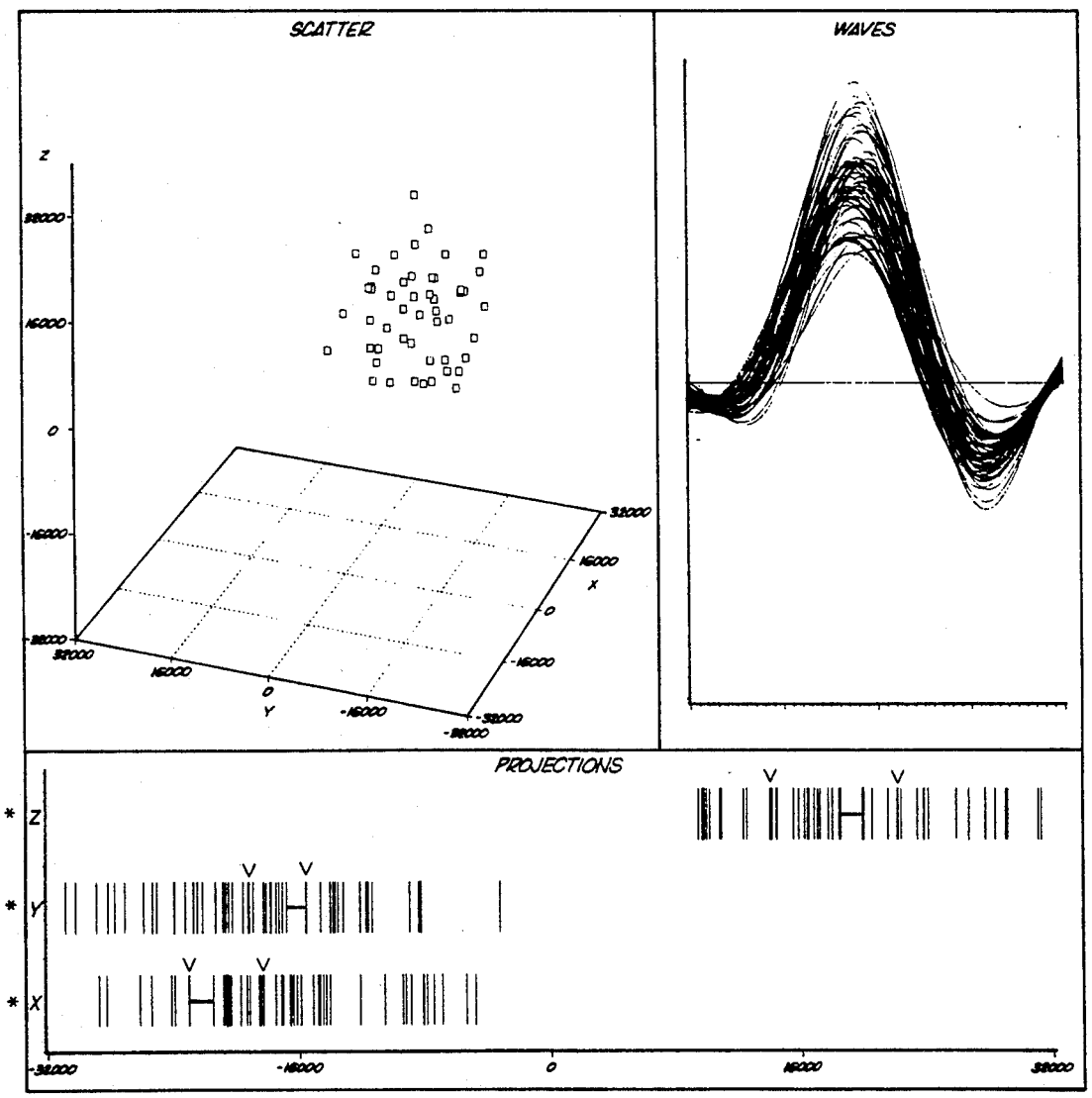

FIG. 16 depicts a tripartite representation of a 400 data point three-dimensional Euclidean space in equivalent scatter diagram and wave forms, and corresponding one-dimensional projections, of cluster 3 during pass 4 of the preferred embodiment of the present invention.

Figure 17:
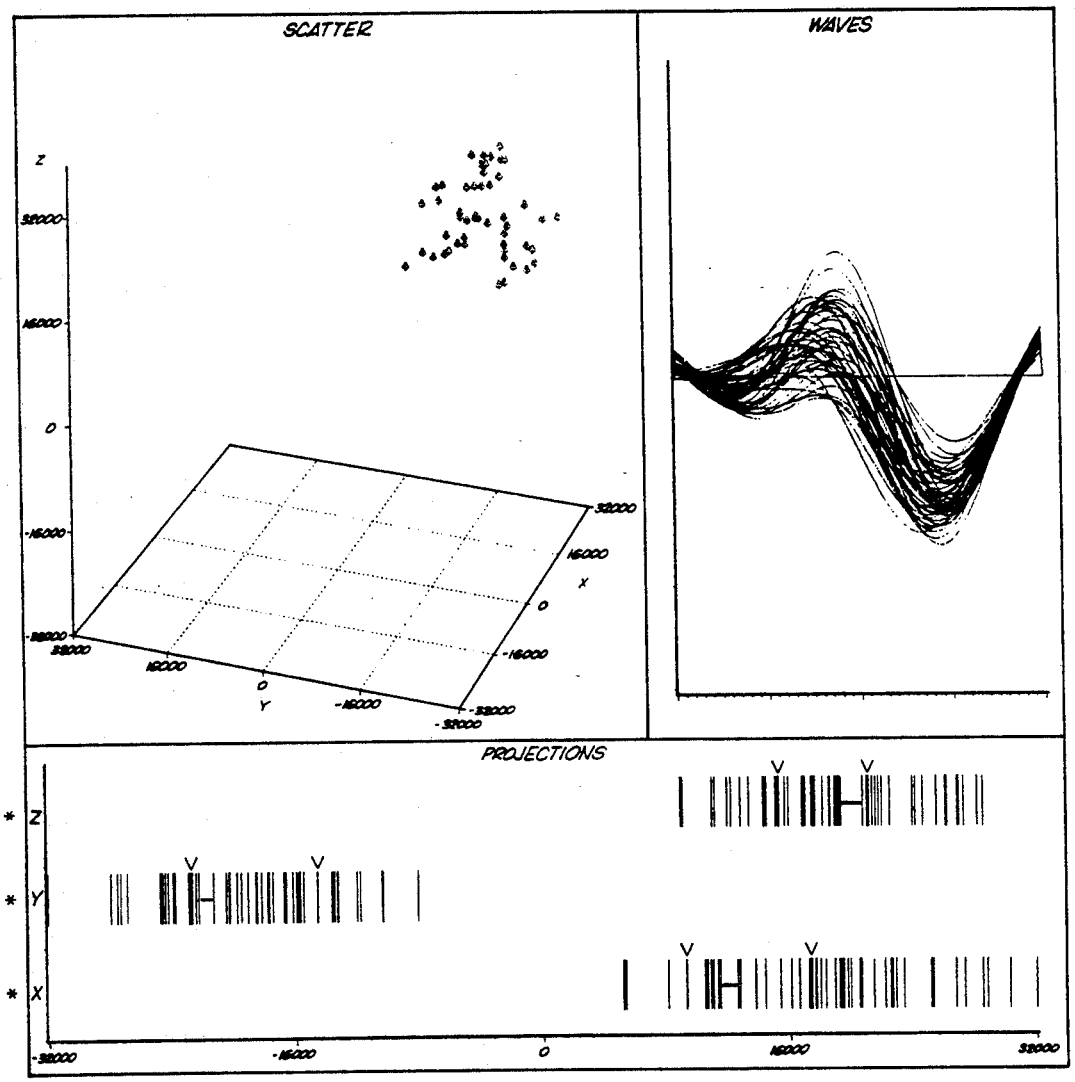

FIG. 17 depicts a tripartite representation of a 400 data point three-dimensional Euclidean space in equivalent scatter diagram and wave forms, and corresponding one-dimensional projections, of cluster 4 during pass 4 of the preferred embodiment of the present invention.

Figure 18:
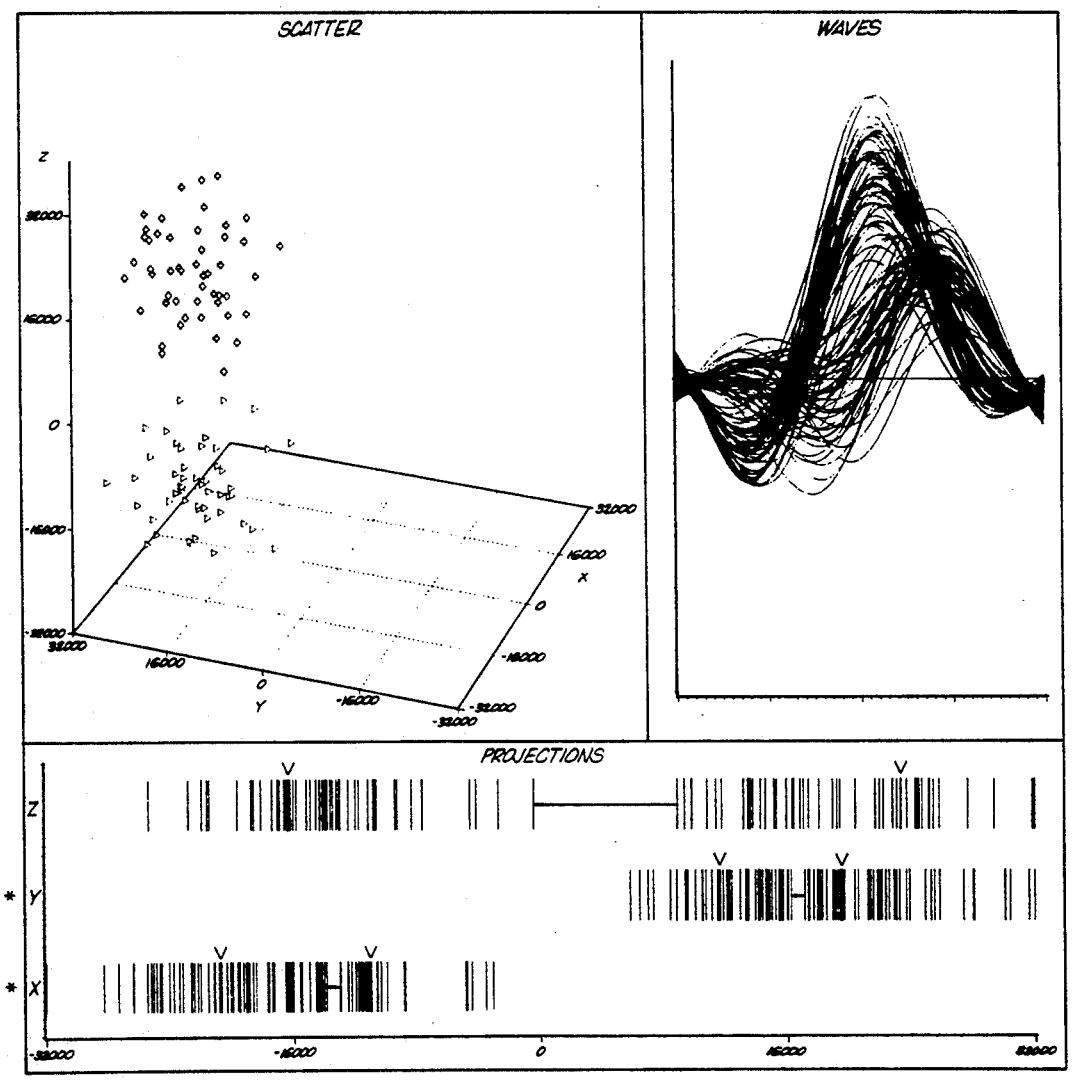

FIG. 18 depicts a tripartite representation of a 400 data point three-dimensional Euclidean space in equivalent scatter diagram and wave forms, and corresponding one-dimensional projections, of cluster 2 during pass 5 of the preferred embodiment of the present invention.

Figure 19:
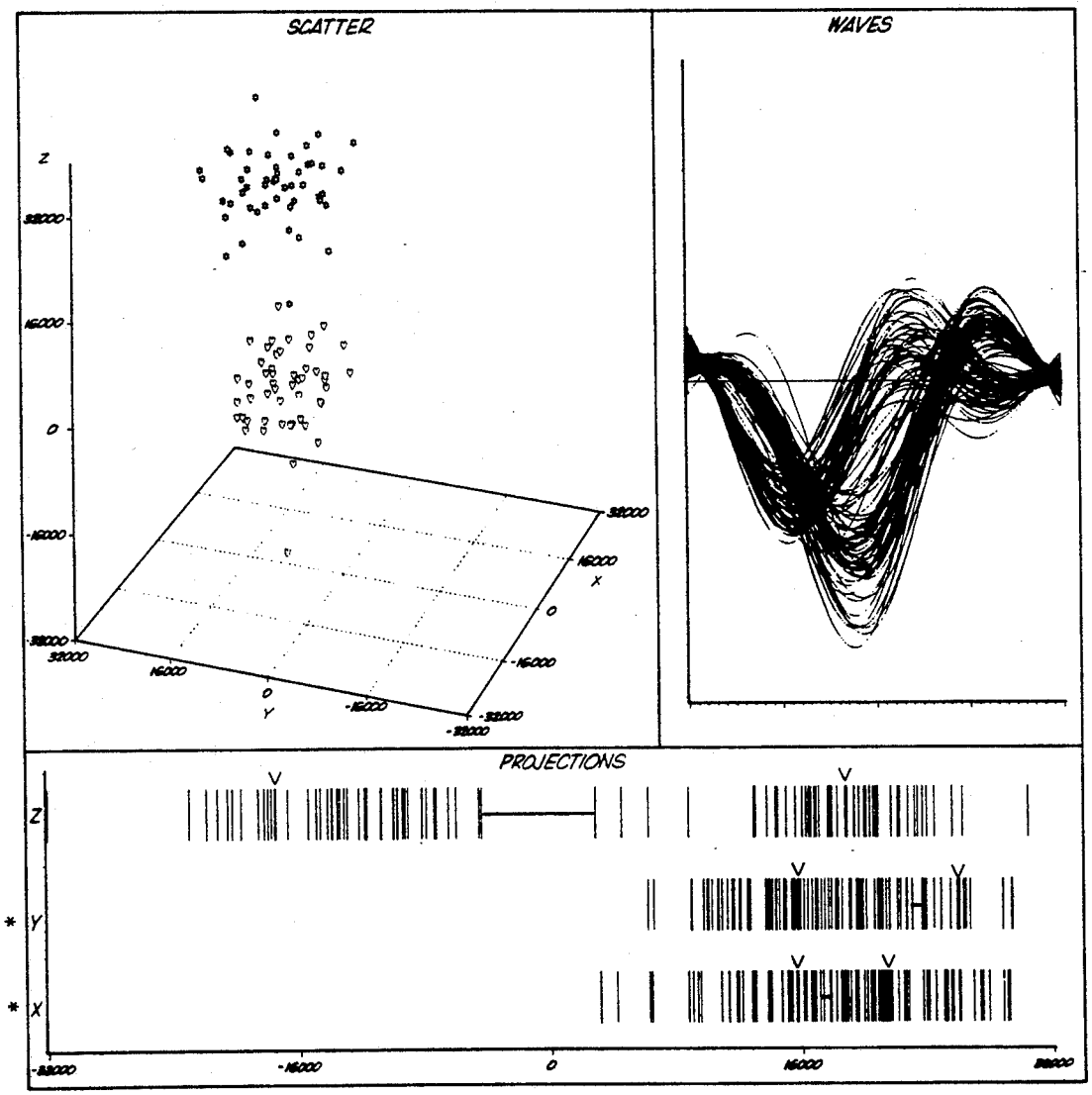

FIG. 19 depicts a tripartite representation of a 400 data point three-dimensional Euclidean space in equivalent scatter diagram and wave forms, and corresponding one-dimensional projections, of cluster 5 during pass 5 of the preferred embodiment of the present invention.

Figure 20:
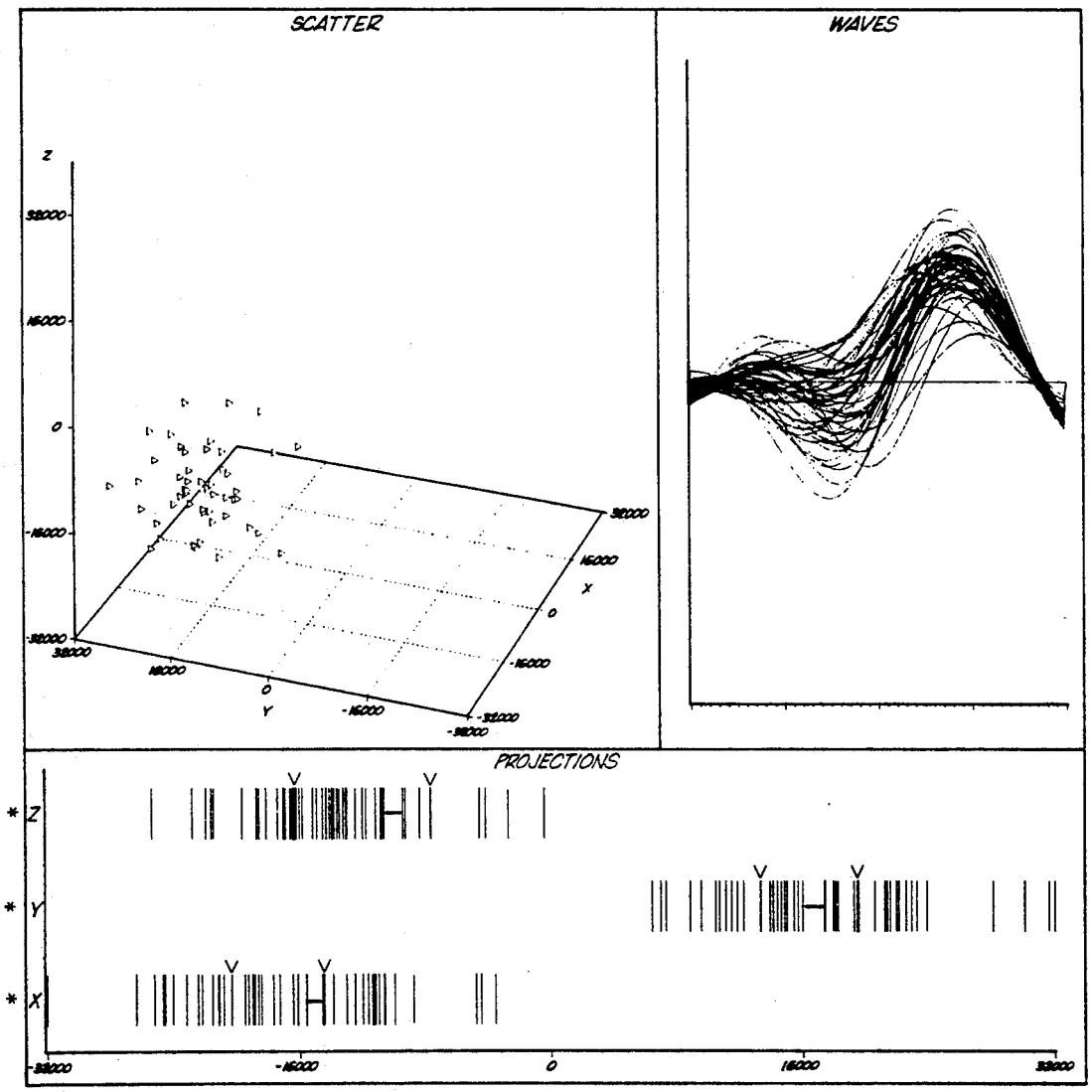

FIG. 20 depicts a tripartite representation of a 400 data point three-dimensional Euclidean space in equivalent scatter diagram and wave forms, and corresponding one-dimensional projections, of cluster 2 during pass 6 of the preferred embodiment of the present invention.

Figure 21:
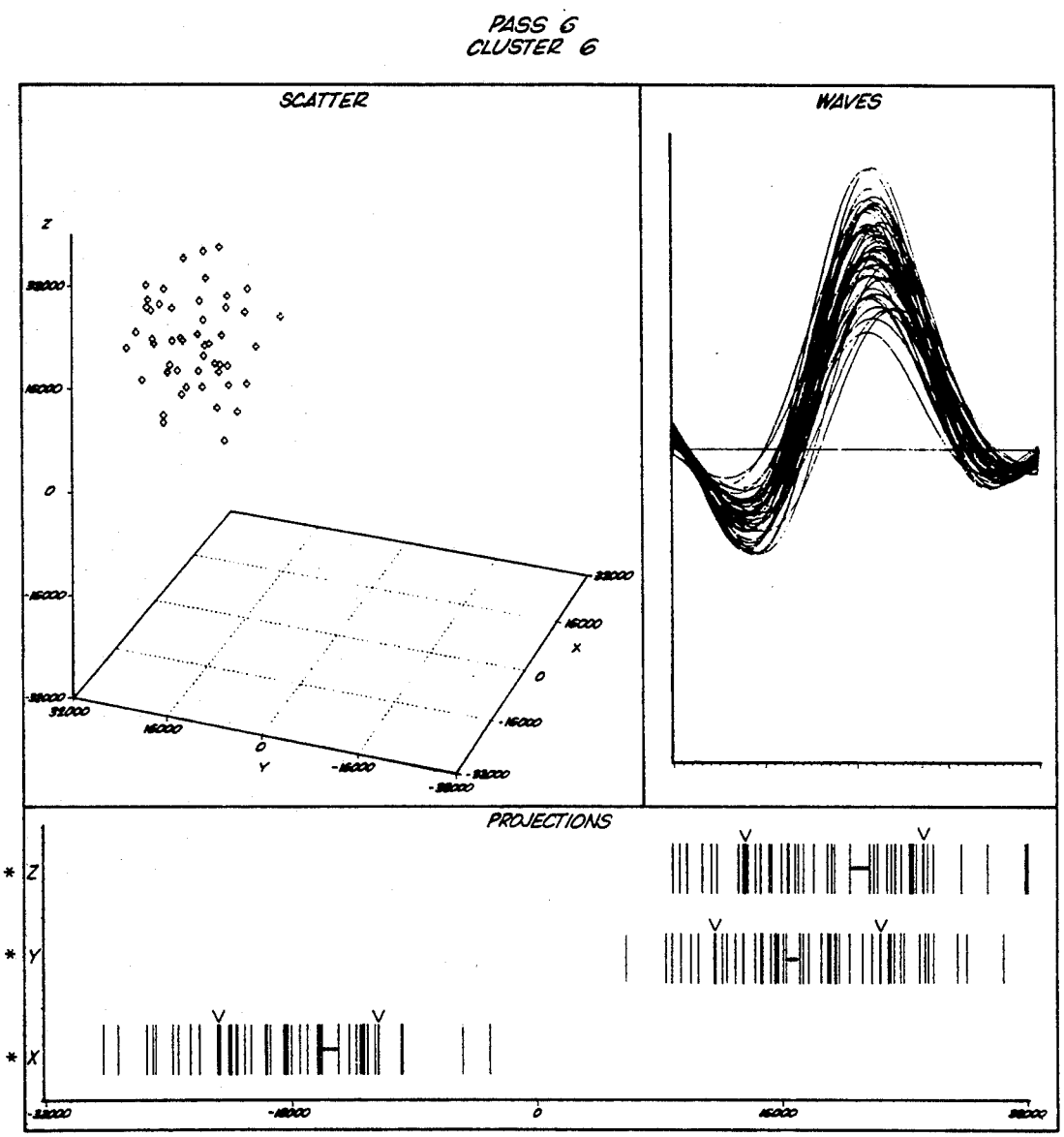

FIG. 21 depicts a tripartite representation of a 400 data point three-dimensional Euclidean space in equivalent scatter diagram and wave forms, and corresponding one-dimensional projections, of cluster 6 during pass 6 of the preferred embodiment of the present invention.

Figure 22:
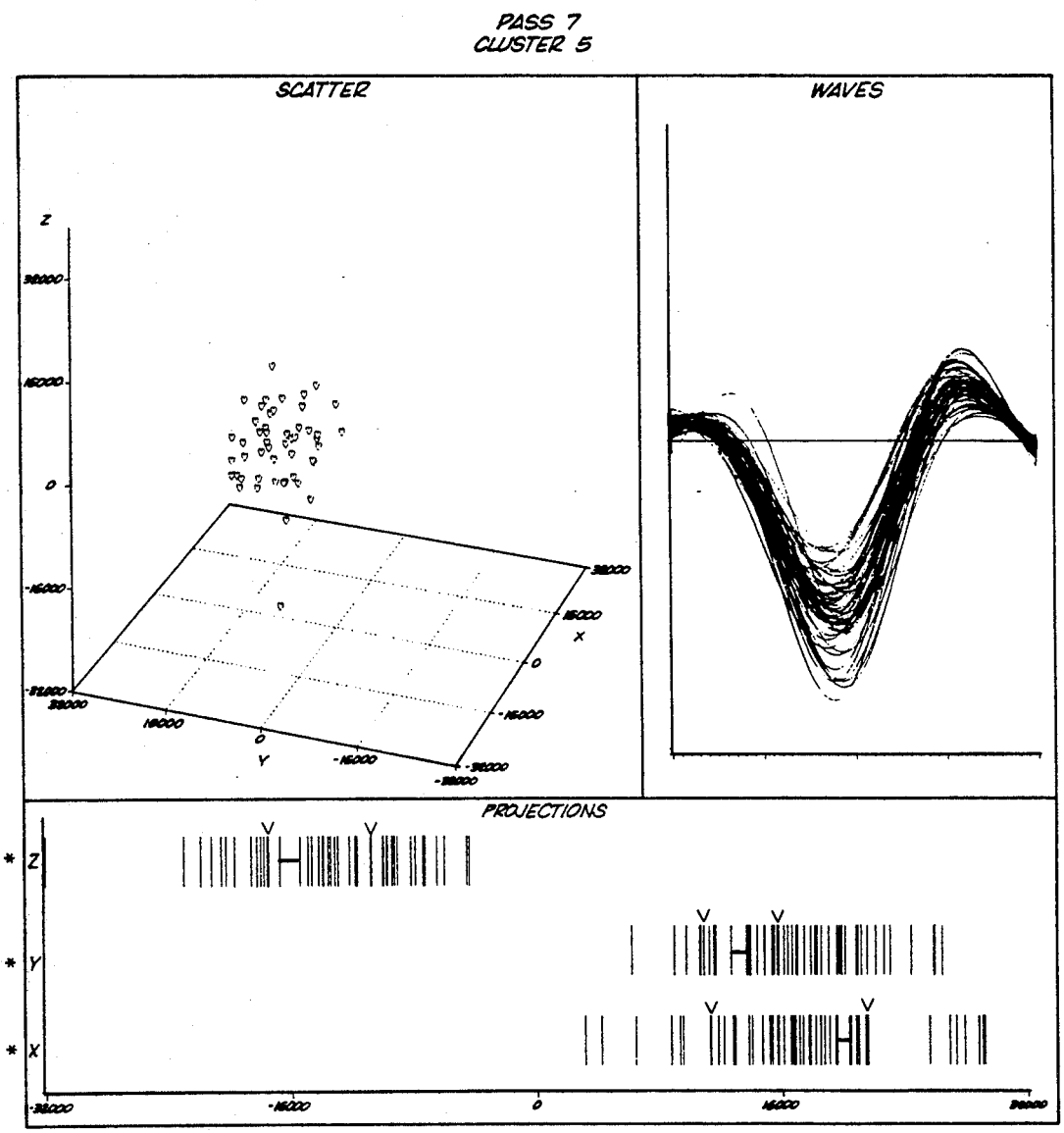

FIG. 22 depicts a tripartite representation of a 400 data point three-dimensional Euclidean space in equivalent scatter diagram and wave forms, and corresponding one-dimensional projections, of cluster 5 during pass 7 of the preferred embodiment of the present invention.

Figure 23:
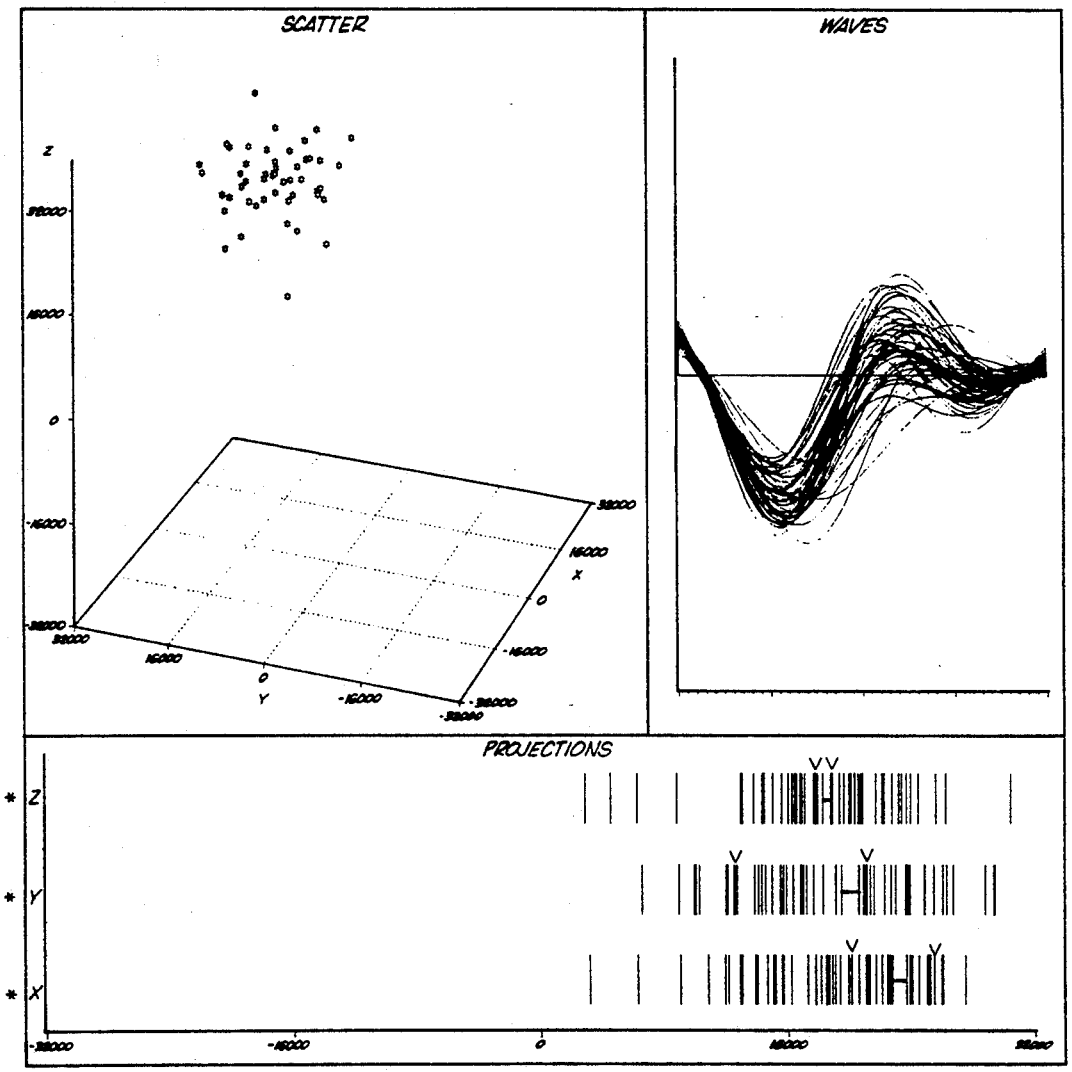

FIG. 23 depicts a tripartite representation of a 400 data point three-dimensional Euclidean space in equivalent scatter diagram and wave forms, and corresponding one-dimensional projections, of cluster 7 during pass 7 of the preferred embodiment of the present invention.

Figure 24:
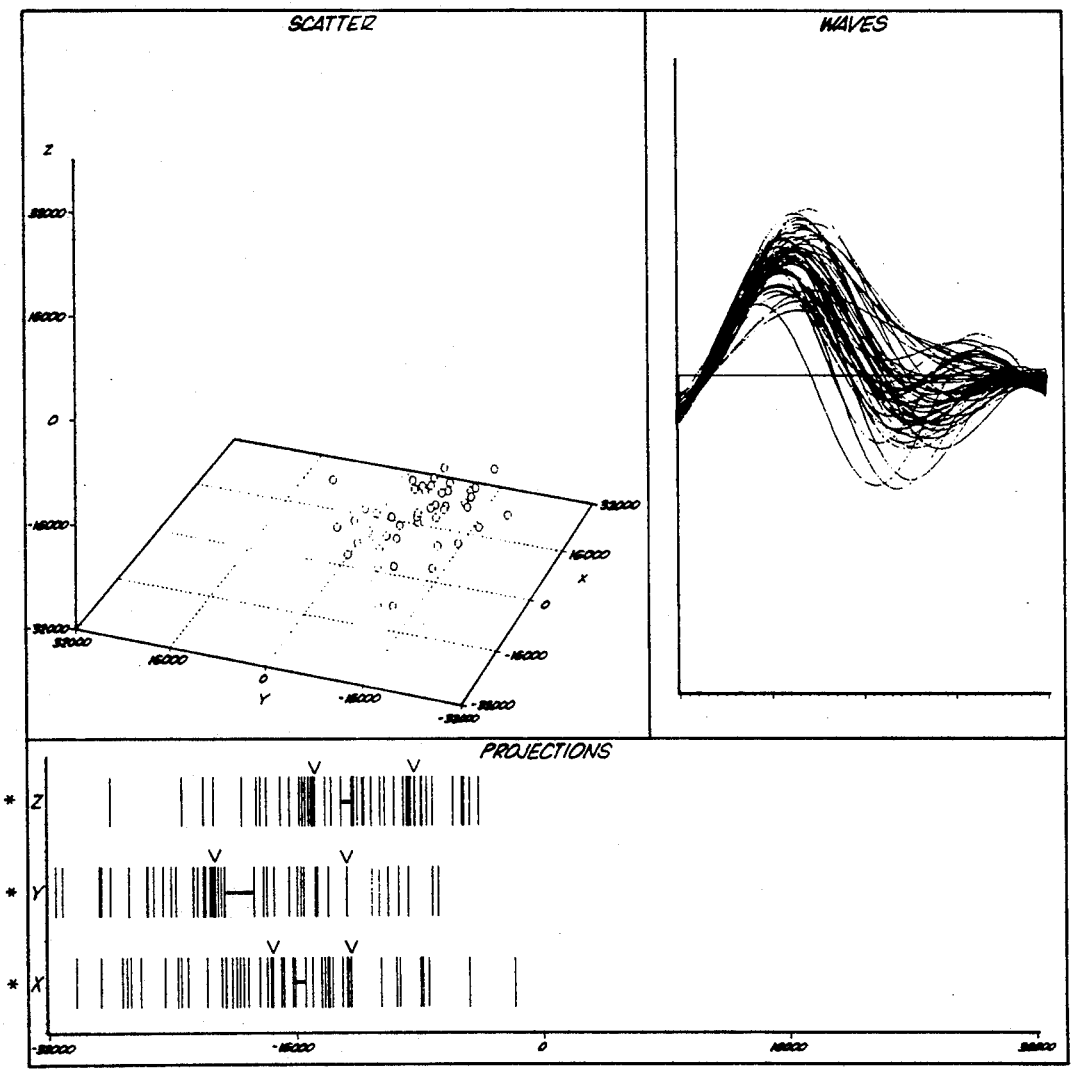

FIG. 24 depicts a tripartite representation of a 400 data point three-dimensional Euclidean space in equivalent scatter diagram and wave forms, and corresponding one-dimensional projections, of cluster 1 during pass 8 of the preferred embodiment of the present invention.

Figure 25:
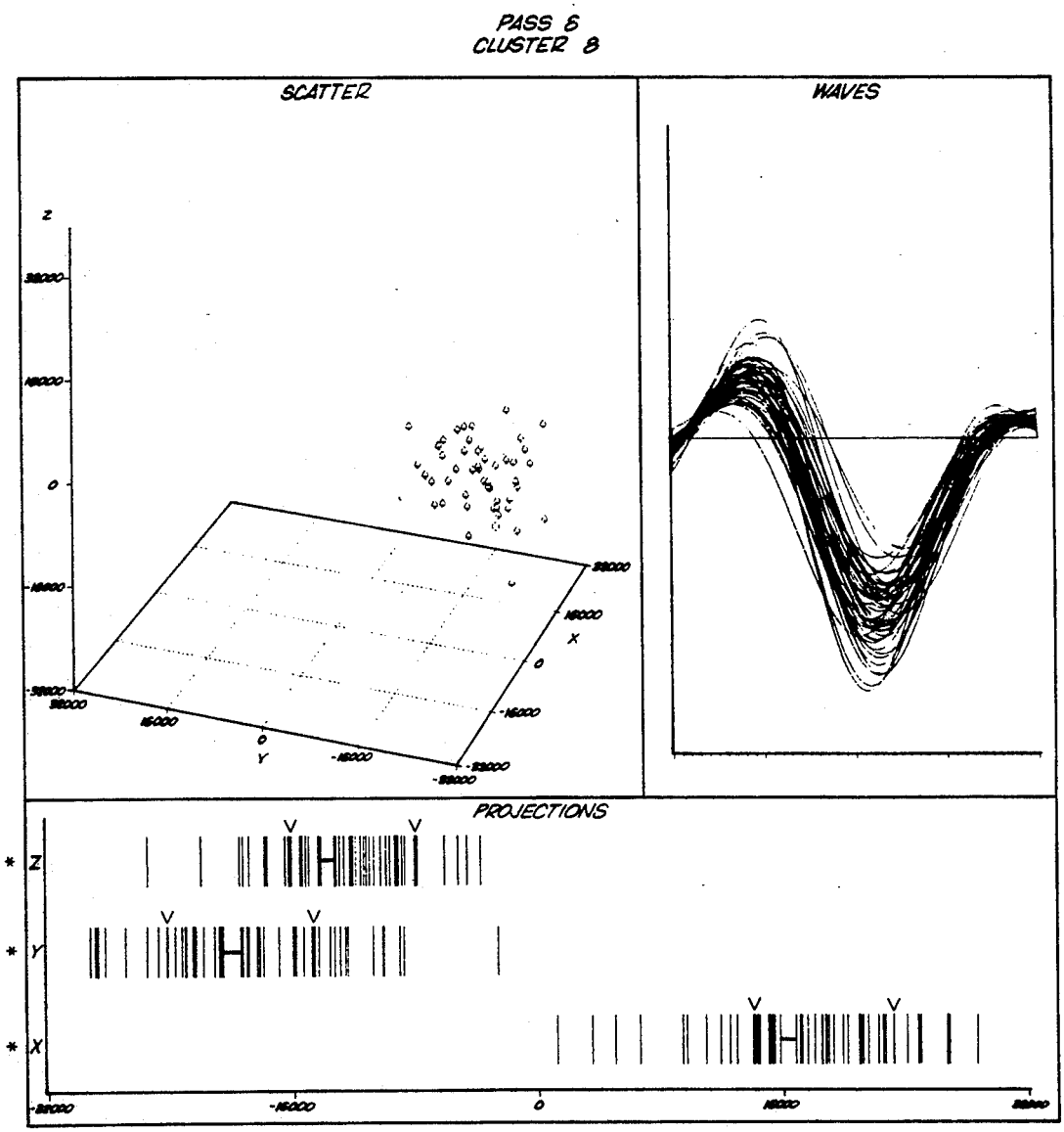

FIG. 25 depicts a tripartite representation of a 400 data point three-dimensional Euclidean space in equivalent scatter diagram and wave forms, and corresponding one-dimensional projections, of cluster 8 during pass 8 of the preferred embodiment of the present invention.

Figure 26:
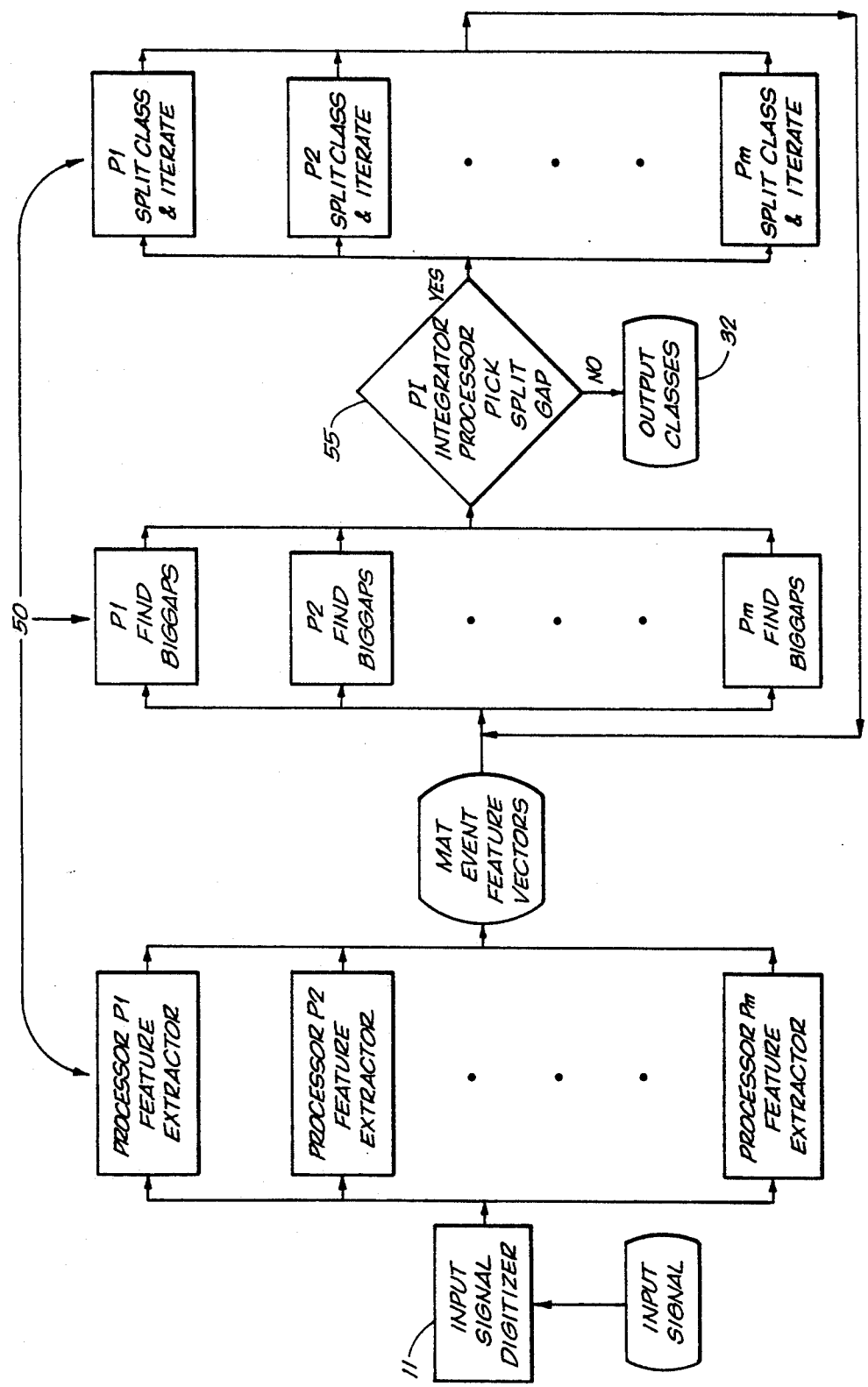

FIG. 26 is a block diagram depicting the plurality of processors of the present invention.

Figure 27:
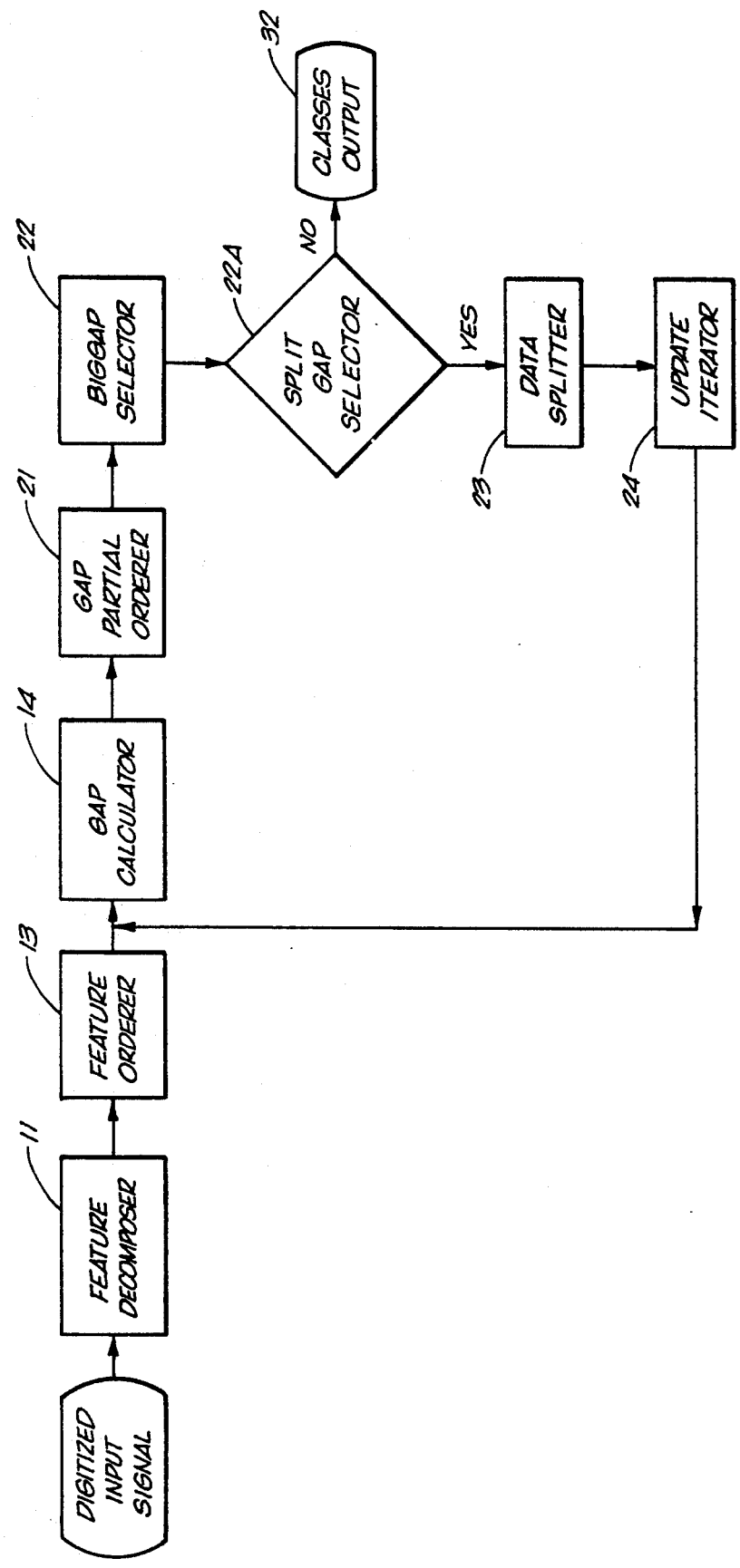

FIG. 27 is a block diagram depicting the means for performing the parallel processing in each of the plurality of processors depicted in FIG. 26.

DETAILED DESCRIPTION

Now referring to FIG. 26, there is shown a block diagram depicting plurality of processors 50 embodying the preferred embodiment of the present invention. Input analog signals are collected real-time and converted to digital signals in digitizer block 11. These digitized signals are then input into plurality of processors 50. As will become apparent to those skilled in the art, it is advantageous to have a minimum of one such processor per feature. Each processor depicted by blocks $P_1, P_2, \ldots P_M$ of plurality of parallel processors 50, in a manner well known in the art, operates independently of each other and should preferably be capable of quickly ordering many thousands of integers. In accordance with the present invention, while FFC may be executed with only one processor, to accomplish the adaptive separation of classes of patterns in substantially real-time, a plurality of parallel processors comprising blocks $P_1, P_2, \ldots P_M$ should be used. (Note identify the remaining blocks in this figure). Referring now to FIG. 27, there is shown a block diagram depicting the various means for performing the clustering methodology taught by the present invention for separating classes of patterns, by each of the plurality of processors depicted in FIG. 26. The means for performing each of these processing steps are provided by one or more of the processors depicted in FIG. 26.

Figure 1:
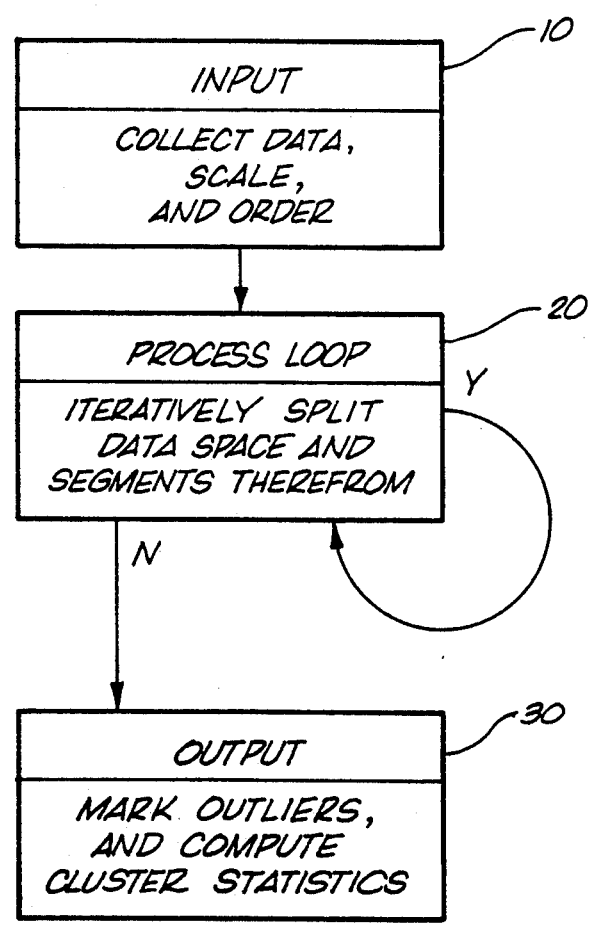
FIG. 1 is a block diagram depicting the input, processing, and output aspects of the present invention.

Referring to FIG. 1, there is shown a block diagram depicting input 10, processing 20, and output 30 blocks which comprise the fast fuzzy clustering means and method taught by the present invention. More particularly, input block 10 comprises collecting and scaling raw data, and then preparing it for iterative processing block 20 by ordering the data, as hereinafter described in detail. Process loop block 20 comprises iteratively splitting a data space into segments as will be hereinafter described in detail, in a manner heretofore unknown in the art. As depicted in FIG. 1, the iterative processing in block 20, continues until particular criterial are satisfied. Then, in output block 30, outliers in the data space are marked as such and statistics for the clustered data space are computed and output as appropriate.

Figure 2:
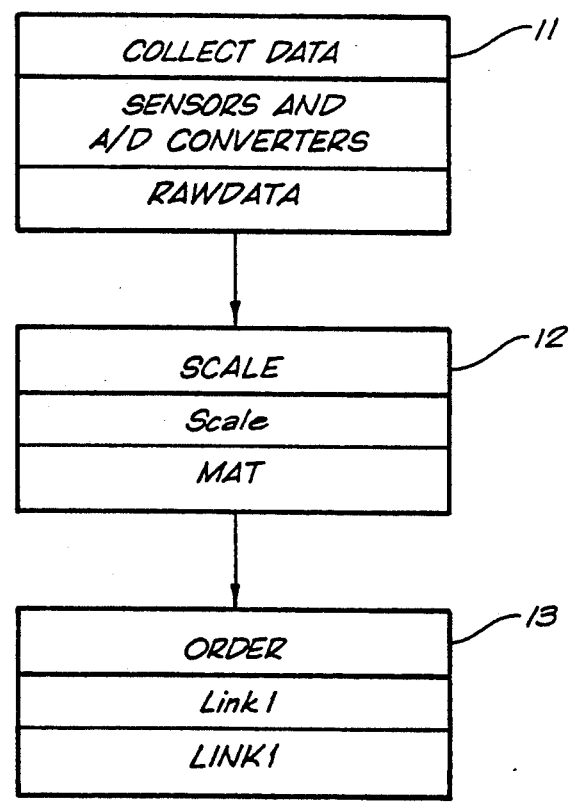
FIG. 2 is a block diagram depicting the steps comprising the input aspects of the present invention.

Now referring to FIG. 2, there is depicted, in accordance with the present invention, the steps comprising input block 10 depicted in FIG. 1. In particular, in data collection block 11 raw data in analog form is collected by conventional sensors and converted into digital form for processing on a digital computer. This converted data is stored in matrix RAWDATA. Next, in block 12, the data stored in matrix RAWDATA is scaled in module Scale and then stored in matrix MAT. As will be hereinafter described in detail, the MAT data is ordered in module Link1 (block 13) and the corresponding matrix MAT indices are, in turn, stored in matrix LINK1.

For clarity herein, a matrix will be represented in upper case letters, e.g., MAT or LINK1, while functional modules or subroutines will be represented in upper and lower case, e.g., Scale or Link1.

Figure 3:
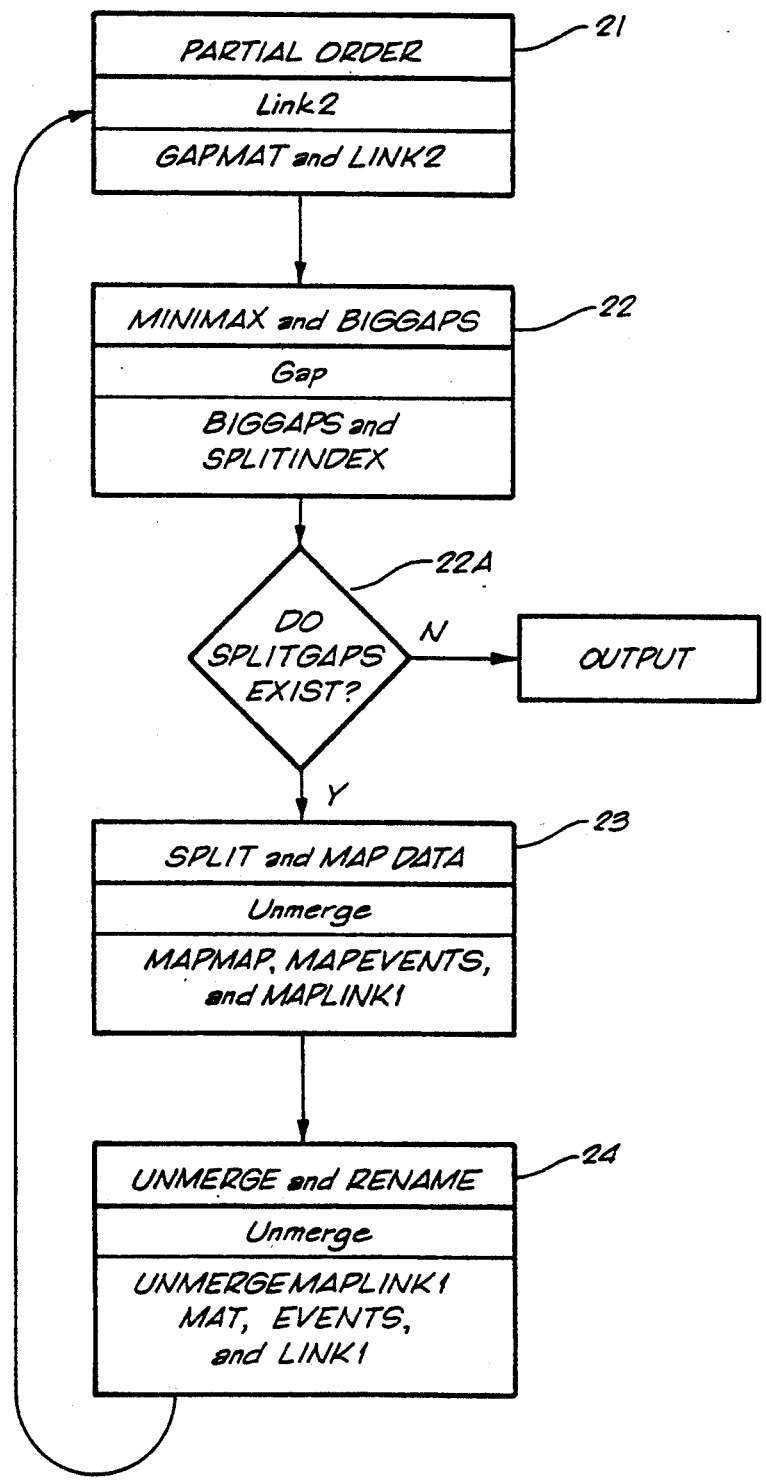
FIG. 3 is a block diagram depicting the steps comprising the processing loop aspects of the present invention.

Referring now to FIG. 3, there is shown processing loop 20, depicted in FIG. 1, in more detail. In accordance with the preferred embodiment of the present invention, as will be described in detail, partial order block 21 is implemented in module Link2 using matrices GAPMAT and LINK2. Biggap block 22, incorporating "minimax" selection criteria therein, is implemented in module Gap using matrices BIGGAPS and SPLITINDEX. In block 22A, the preferred embodiment ascertains if "splitgaps", as will be elucidated hereinafter, exist. If splitgaps do not exist, then preferably in block 22A, cluster statistics are calculated and output generated. If splitgaps exist, however, then the preferred embodiment proceeds to block 23, wherein data is split and mapped in module Unmerge using matrices MAPMAT, MAPEVENTS and MAPLINK1. Subsequently, in accordance with the present invention, in block 24, module Unmerge "unmerges" matrix MAPLINK1 and stores the result thereof in matrix UNMERGEMAPLINK1. Unmerge then renames matrices MAPMAT, MAPEVENTS and UNMERGEMAPLINK1 to matrices MAT, EVENTS, and LINK1, respectively.

Figure 4:
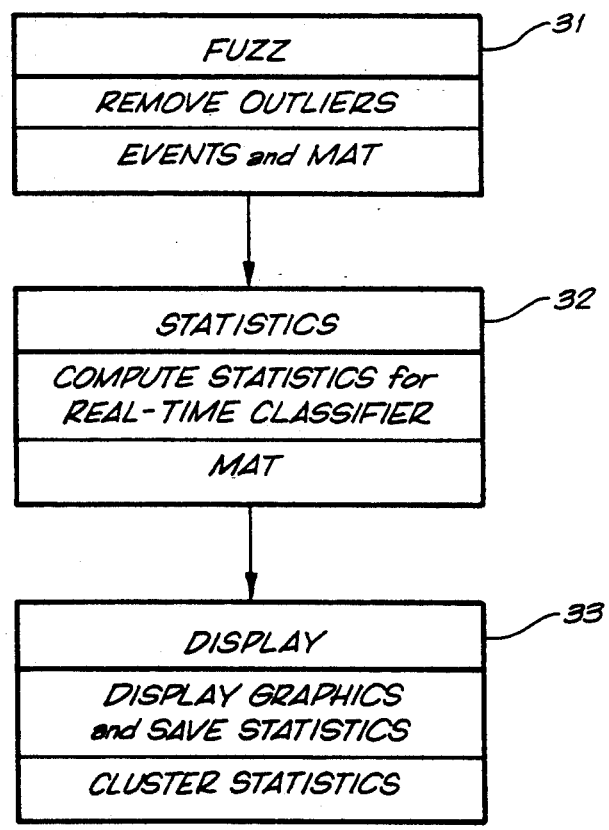
FIG. 4 is a block diagram depicting the steps comprising the output aspects of the present invention.

In FIG. 4, there is shown a block diagram depicting the output step in accordance with the present invention. More particularly, in block 31, using FFC's novel fuzz criteria, outliers are removed from clusters, thereby isolating them in the data space. Matrices MAT and EVENTS are then updated to include these clusters. Statistics are then calculated in block 32 thereby preferably functioning as a real-time classifier. In block 33, the cluster statistics are displayed.

Now referring to FIG. 5A, there is depicted a 2-dimensional plot depicting a small data space consisting of only twelve (12) events and the sampled values of two (2) features. For convenience, the first feature is represented as "F1" and the second feature is represented as "F2." As shown in FIG. 5A, the values of F1 on the horizontal axis vary from $-32$ to $+32$, and the values of F2 on the vertical axis vary from $-32$ to $+32$.

More particularly, each of these twelve (12) events is characterized by a pair of feature values, (F1,F2), depicted by points P1-P12. Thus, event 1 is characterized by feature values (−17,+16) and depicted by point P1; event 2 is characterized by feature values (22,−12) and depicted by point P2; event 3 is characterized by feature values (5,20) and depicted by point P3; event 4 is characterized by feature values (−13,32) and depicted by point P4; event 5 is characterized by feature values (−6,−5) and depicted by point P5; event 6 is characterized by feature values (−18,12) and depicted by point P6; event 7 is characterized by feature values (18,5) and depicted by point P7; event 8 is characterized by feature values (32,−32) and depicted by point P8; event 9 is characterized by feature values (−32,14) and depicted by point P9; event 10 is characterized by feature values (13,−23) and depicted by point P10; event 11 is characterized by feature values (−24,−10) and depicted by point P11; and event 12 is characterized by feature values (15,9) and depicted by point P12.

Still referring to FIG. 5A, points P1-P12 depicted therein represent the values recorded in chronological order for each of twelve (12) events in a 2-dimensional feature space consisting of features F1 and F2. Thus, point P1 represents the first event recorded and point P12 represents the last event recorded.

As is well known in the art, the projections of each of these points on the horizontal F1 axis, corresponds to the respective sampled values of the first feature thereof. In particular, observing the tick-marks or short lines at the base of these perpendicular projections onto the F1 axis, there are seen respective F1 values, from lowest to highest, of −32, −24, −18, −17, −13, −6, 5, 13, 15, 18, 22, and 32. This series of perpendicular lines traversing the F1 axis may be considered as being the spectrum of F1 sampled values in the data space. The tick-marks are used to improve the visibility of such a spectrum of feature values. Between each of these respective sampled F1 values, there is seen a progression of intervals or "gaps" of varying sizes. Thus, between projected values −32 and −24 there is seen leftmost gap G1 of length 8. To the immediate right of gap G1 there is seen gap G2 of length 6, corresponding to the interval between sampled values −24 and −18. Similarly, traversing the horizontal F1 axis, there are seen gap G3 of length 1, gap G4 of length 4, gap G5 of length 7, gap G6 of length 11, gap G7 of length 8, gap G8 of length 2, gap G9 of length 3, gap G10 of length 4, and gap G11 of length 10.

Similarly, there are also seen the projections of each of these points onto the vertical F2 axis, corresponding to the respective sampled values of the second feature thereof. In particular, observing the perpendicular lines depicted on the F2 axis, there are seen respective F2 values, from lowest to highest, of −32, −23, −16, −12, −10, −5, 5, 9, 12, 14, 20 and 32. This series of perpendicular lines traversing the F2 axis may be considered as being the spectrum of F2 sampled values in the data space. Between each of these respective sampled F2 values, there is also depicted a progression of intervals or gaps of varying sizes. Thus, between projected values −32 and −23 there is seen bottommost gap g1 of length 9. Immediately above gap g1 there is seen gap g2 of length 7, corresponding to the interval between sampled values −23 and −16. Similarly, traversing the vertical F2 axis, there are seen gap g3 of length 4, gap g4 of length 2, gap g5 of length 5, gap g6 of length 10, gap g7 of length 4, gap g8 of length 3, gap g9 of length 2, gap g10 of length 6, and gap g11 of length 12.

In accordance with the present invention, gaps G(k), k=1,11, for the first feature, and gaps g(k), k=1,11, for the second feature, represent empty intervals of the respective feature's spectrum. Hence, the eleven (11) gaps, G(k), depicted on the horizontal axis, represent eleven (11) voids in the F1 spectrum. Similarly, the eleven (11) gaps, g(k), depicted on the vertical axis, represent eleven (11) voids in the F2 spectrum. As will be hereinafter described in detail, under the present invention, the existence of such large and small gaps in the data space spectrums indicates classes of events. If there are no relatively large and small gaps in any of the spectrums, i.e., most of these gaps are substantially of equal size, then the existence of classes of events is doubtful. Under the present invention, it is preferable that these classes of events have distributions that are disposed far enough apart in the data space, so that there exist regions therebetween which contain a paucity of data points.

To obtain clusters or classes of events in the data space, the focus is upon these voids in the sparse regions. Accordingly, a relatively large gap in the middle portion of a spectrum corresponds to a large void in the data space and separates at least two (2) classes of events in the data space. As should be apparent to those skilled in the art, distributions exhibiting central tendency assure the existence of voids, or at least sparse regions, between disposed classes of events. Thus, under the preferred embodiment of the present invention, it is assumed that most distributions characterizing the classes of events possess central tendency. It should also be clear to those skilled in the art that while big gaps in a spectrum imply big voids in the corresponding data space, the converse is not necessary true. That is, big voids in the data space do not imply big gaps in a spectrum because of the vagaries associated with projecting the various data points upon the orthogonal feature axes. Furthermore, by rotating the data space, the resulting gap projections are clearly more significantly affected than the voids in the data space per se.

A large gap in the perpendicular lines obtained by projecting feature values upon a particular axis, i.e., a large gap in a feature's spectrum, separates possible clusters into two (2) mutually exclusive groups on either side thereof. Events remote from a large gap, far to one side thereof, are unlikely to belong to a class of events on the opposite side thereof. Events near a large gap's boundaries, however, are least certain of correct classification. Events with feature values having a plethora of near neighbors are assumed to be indigenous to a cluster. On the other hand, an event is tentatively designated as being external to a cluster, i.e., designated as being an outlier thereof, if it has at least one feature value with no near neighbors. As will become clear to those skilled in the art, this outlier designation is only fuzzy because a single outlying feature may simply imply an event on a cluster boundary, whereas a plurality of outlying features probably indicate a spurious event, belonging to no cluster.

In accordance with the present invention, for events to belong to the same class, the events must have the same or similar relevant features. On the other hand, for two events not to belong to the same class, they must be dissimilar in at least one feature. Thus, if two events agree with respect to all of their relevant features, then under the present invention, it is assumed that these features measure two events from the same class. In accordance with these assumptions, any minor differences in respective features thereof are also assumed to be attributable to measurement errors in the sensors and, of course, noise.

Matrix MAT

In accordance with the present invention, the N sampled values for each of the M features constituting the data space are stored in a N×M matrix referred to as "MAT." Now referring to FIG. 5B, there is shown matrix MAT depicting a 12×2 matrix storing in columns 1 and 2, for the first and second features, respectively, the values recorded for these features in chronological order. Thus, the successively recorded values of feature F1 are stored in row 1 to row 12 of column 1 of MAT. Similarly, the successively recorded values of features F2 are stored in row 1 to row 12 of column 2 of MAT.

Subroutine Link1 and Matrix LINK1

Subroutine Link1, is executed preferably in parallel, and, based upon the N values of each feature stored in matrix MAT, orders these feature values from the smallest to the largest. Insodoing, subroutine Link1 builds N×M matrix LINK1 for storing the indices of the size-ordered feature values corresponding to the chronologically-ordered feature values stored in MAT. The kth row in LINK1 contains the MAT index of the kth largest feature value for that feature. That is, row 1 of matrix LINK1 stores the index for the smallest feature value stored in matrix MAT, and row N of matrix LINK1 stores the index for the largest feature value stored in matrix MAT.

Referring now to FIG. 5C, there is shown matrix LINK1 depicting a 12×2 matrix storing in columns 1 and 2, for the first and second features, respectively, the MAT indices thereof, but in the order of smallest to largest feature values. More particularly, column 1 of LINK1 stores, top-down, the indices for successively increasing values of feature 1 in MAT. For instance, row 1 column 1 of LINK1 stores the index 9, corresponding to row 9 and column 1 of MAT which contain the smallest value, i.e., −32, of feature 1. The next smallest value of feature 1, i.e., −24, was recorded eleventh in the sample space and, accordingly, is stored in row 11 of MAT; the index 11 thereof is stored in row 2 column 1 of LINK1. Similarly, the MAT indices for progressively increasing feature 1 values are stored in LINK1 rows 3 through 12, column 1. Hence, index 8, corresponding to the row of the largest feature 1 value stored in MAT, i.e., 32 is contained in row 12, column 1 of LINK1.

Similarly, column 2 of LINK1 stores, top-down, the indices for successively increasing values of feature 2 in MAT. For instance, row 1 column 2 of LINK1 stores index 8, corresponding to row 8 and column 2 of MAT which contain the smallest value, i.e., −32, of feature 2. The next smallest value of feature 2, i.e., −23, was recorded tenth in the sample space and, accordingly, is stored in row 10 of MAT; the index 10 thereof is stored in row 2 column 2 of LINK1. Similarly, the MAT indices for progressively increasing feature 2 values are stored in LINK1 rows 3 through 12, column 2. Hence, index 4, corresponding to the row of the largest feature 2 value stored in MAT, i.e., 32, is contained in row 12, column 2 of LINK1.

Subroutine Link2 and Matrices LINK2, GAPMAT

In accordance with the present invention, subroutine Link2, is executed preferably in parallel, after subroutine Link1 has ordered the N values for each of M features. In particular and referring to FIG. 5D, Link2 builds an (N−1)×M matrix, styled "GAPMAT", of the gap lengths for each of the (N−1) gaps of each of the M features in the data space. The length of the kth gap is ascertained by subtracting the feature value stored in matrix MAT corresponding to the index stored in row k of LINK1 from the feature value stored in matrix MAT corresponding to the index stored in row (k+1) of LINK1, for the columns in matrices MAT and LINK1 corresponding to a particular feature. This relationship between each element of matrix GAPMAT and the corresponding consecutive elements in matrix LINK1 may be expressed by:

$$GAPMAT(k,j) = MAT(LINK1(k+1,j),j) - MAT(LINK1(k,j),j)$$

for values of k from 1 to N−1, and each j, from 1 to M. But since it is an important aspect of the present invention that all references to column j in any and all FFC matrices correspond to feature j, it is convenient to adopt the convention that the said relationship be equivalently expressed by:

$$GAPMAT(k,j) = GAPMAT_j(k) = MAT_j(LINK1_j(k+1)) - MAT_j(LINK1_j(k))$$

Thus, for the first feature, represented by column 1 in GAPMAT, the value of the element in row 1 thereof is obtained by subtracting the feature value corresponding to the index stored in row 2 (k+1=1+1=2) of LINK1 from the feature value corresponding to the index stored in row 1 (k=1) thereof. Since the index stored in row 2 for F1 in LINK1 is 11, its feature value in row 11 of MAT is seen to be −24. Similarly, since the index stored in row 1 for F1 in LINK1 is 9, its feature value in row 9 of MAT is seen to be −32. Accordingly, under the present invention, the value of the gap length thus obtained and stored in row 1 and column 1 of GAPMAT is the difference between −24 and −32, or 8.

Similarly, to ascertain the second gap length in row 2 of GAPMAT, the feature value corresponding to the index stored in row 3 (k+1=2+1=3) of LINK1 is subtracted from the feature value corresponding to the index stored in row 2 (k=2) thereof. Since the index stored in row 3 for F1 in LINK1 is 6, its feature value in row 6 of MAT is seen to be −18. Similarly, since the index stored in row 2 for F1 in LINK1 is 11, its feature value in row 11 of MAT is seen to be −24. Accordingly, under the present invention, the value of the gap length thus obtained and stored in row 2 and column 1 of GAPMAT is the difference between −18 and −24, or 6.

Similarly, to ascertain the last gap length in row 11, the last row (N−1=12−1=11) of GAPMAT, the feature value corresponding to the index stored in row 12 (k+1=11+1=12) of LINK1 is subtracted from the feature value corresponding to the index stored in row 11 (k=11) thereof. Since the index stored in row 12 for F1 in LINK1 is 8, its feature value in row 8 of MAT is seen to be 32. Similarly, since the index stored in row 11 for F1 in LINK1 is 2, its feature value in row 2 of MAT is seen to be 22. Accordingly, under the present invention, the gap length value thus obtained and stored in row 11 and column 1 of GAPMAT is the difference between 32 and 22, or 10.

Now, for the second feature, represented by column 2 in GAPMAT, the value of the element in row 1 thereof is obtained by subtracting the feature value corresponding to the index stored in row 2 ($k+1=1+1=2$) of LINK1 from the feature value corresponding to the index stored in row 1 ($k=1$) thereof. Since the index stored in row 2 for F2 in LINK1 is 10, its feature value in row 10 of MAT is seen to be $-23$. Similarly, since the index stored in row 1 for F2 in LINK1 is 8, its feature value in row 8 of MAT is seen to be $-32$. Accordingly, under the present invention, the value of the gap length thus obtained and stored in row 1 and column 2 of GAPMAT is the difference between $-23$ and $-32$, or 9.

Similarly, to ascertain the second gap length in row 2 of GAPMAT, the feature value corresponding to the index stored in row 3 ($k+1=2+1=3$) of LINK1 is subtracted from the feature value corresponding to the index stored in row 2 ($k=2$) thereof. Since the index stored in row 3 for F2 in LINK1 is 1, its feature value in row 1 of MAT is seen to be $-16$. Similarly, since the index stored in row 2 for F2 in LINK1 is 10, its feature value in row 10 of MAT is seen to be $-23$. Accordingly, under the present invention, the gap length value thus obtained and stored in row 2 and column 2 of GAPMAT is the difference between $-16$ and $-23$, or 7.

Similarly, to ascertain the last gap length in row 11 of GAPMAT, the last row ($N-1=12-1=11$) of GAPMAT, the feature value corresponding to the index stored in row 12 ($k+1=11+1=12$) of LINK1 is subtracted from the feature value corresponding to the index stored in row 11 ($k=11$) thereof. Since the index stored in row 12 for F2 in LINK1 is 4, its feature value in row 4 of MAT is seen to be 32. Similarly, since the index stored in row 11 for F2 in LINK1 is 3, its feature value in row 3 of MAT is seen to be 20. Accordingly, under the present invention, the gap length value thus obtained and stored in row 11 and column 1 of GAPMAT is the difference between 32 and 20, or 12.

As should be apparent to those skilled in the art, the gap lengths stored top-down in column 1 of GAPMAT correspond to the progression of gaps depicted as $G(k)$, $k=1,11$, in FIG. 5A. Similarly, the gap lengths stored top-down in column 2 of GAPMAT correspond to the progression of gaps depicted as $g(k)$, $k=1,11$, therein. In accordance with the present invention, while, as hereinbefore described in detail, the elements of MAT are disposed therein in chronological order, it should also be apparent to those skilled in the art that the elements of GAPMAT are disposed therein in spectrum order. That is, a particular element of GAPMAT represents the succession of gap lengths as the spectrum for a feature is traversed form left to right. For example, GAPMAT$_j$(1) is the length of the leftmost gap in the spectrum of the jth feature.

Once these gaps have been calculated for each feature and the values thereof placed in GAPMAT, in accordance with the present invention, subroutine Link2 orders them from the smallest to the largest, for each such feature, preferably in parallel. This ordering of gaps is preferably accomplished without modifying the contents of GAPMAT. Instead, in accordance with the preferred embodiment of the present invention, subroutine Link2 builds matrix LINK2, another ($N-1$)$\times$M matrix, for storing the indices of the corresponding gap lengths stored in GAPMAT.

Thus, for the first feature, represented by column 1 in LINK2, the kth row contains the index of the kth largest gap for that feature, stored in column 1 of GAPMAT. Similarly, for the second feature, represented by column 2 in LINK2, the kth row contains the index of the kth largest gap for that feature, stored in column 2 of GAPMAT. Referring now to FIG. 5D, there is shown matrix LINK2 depicting a 11$\times$2 matrix storing in columns 1 and 2, for the first and second features, respectively, the GAPMAT indices thereof, but in the order of smallest to largest gap lengths. More particularly, column 1 of LINK2 stores, top-down, the indices for successively increasing gaps of feature 1 in GAPMAT. For instance, row 1 column 1 of LINK2 stores the index 3, corresponding to row 3 and column 1 of GAPMAT which contains the smallest gap, i.e., 1, of feature 1. The next smallest gap of feature 1, i.e., 2, is stored in row 8 of GAPMAT and, accordingly, the index 8 thereof is stored in row 2 column 1 of LINK2. Similarly, the GAPMAT indices for progressively increasing gap lengths are stored in LINK2 rows 3 through 11, column 1. Hence, index 6, corresponding to the row of the largest feature 1 gap stored in GAPMAT, i.e., 11, is contained in row 11, column 1 of LINK2.

Similarly, column 2 of LINK2 stores, top-down, the indices for successively increasing gap lengths of feature 2 in GAPMAT. For instance, row 1 column 2 of LINK2 stores index 4, corresponding to row 4 and column 2 of GAPMAT which contain the smallest gap length, i.e., 2, of feature 2. The next smallest gap of feature 2, i.e., also 2, is stored in row 9 of GAPMAT; accordingly, the index 9 thereof is stored in row 2 column 2 of LINK2. Similarly, the GAPMAT indices for progressively increasing feature 2 gap lengths are stored in LINK2 rows 3 through 11, column 2. Hence, index 11, corresponding to the row of the largest feature 2 gap stored in GAPMAT, i.e., 12, is contained in row 11, column 2 of LINK2.

As should be apparent to those skilled in the art, GAPMAT$_j$(LINK2$_j$(1)) is the length of the shortest gap in the spectrum of feature j and GAPMAT$_j$(LINK2$_j$(N$-$1)) is the length of the longest gap therein. It will also become clear to those skilled in the art that MAT$_j$(LINK1$_j$(LINK2$_j$(1))) is the j-feature value from the left side of the shortest gap and that MAT$_j$(LINK1$_j$(LINK2$_j$(N$-$1))) is the j-feature value from the left side of the longest gap in the spectrum. In accordance with the present invention, outlier events will tend to belong to large gaps which, of course, are last in LINK2 order. On the other hand, data indigenous to particular event classifications will tend to belong to small gaps which are first in LINK2 order.

As will be described in detail, this attribute of outliers may be advantageously exploited to effectively separate event classes from one another, and, under the present invention, is implemented in subroutine Gap. Indeed, the gap-oriented clustering system disclosed herein, teaches contrary to the prior art and enables cluster analysis to be performed in virtual real time upon multi-dimensional data spaces with large sample sizes heretofore unmanageable by those skilled in the art.

Subroutine Gap

Subroutine Gap uses the gap lengths stored in matrix GAPMAT, with concomitant order indices therefor being stored in matrix LINK2, to find the best gap to tentatively split each feature of each cluster. As is readily apparent throughout the preferred embodiment of FFC, this pursuit of the best gap for splitting purposes is executed preferably in parallel for each feature of each cluster in the sampled data space. But, if FFC is engaged in pass 3 or pass 4 or a subsequent pass, then pursuing the best gap should preferably be executed in parallel only within the two most recently formed clusters because none of the heretofore located in tentative split-gaps the other clusters have changed. More particularly, subroutine Gap attempts to locate an extreme left mode and an extreme right mode within the mixture of distributions depicted by the pattern of lines in the spectrum for each feature. These modes are located by searching the top rows of matrix LINK2, as a Gestalt, for the maximum value (of the matrix GAPMAT index) and the minimum value (of the matrix GAPMAT index) therein. That is, such maximum and minimum values correspond to the matrix GAPMAT indices of the gaps located at these two modes. The best tentative splitting gap is then sought by sequentially searching the bottom rows of matrix LINK2, in bottom-up order, for the bottom-most value which is disposed medially of the said extreme left and extreme right modes. This value, of course, is a matrix GAPMAT index and corresponds to the largest gap between the two modes.

Referring now to FIG. 5E, considering only the top twenty five percent (25%) of the rows in matrix LINK2, there is seen the top three (3) rows which subroutine Gap searches for a maximum and minimum index. In particular, for the first feature, the top three (3) indices shown in column 1 are, in descending order, 3, 8, and 9. Accordingly, the maximum and minimum indices for F1 and 9 and 3, respectively. Similarly, for the second feature, the top three (3) indices shown in column 2 of matrix LINK2 are, in descending order, 4, 9, and 8. Accordingly, the maximum and minimum indices for F2 are 9 and 4, respectively.

Still referring to FIG. 5E, the index corresponding to the right mode for the first feature is 9, and the index corresponding to the left mode for the first feature is 3. Similarly, the index corresponding to the right mode for the second feature is 9, and the index corresponding to the left mode for the second feature is 4.

Next, subroutine Gap attempts to locate the index of the largest gap for each feature by sequentially searching the bottom rows of matrix LINK2 for the bottom-most value therein which comports with the minimax constraint that such bottom-most value is disposed medially of said left mode and said right mode. As an illustration, considering only the bottom twenty five percent (25%) of the rows in matrix LINK2, there is seen the bottom three (3) rows which subroutine Gap searches for a big gap. In particular, for the first feature, the bottom three (3) indices shown in column 1 of matrix LINK2 are, in bottom-up order, 6, 11, and 7. Similarly, for the second feature, the bottom three (3) indices shown in column 2 are, in bottom-up order, 11, 6, and 1.

In accordance with the present invention, the gap index stored in column 1 and the bottom row of matrix LINK2 is tentatively considered as a candidate for the splitting gap for the first feature to partition the data space. The gap index 6 stored therein satisfies FFC's minimax constraint, being disposed between the left mode with index 3 and the right mode with index 9. Ergo, the LINK2 index 11 represents a possible split-index and corresponds to the big gap of length 11 stored in row 6 and column 1 of matrix GAPMAT, and defined by its left feature value which may be used for splitting purposes. As should be clear to those skilled in the art, $$MAT_1(LINK1_1(LINK2_1(\text{split-index}))) = MAT_1(LINK1_1(LINK2_1(11))) = MAT_1(LINK1_1(6)) = MAT_1(5) = -6,$$

and is the value of the leftmost feature for this big gap, called split-val.

Similarly, the gap index stored in column 2 and the bottom row of matrix LINK2 is tentatively considered as a candidate for the splitting gap for the second feature to partition the data space. The gap index 11 stored therein fails to satisfy FFC's minimax constraint, since 11 is not medial of left mode with index 4 and right mode with index 9. In accordance, with the preferred embodiment, the index corresponding to the next largest gap stored in row 10 is considered as a gap splitting candidate. Since the gap index stored in row 10 and column 2 of matrix GAPMAT is 6, which is medial of left mode with index 4 and right mode with index 9, it satisfies the FFC minimax constraint and is also a candidate for the splitting gap. The corresponding length 10 of this big gap, albeit not the biggest gap, for feature 2 is obtained from row 6 and column 2 of matrix GAPMAT. The left feature value (split-val) defining this big gap is:

$$MAT_2(LINK1_2(LINK2_2(\text{split-index}))) = MAT_2(LINK1_2(LINK2_2(10))) = MAT_2(LINK1_2(6)) = MAT_2(5) = -5.$$

Under the present invention, one of these two candidates for splitting a big gap must be picked. As hereinbefore described in detail, and depicted in FIG. 5F, outlier events tend to belong to large gaps, which are inherently last in LINK2 order. Thus, to achieve separation between event classes, the tentative splitting candidate with the substantially largest gap for any feature is preferably selected.

Hence, feature 1 is chosen from the gap-splitting candidates because it has the largest gap (gap length of 11 for feature 1 is greater than gap length of 10 for feature 2), with a split index of 11 and a split-val of $-6$.

Subroutine Unmerge

Once the split-feature and split-val have been ascertained, under the present invention, subroutine Unmerge separates events into their appropriate class. Referring to FIG. 5E, there is shown matrix EVENTS which initially stores the value 1 in each of its 12 rows, corresponding to each of the 12 sampled events constituting the data space. Before FFC commences execution, no classification has occurred and all events are assigned to cluster 1.

As should be apparent to those skilled in the art, after the first pass of FFC as hereinbefore described in detail, there will be preferably two clusters. Using feature 1, the events to the left of the split-gap are assigned to cluster 1, and the remaining events, i.e., the events to the right of the split-gap, are assigned to cluster 2.

More particularly, as shown in FIG. 5E, if the feature 1 value of an event is less than or equal to the left feature value defining the split-gap, i.e., the split-value for feature 1, then the event remains in its existing class. If, however, the feature 1 value of an event is greater than the split-value, then the event is separated into the new class. Now referring to FIGS. 5B and 5E, comparing each of the 12 feature 1 values stored in column 1 of matrix MAT with the split-feature value −6, assigns the events with feature values 22 (row 2), 5 (row 3), 18 (row 7), 32 (row 8), 13 (row 10) and 15 (row 12) to the new cluster. Accordingly, the value stored in these respective rows in matrix EVENTS is changed from 1 to 2. All of the remaining events, remain in cluster 1; the value stored in each of these rows is unchanged. Thus, events 2, 3, 7, 8, 10 and 12 are separated from events 1, 4, 5, 6, 9 and 11.

Subroutine Unmerge then "maps" or permutes the events sequentially by cluster, but simultaneously maintains the chronology thereof. This mapping is stored in matrix MAP. In particular and referring to FIG. 5E, proceeding top-down in matrix EVENTS, the first events to be assigned sequential numbers in matrix MAP belong to cluster 1. The events which belong to cluster 1 contain the number 1 in matrix EVENTS. Thus, cluster 1 rows 1, 4, 5, 6, 9 and 11 stored in matrix EVENTS are assigned sequential numbers in the corresponding rows in matrix MAP. Matrix MAP row 1 is assigned number 1; row 4 is assigned number 2; row 5 is assigned number 3; row 6 is assigned number 4; row 9 is assigned number 5; and row 11 is assigned number 6.

Still referring to FIG. 5E, proceeding top-down in matrix EVENTS, the next events to be assigned sequential numbers in matrix MAP belong to cluster 2. The events which belong to cluster 2 contain the number 2 in matrix EVENTS. Similarly, cluster 2 rows 2, 3, 7, 8, 10 and 12 stored in matrix EVENTS are assigned sequential numbers in the corresponding rows in matrix MAP. Matrix MAP row 2 is assigned number 7; row 3 is assigned number 8; row 7 is assigned number 9; row 8 is assigned number 10; row 10 is assigned number 11; and row 12 is assigned number 12.

Prior to performing pass 2, as shown in FIG. 5F, FFC uses matrix MAP to unmerge matrix MAT. More particularly, matrix MAP maps matrix MAT to matrix MAPMAT in whole rows, in parallel for each column therein, as follows. In accordance with the present invention, using the number stored in each row of matrix MAP and its corresponding index, matrix MAT is permuted into matrix MAPMAT. Thus, since the number stored in row 1 of matrix MAP is 1, row 1 of matrix MAT remains row 1 in matrix MAPMAT. Since the number stored in row 2 of matrix MAP is 7 in matrix MAPMAT, however, row 2 of matrix MAT becomes row 7 in matrix MAPMAT. Similarly, since the number stored in row 3 of matrix MAP is 8, row 3 of matrix MAT becomes row 8 in matrix MAPMAT; since the number stored in row 4 of matrix MAP is 2, row 4 of matrix MAT becomes row 2 in matrix MAPMAT; row 5 of matrix MAT becomes row 3 in matrix MAPMAT; row 6 of matrix MAT becomes row 4 in matrix MAPMAT; row 7 of matrix MAT becomes row 9 in matrix MAPMAT; row 8 of matrix MAT becomes row 10 in matrix MAPMAT; row 9 of matrix MAT becomes row 5; row 10 of matrix MAT becomes row 11 in matrix MAPMAT; row 11 of matrix MAT becomes row 6 in matrix MAPMAT; and row 12 of matrix MAT remains row 12 in matrix MAPMAT.

Matrix EVENTS is permuted to MAPEVENTS in parallel and in a like manner with the hereinbefore described in detail permuting of matrix MAT. As shown in FIG. 5F, at the end of this precursor step, matrix MAPEVENTS is ordered with all of the events containing the number 1, i.e., the events contained in cluster 1, occupying the first top-down rows. This is followed by the events containing the number 2, i.e., the events contained in cluster 2, occupying the next top-down rows.

In accordance with the preferred embodiment of the present invention, matrix MAPMAT represents the chronological ordering of events by cluster as depicted in matrix MAPEVENTS. Next, matrix LINK1 is mapped, but unlike the mapping of matrix MAT, the value in matrix LINK1 is permuted individually, not as entire rows as in matrix MAT. Referring to matrices MAP and LINK1 shown in FIG. 5E and 5B and 5F, for feature 1 contained in column 1 of matrix LINK1, since the value stored in row 1 of matrix LINK1 is 9, and the corresponding value 5 is stored in row 9 of matrix MAP, the permuted value of feature 1 stored in row 1 of matrix MAPLINK1 is 5. Similarly, since the index for feature 1 stored in row 2 of matrix LINK1 is 11, and the corresponding index 6 is stored in row 11 of matrix MAP, the mapped index of feature 1 in row 2 of matrix MAPLINK1 is 6. Thus, still referring to FIG. 5F, the mapped index of feature 1 in row 3 of matrix MAPLINK1 is 4, since the index for feature 1 stored in row 3 of matrix LINK1 is 6 and the corresponding index stored in row 6 of matrix MAP is 4; the mapped index stored in row 4 of matrix MAPLINK1 is 1, since the index for feature 1 stored in row 4 of matrix LINK1 is 1 and the corresponding index stored in row 4 of matrix MAP is 1; the mapped index stored in row 5 of matrix MAPLINK1 is 2, since the index for feature 1 stored in row 5 of matrix LINK1 is 4 and the corresponding index stored in row 4 of matrix MAP is 2; the mapped index stored in row 6 of matrix MAPLINK1 is 3, since the index for feature 1 stored in row 6 of matrix LINK1 is 5 and the corresponding index stored in row 5 of matrix MAP is 3; the mapped index for feature 1 stored in row 7 of matrix MAPLINK1 is 8, since the index for feature 1 stored in row 7 of matrix LINK1 is 3 and the corresponding index stored in row 3 of matrix MAP is 8; the mapped index stored in row 8 of matrix MAPLINK1 is 11, since the index for feature 1 stored in row 8 of matrix LINK1 is 10 and the corresponding index stored in row 10 of matrix MAP is 11; the mapped index stored in row 9 of matrix MAPLINK1 is 12, since the index for feature 1 stored in row 9 of matrix LINK1 is 12 and the corresponding index stored in row 12 of matrix MAP is 12; the mapped index for feature 1 stored in row 10 of matrix MAPLINK1 is 9, since the index for feature 1 stored in row 10 of matrix LINK1 is 7 and the corresponding index stored in row 7 of matrix MAP is 9; the mapped index stored in row 11 of matrix MAPLINK1 is 7, since the index for feature 1 stored in row 11 of matrix LINK1 is 2 and the corresponding index stored in row 2 of matrix MAP is 7; and the mapped index for feature 1 in row 12 of matrix MAPLINK1 is 10, since the index for feature 1 stored in row 12 of matrix LINK1 is 8 and the corresponding index stored in row 8 of matrix MAP is 10.

Similarly, now referring to FIG. 5E and 5B and 5F, matrices MAP and LINK1 shown for feature 2, contained in column 2 of matrix LINK1. Since the index stored in row 1 of matrix LINK1 is 8, and the corresponding index 10 is stored in row 8 of matrix MAP, the mapped index of feature 2 stored in row 1 of matrix MAPLINK1 is 10. Similarly, since the index for feature 2 stored in row 2 of matrix LINK1 is 10, and the corresponding index 11 is stored in row 10 of matrix MAP, the mapped index of feature 2 in row 2 of matrix MAPLINK1 is 11. Thus, still referring to FIG. 5F, the mapped index for feature 2 stored in row 3 of matrix MAPLINK1 is 1, since the index for feature 2 stored in row 3 of matrix LINK1 is 1 and the corresponding index stored in row 1 of matrix MAP is 1; the mapped index for feature 2 stored in row 4 of matrix MAPLINK1 is 7, since the index for feature 2 stored in row 4 of matrix LINK1 is 2 and the corresponding index stored in row 2 of matrix MAP is 7; the mapped index stored in row 5 of matrix LINK1 is 6, since the index for feature 2 stored in row 5 of matrix LINK1 is 11 and the corresponding index stored in row 11 of matrix MAP is 6; the mapped index stored in row 6 of matrix MAPLINK1 is 3, since the index for feature 2 stored in row 6 of matrix LINK1 is 5 and the corresponding index stored in row 5 of matrix MAP is 3; the mapped index for feature 2 stored in row 7 of matrix MAPLINK1 is 9, since the index for feature 2 stored in row 7 of matrix LINK1 is 7 and the corresponding index stored in row 7 of matrix MAP is 9; the mapped index stored in row 8 of matrix MAPLINK1 is 12, since the index for feature 2 stored in row 8 of matrix LINK1 is 12 and the corresponding index stored in row 12 of matrix MAP is 12; the mapped index stored in row 9 of matrix MAPLINK1 is 4, since the index for feature 2 stored in row 9 of matrix LINK1 is 6 and the corresponding index stored in row 6 of matrix MAP is 4; the mapped index for feature 2 stored in row 10 of matrix MAPLINK1 is 5, since the index for feature 2 stored in row 10 of matrix LINK1 is 9 and the corresponding index stored in row 9 of matrix MAP is 5; the mapped index stored in row 11 of matrix MAPLINK1 is 8, since the index for feature 2 stored in row 11 of matrix LINK1 is 3 and the corresponding index stored in row 3 of matrix MAP is 8; and the mapped index for feature 2 in row 12 of matrix LINK1 is 2, since the index for feature 2 stored in row 12 of matrix LINK1 is 4 and the corresponding index stored in row 4 of matrix MAP is 2.

As should be apparent to those skilled in the art, the splitting of a cluster into two sibling clusters, as hereinbefore described in detail, carves the split-feature into two contiguous portions along the feature's spectrum. In particular, one such contiguous portion is disposed to the left of the split gap, and the other contiguous portion is disposed to the right of the split gap. For example, the indices stored in the first six rows for F1 in matrix MAPLINK1 are, in top-down order, 5, 6, 4, 1, 2 and 3. These indices are all less than or equal to the maximum index for cluster 1, index 6. Hence, it should be apparent that the indices for F1 in rows 1-6 of MAPLINK1 correctly represent the ascending order of the F1 cluster 1 values stored in MAPMAT. Continuing with this example, the indices stored in the last six rows for F1 in matrix MAPLINK1 are, in top-down order, 8, 11, 12, 9, 7 and 10. These indices are all greater than the maximum index for cluster 1, index 6, and accordingly belong in cluster 2. Hence, it should be apparent that the indices for F1 in rows 7-12 of MAPLINK1 correctly represent the ascending order of the F1 cluster 2 values stored in MAPMAT. In accordance with the present invention, it is preferable to map each of matrices MAT, EVENTS and LINK1 in parallel.

The indices in matrix MAPMAT corresponding to the non-split-features, however, are probably not contiguous within clusters because they were merely split on the basis of their association with their concomitant split-feature for the underlying event. For example, the indices stored in the first six rows for F2 in matrix MAPLINK1 are, in top-down order, 10, 11, 1, 7, 6 and 3. Indices 10, 11 and 7 are greater than the maximum index for cluster 1, index 6, and indices 1, 6 and 3 are less than or equal to the maximum index for cluster 1. Hence, it should be apparent that the indices for F2 in rows 1-6 of MAPLINK1 incorrectly represent the ascending order of the F2 cluster 1 values stored in MAPMAT. Continuing with this example, the indices stored in the last six rows for F2 in matrix MAPLINK1 are, in top-down order, 9, 12, 4, 5, 8 and 2. Again, three of these indices are greater than the maximum index for cluster 1, and three of them are less than or equal to the maximum index for cluster 1. Hence, it should be apparent that the indices for F2 in rows 7-12 of MAPLINK1 incorrectly represent the ascending order of the F2 cluster 2 values stored in MAPMAT.

Thus, under the preferred embodiment, it is advantageous to make the current sibling cluster's indices contiguous in all non-split features, before commencing another FFC pass. More particularly referring to FIG. 5F, it is preferable to make non-split feature 2 indices contiguous within clusters before performing a second pass of FFC. As should be apparent to those skilled in the art, the basis for contiguous-rearrangement is that a subsequence of an a priori ordered sequence is also ordered. For example, as clearly shown in FIG. 5F, the method for making F2 contiguous is that MAPLINK1 must be adjusted or "unmerged" in F2 whereby column 2 of MAPLINK1 no longer stores the indices of the size-ordered feature 2 entire, pre-split values (contained, of course, in MAPMAT), but instead stores the indices of the size-ordered feature 2 values for each newly formed sibling cluster. Hence, MAPLINK1 is unmerged into two subordinate, sibling clusters, with each such sibling cluster maintaining the pre-established order of events. As should be apparent to those skilled in the art, this step should preferably be executed in parallel for all non-split features in the data space. In the instant example, of course, there is only one non-split feature so that no such parallel processing is possible.

Still referring to FIG. 5F and specifically to the information stored in matrix MAPEVENTS, since the sibling clusters split at the middle gap, i.e., split 6—6, all indices from 1-6 in matrix MAPLINK1 belong to cluster 1. As should be clear to those skilled in the art, all indices from 7-12 in MAPLINK1 belong to cluster 2. First considering the entry in row 1, since the index therefor is 10, and since index 10 is greater than the index contained in cluster 1, viz., index 6, it should be ordered as the first entry in cluster 2 in matrix UNMERGEMAPLINK1. But since MAPLINK1 is populated with cluster 1 in rows 1-6 top-down, and with cluster 2 in rows 7-12 top-down, the said first F2 entry in cluster 2 is stored in row 7 of matrix UNMERGEMAPLINK1. Similarly, the entry in row 2 contains index 11, and it also belongs to cluster 2. Maintaining the top-down order of the indices for F2, index 11 is stored in row 8, the row following row 7. Since row 3 contains index 1, and since index 1 is less than the largest index stored in cluster 1, it should be ordered as the first entry in cluster 1; index 1 is placed in row 1 of UNMERGEMAPLINK1 entering pass 2. Next, since the entry in row 4 contains index 7, it is stored in the next sequential row of cluster 2: row 9 of matrix UNMERGEMAPLINK1; since the entry in row 5 contains index 6, it is stored in the next sequential row of cluster 1: row 2 of matrix UNMERGEMAPLINK1; since the entry in row 6 contains index 3, it is stored in the next sequential row of cluster 1: row 3 of matrix UNMERGEMAPLINK1; since the entry in row 7 contains index 9, it is stored in the next sequential row of cluster 2: row 10 of matrix UNMERGEMAPLINK1; since the entry in row 8 contains index 12, it is stored in the next sequential row of cluster 2: row 11 of matrix UNMERGEMAPLINK1; since the entry in row 9 contains index 4, it is stored in the next sequential row of cluster 1: row 4 of matrix UNMERGEMAPLINK1; since the entry in row 10 contains index 5, it is stored in the next sequential row of cluster 1: row 5 of matrix UNMERGEMAPLINK1; since the entry in row 11 contains index 8, it is stored in the next sequential row of cluster 2: row 12 of matrix UNMERGEMAPLINK1; and since the entry in row 12 contains index 2, it is stored in the next sequential row of cluster 1: row 6 of matrix UNMERGEMAPLINK1.

In accordance with the present invention, MAPMAT in the precursor to pass 2 of FFC, contains the correct within cluster order for F1 and F2. But in this precursor phase, MAPLINK1 only contains the correct order for F1, the split-feature; F2 the non-split-feature, has been carried along as a passive coordinate concomitant to FFC's system to cluster a particular data space. As hereinbefore described in detail, this anomaly in the ordering of non-split-features is expeditiously adjusted by subroutine Unmerge. Thus, after matrix MAPLINK1 is unmerged into UNMERGEMAPLINK1, F2 is contained therein in correct order within cluster 1 and cluster 2. FFC is then ready for pass 2.

Before commencing pass 2 of FFC, however, it is necessary to rename matrix MAPMAT to MAT, matrix MAPEVENTS to EVENTS, and matrix UNMERGEMAPLINK1 to LINK1.

The second pass of FFC preferably begins at matrix GAPMAT, since the Unmerge step of the first pass has calculated new MAT and new LINK1 matrices. As should be clear to those skilled in the art, pass 2 proceeds analogously to pass 1, with the difference that there are now two clusters each having two features therein. Referring now to FIG. 6B, it is seen that events belonging to cluster 1 in matrix MAT occupy rows 1-6 and events belonging to cluster 2 occupy rows 7-12. Accordingly, using matrices MAT and LINK1, the corresponding gap lengths and their orders, respectively, are recalculated for pass 2. Then, for each cluster, each feature is searched for the existence of possible split-gaps.

Now referring to FIG. 6D, FFC finds left and right modes corresponding to each feature per cluster. To find these modes, it is particularly advantageous to search the top twenty-five per cent (25%) of the rows in matrix LINK2 for each said feature per cluster. Thus, since 25% of 5 rows is 1.25, the number of rows to be searched is preferably rounded up to 2, whereby rows 1 and 2 in cluster 1, and rows 7 and 8 in cluster 2, are searched.

Similarly, as hereinbefore described in detail, the bottom 25% of the rows in matrix LINK2 for each feature per cluster are searched for medial biggaps. Still referring to FIG. 6D, it is clearly seen that there are no medial biggaps contained in rows 5 and 4 or 12 and 11 for feature 1 (column 1). Accordingly, these two biggaps are marked "zero." On the other hand, for feature 2, it is seen that there are two medial biggaps, each having gap lengths of 17. Under these biggap-tie conditions, FFC preferably chooses to split the largest size cluster. Thus, referring to FIG. 6E, cluster 2 is split using feature 2 and split-val of −12 (depicted in FIG. 6A).

Still referring to FIG. 6E, it is observed that only events from cluster 2 are renumbered as (newly formed) cluster 3, and that all of cluster 1 is unchanged by this splitting in the second pass. As should be clear to those skilled in the art, the values stored in matrix MAP corresponding to cluster 1, rows 1-6, are unchanged. As hereinbefore described in detail, FFC permutes the values stored in rows 7-12 of matrix MAP corresponding to clusters 2 and 3.

In accordance with the present invention, this updated matrix MAP is used by FFC to create current matrices MAPMAT, MAPLINK1 and UNMERGEMAPLINK1, analogously to pass 1. Prior to entering the third pass, matrix MAPMAT is renamed to MAT and matrix UNMERGEMAPLINK1 is renamed to LINK1.

Referring now to FIGS. 6F and 7B, in the third pass, FFC operates on all three clusters, each, of course, having two features. It should be clear that clusters 2 and 3 each contain only three events. Thus, in accordance with the preferred embodiment of the present invention, it is impossible to find distinct left and right modes by searching only one row of matrix LINK2 for clusters 2 and 3. As hereinbefore described, this single search row is ascertained by preferably taking 25% of the total two rows and then rounding up the result. Referring now to FIG. 7D, this condition is indicated by the term "none" in the MODES column. For cluster 1, there is seen two modes for features 1 and 2. Since only feature 2 has a medial biggap, cluster 1 is split into new clusters 1 and 4. As should be clear to those skilled in the art, this split occurs using feature 2 with a split-value of −5 (shown in FIG. 7A). Again, prior to entering the next pass, FFC appropriately operates on matrices MAPMAT, MAPLINK1 and UNMERGEMAPLINK1, and renames matrix MAPMAT to MAT and matrix UNMERGEMAPLINK1 to LINK1.

Similarly, in pass 4, FFC operates on four clusters, each, of course, containing features 1 and 2. As shown in FIG. 8D, however, there are no modes because each cluster is too small for modes to be selected. Since there can be no biggaps, FFC is unable to effect any more splits. FFC thus stops during its fourth pass after having separated the data space into four classes of events.

It should be clearly understood that this small 12-point example was intended only to conveniently demonstrate the mechanics of the operation of the present invention. During normal operation of FFC with a large number of events, termination occurs either when all biggaps are equal zero, as in the previous illustration, or when all clusters satisfy a suitable minimality condition. For instance, such a minimality condition might focus upon cluster size or the number of events contained therein.

It is an important feature of the preferred embodiment of the present invention that the use of matrix LINK2 information in subroutine Gap does not require a complete ordering of all the gaps contained in matrix GAPMAT. Indeed, the input to subroutine Gap is preferably only the top 25% and bottom 25% of the rows in matrix LINK2. Thus, it is advantageous to segregate the 25% largest gaps in matrix GAPMAT and the 25% smallest from the remainder thereof.

It should also be clearly understood that there are many choices for measuring and marking fuzz.

To illustrate the pervasive parallel processing possibilities of the present invention, an embodiment of FFC will be depicted in pseudocode form. More particularly, to clearly show FFC's inherent parallel processing advantages and the affect thereof upon execution time, a simplified embodiment thereof comprising substantially ten (10) pseudocode steps will be described. Estimated maximum execution times are accordingly provided for each step of the pseudocode as it applies to an environment with M processors and one integrator.

Illustrative FFC Pseudocode Embodiment

Assume that N events have been recorded with regard to M features. These values are stored in an N×M matrix called RAWDATA. The maximum and minimum values for each feature are obtained during storage of the accumulated data. The three (3) parameters Minimaxbig, Minimaxlittle, and Minimaxfuzz are all set to 12.5%. It should be noted, however, that the values of these parameters do not necessarily have to be equal or even constants. In another embodiment of the present invention, as another example, these parameters may be a function of cluster size.

| STEP 1: Scaling | |
|---|---|
| Data In: | matrix RAWDATA |
| Data Out: | matrix MAT |
| Parameters: | Maximum and minimum values for each feature |

In parallel for each feature, using the associated maximum and minimum values, each feature's values in matrix RAWDATA are linearly scaled to fill the range of integers expressible on the processors. Then these values are rounded to the nearest integer. These integer values are stored in an N×M matrix called MAT.

Time: The execution time corresponds to Read, Scale, and Write operations. Since a Scale operation includes a Multiply operation and an Add operation, the estimated time is approximately 4N clock ticks on M processors. It should be noted that if the sensor ranges nearly equal the largest integers on the processors, then this scaling can be done in step 6 hereof, for each column in matrix BIGGAPS, saving 4N in time. On the other hand, if each processor has vector processing capability, the time expended in this step would be negligible.

| STEP 2: Order | |
|---|---|
| Data In: | Matrix MAT |
| Data Out: | Matrix LINK1 |
| Parameters: | None |

For each feature, in parallel, feature values are ordered in ascending values using the algorithm "Quicksort." (See Knuth, Art of Computer Programming, vol 3, pp 114-123, published by Addison-Wesley 1973). Matrix LINK1 stores the indexes of ascending feature values stored in matrix MAT.

Time: The average execution time corresponds to 12NlogN. As should be clear to those skilled in the art, the standard deviation of this average time is proportional to N. Thus, the maximum run time for all M features is not much longer than 12NlogN, when N is large. (See Knuth, id., p 427). While processors using content-addressable memories can order a file while simultaneously reading it out, the time estimate 12NlogN corresponds to an ordinary processor.

| Step 3: Gaps | |
|---|---|
| Data In: | Matrices MAT and LINK1 |
| Data Out: | Matrix GAPMAT |
| Parameters: | None |

Calculate the gaps of each spectrum, in parallel, using M processors.

```
Code: DO FOR C = 1 TO M;    in parallel for each column
        DO FOR R = 1 TO N - 1;
          GAPMAT(R,C) = MAT(LINK1(R + 1,C),C) -
          MAT(LINK1(R,C),C;
        ENDDO;
      ENDDO;
```

Time: The average execution time corresponds to 4 Read operations, 1 Difference operation, and 1 Write operation. Thus, the maximum time estimate is 6N on M processors. It should be noted that since this step never combines information from two different features, i.e., two different columns in matrix MAT, it is possible, by convention, to simplify the expression to

GAPMAT(R)=MAT(LINK1(R+1))−MAT(-LINK1(R))

where the column C is understood.

| STEP 4: Partial Order | |
|---|---|
| Data In: | Matrix GAPMAT |
| Data Out: | Matrix LINK2 |
| Parameters: | Minimaxbig and Minimaxlittle |

Since Minimaxbig=Minimaxlittle=Minimaxfuzz=12.5%, it is possible to segregate the 12.5% largest and 12.5% smallest gaps in matrix GAPMAT from the rest of the gaps using the algorithm Partial-Quicksort. This is done in parallel for each feature.

Three (3) gap lengths are chosen at random and then the smallest and largest values are discarded. The remaining gap length is used to segregate the values in matrix GAPMAT into 2 bins: those less than and those greater than this medial value. Matrix LINK2 is used to store the indexes of the values in these bins. On the average, each bin will contain approximately the same number of gaps.

Repeat this two more times using the resulting bins, for a total of eight bins. This should approximately segregate the 12.5%=⅛ smallest gaps and the 12.5%=⅛ largest gaps in matrix GAPMAT. Hereafter, these two bins are called the partially-ordered ⅛ smallest bin and the partially-ordered ⅛ largest bin.

Time: It should be clear that choosing the medial values expends minimal time. The first pass of FFC and each repetition thereof, requires N Read operations, N conditional operations ("ifs"), and N Write operations. Hence, the total time consumed in this step is less than 9N.

It should be noted that since the number of gaps in the final ⅛ bins is only approximately 12.5% of the total N, it is necessary to check the true number of gaps in these final bins. An additional pass, the 1/16 pass, of Partial-Quicksort may be needed to augment or subtract from the final ⅛ bins to come nearer the 12.5% required. Since this is only approximate, anywhere between 10.0% and 15.0% is satisfactory, making the minimax parameters into a range.

It should also be noticed in this pseudocode that matrix LINK2 is not a complete ordering of the gap values in matrix GAPMAT, but rather a partial ordering thereof. More particularly, the values in a bin are either all greater or all smaller than the values in a different bin because of the way the bins are constructed. However, no assurance is made for the order of the gap lengths within a given bin.

It is an advantage and important aspect of the present invention, that this stochastic or approximate step is sufficient since FFC is robust and slight variations in the minimax parameters do not adversely affect the resulting BIGGAPs found in the next step. In particular, small variations in Minimaxlittle still establish the same right and left modes. Similarly, large variations in Minimaxbig produce the same tentative splitgap since the search is bottom-up. But is should be observed, however, that large variations in Minimaxfuzz can have a large effect on the fuzz determined in the ensuing step.

|  | STEP 5: Minimax |
| --- | --- |
| Data In: | Matrices GAPMAT and LINK2 |
| Data Out: | Matrices BIGGAPS, SPLITINDEX, and FUZZINDEX |
| Parameters: | None |

For each feature, in parallel, locate a medial BIGGAP in the spectrum based upon matrix LINK2 partial-order as follows. Find the minimum value (left mode) and the maximum value (right mode) in the partially-ordered ⅛ smallest bin from matrix LINK2 partial order. This smallest bin contains matrix GAPMAT indexes of the smallest gaps in this feature's spectrum, i.e., top portion of matrix LINK2: LINK2($k=1$ to approx $N/8$).

Time: The estimated time expended is obtained by multiplying N/8 by the sum of a Read operation, 2 Ifs, and 2 Write operations. Thus, the time expended thus far in this step is no more than N/8 * (1 Read, 2 Ifs, 2 Writes) = (⅝)N.

Next, the partially-ordered ⅛ largest bin of matrix (LINK2 is filtered, discarding those values which are not between the left mode and the right mode for this feature. The partially-ordered ⅛ largest bin of matrix LINK2 contains the matrix GAPMAT indexes of the largest gaps in this feature's spectrum. If no indexes remain after filtering, then BIGGAP=0 and this feature's processing ends in this step.

Time: The estimated time expended is again obtained by multiplying N/8 by the sum of a Read operation, 2 Ifs, and 2 Write operations. Thus, the additional time expended in this step is no more than N/8 * (1 Read, 2 Ifs, 2 Writes) = (⅝)N.

Next, the maximum value among the filtered matrix LINK2 values is found. The matrix LINK2 index of this maximum value is stored in matrix SPLITINDEX and corresponds to the tentative splitgap. The width of this tentative splitgap, matrix GAPMAT(LINK2(Splitindex)), is stored in matrix BIGGAPS.

Time: The additional time expended in this step is no more than N/8.

After the tentative splitgap is found, using the filtered matrix LINK2 values, FFC finds the longest contiguous string of gaps which contains the splitgap and marks these events as tentatively fuzzy. More particularly, a scratch file is created in memory from 1 to N, and this scratch file is cleared as appropriate. Then write an "X" in each of the memory addresses given by matrix LINK2($k=$(⅞)N to $N-1$, filtered). These addresses correspond to the partially-ordered ⅛ largest bin in matrix GAPMAT, after filtering.

Time: The estimated time expended is no more than N/8 Write operations.

It should be noted that matrix LINK2(Splitindex), the splitgap, is among those addresses so marked, unless a NOGAP was determined above. Beginning at address matrix LINK2(Splitindex) in memory, search successive memory locations in this scratch file for the first unmarked memory position, i.e., a memory position with no "X". Designate this location FUZZUPPER. Also, search decreasing memory locations for the first unmarked position; add 1 to this location and call it FUZZLOWER. These two positions mark the ends of the longest contiguous string of gaps from LINK2($k=$(⅞)N to $N-1$, filtered), which contains the tentative splitgap, matrix LINK2(Splitindex). Store FUZZUPPER and FUZZLOWER in matrix FUZZINDEX.

Time: The estimated time expended is obtained by multiplying N/8 by the sum of a Read operation and a Write operation. Thus, the additional time expended is no more than N/8 * 2 = N/4.

It is should be clear that matrix LINK1($k=$FUZZLOWER to FUZZUPPER) are the EVENT indexes which may be marked as fuzzy in step 6.

Referring now to the first pass of FFC in the 12-point example, recall that F1 is the Splitfeat, the Splitindex is 11 and corresponds to the sixth gap in the F1 spectrum. Minimaxbig and Minimaxlittle were both 25%. In matrix LINK2, the partially-ordered ¼ largest bin contains values 7,11, and 6. Mark these locations in memory as follows:

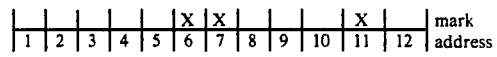

Then, starting at 6 in this scratch file, location 7 is found marked, but location 8 is not marked, so FUZZUPPER = 8. Starting at 6, but going backwards in memory, location 5 is immediately found as being unmarked, so 1 is added and FUZZLOWER is set to 6. It should be observed that the range matrix LINK1(FUZZLOWER to is set to 6. It should be observed that the range matrix LINK1(FUZZFLOWER to FUZZUPPER) = matrix LINK1($k=6,7,8$) has values 5, 3, and 10. These are the matrix MAT indexes of events with F1 feature values −6, 5, and 13; the events in the longest contiguous string of F1 large gaps which include the splitgap. (See FIG. 5A).

Unfortunately, the 12 point example poorly illustrates these fuzzy operations. A data space containing many more points is needed before this measure usefully locates fuzzy outliers. Thus, this reference to the 12-point example only serves to illustrate the temporary scratch file used to determine FUZZUPPER and FUZZLOWER.

Total Time: The maximum time expended in this step is (16/8)N = 2N.

| STEP 6: Pick the Split Gap | |
|---|---|
| Data In: | Matrices BIGGAPS, SPLITINDEX, and FUZZINDEX (and LOGVOL) |
| Data Out: | Matrix EVENTS column for fuzz measure<br>Matrix HISTORY for recording split parameters returned |
| Parameters: | None or possibly the scaling values from step1 |
| Returned: | Splitfeat, Splitclus, Splitindex, Splitval, and also SLC = sibling left count |

The substantially largest value in matrix BIGGAPS is selected. Then the associated feature, i.e., the column in matrix BIGGAPS, is called Splitfeat. The associated cluster in later FFC passes, i.e., the row in BIGGAPS, is called Splitclus. In accordance with the present invention, ties in matrix BIGGAPS are resolved in favor of the cluster with the biggest volume.

The value in the corresponding location in matrix SPLITINDEX(Splitclus, Splitfeat) is referred to as Splitindex. Next, the Splitval, the value corresponding to this split-index, is calculated=matrix MAT(LINK1-(LINK2(Splitindex,Splitfeat))), where the Splitfeat is the implied second index for the LINK1 and MAT matrices. Time: The time expended in this step is negligible After the Splitfeat and Splitindex corresponding to the Splitgap have been found, use the values FUZZUPPER and FUZZLOWER in the table FUZZINDEX to mark appropriate rows of matrix EVENTS with a fuzz measure.

The sibling cluster counts can be calculated in step 6 for each pass. On the first pass, SLC=matrix LINK2(-Splitindex) and SRC=N-SLC. On subsequent passes, SLC and SRC are functions of matrix LINK2(Splitindex), the number of events in the parent cluster, and the beginning row for this cluster in matrix EVENTS.

| STEP 7: Build MAP | |
|---|---|
| Data In: | Matrix MAT |
| Data Out: | Matrices EVENTS and MAP |
| Parameters: | Splitfeat and Splitval (and Splitclus and SLC) |

Compare the matrix MAT values of the Splitfeat feature to the Splitval. During pass one of FFC, mark the corresponding row in matrix EVENTS with a "1" less than, and a "2" if greater, than Splitval. In later passes, mark matrix EVENTS with the current cluster number, i.e., Splitclus, or the new cluster number.

```
Code: DO FOR R = 1 TO N;
         IF MAT(R,Splitfeat) > Splitval
           THEN EVENTS(R) = 2;   (or new cluster)
           ELSE EVENTS(R) = 1;   (or current cluster)
      ENDDO;
```

Time: The estimated time thus far in this step corresponds to a Read operation, an If, and Write operation. Thus, 3N is expended.

After the two sibling clusters have been recorded in matrix EVENTS, this membership information is used to calculate the permutation matrix MAP. Begin with counters COUNT1 and COUNT2 both set to 1.

```
Code: COUNT1 = COUNT2 = 1;
      DO FOR R = 1 TO N;
```

```
         IF EVENTS(R) = 2 THEN
           DO;
             MAP(R) = COUNT2 + SLC;
             COUNT2 = COUNT2 + 1;
           ENDDO;
         ELSE
           DO;
             MAP(R) = COUNT1;
             COUNT1 = COUNT1 + 1;
           ENDDO;
      ENDDO;
```

Time: The additional estimated time is 4N, corresponding to a Read operation, an If, and two Write operations.

Total Time: Thus, the total expended in this step is no more than 7N=3N+4N.

It should be evident to those skilled in the art that both pseudocodes in this step may be combined into one loop. They have been separated in this illustration for clarity purposes.

| STEP 8: MAP Data | |
|---|---|
| Data In: | Matrices MAP, MAT, LINK1, and EVENTS |
| Data Out: | Matrices MAPMAT, MAPLINK1, and EVENTS (MAPEVENTS) |
| Parameters: | SLC - sibling left count |

Use matrix MAP to permute the rows in matrix MAT to matrix MAPMAT, the rows in matrix EVENTS to matrix MAPEVENTS, and the values in LINK1 to MAPLINK1. Do this in parallel for each feature.

```
Code: DO FOR C = 1 TO M;    (parallel by feature)
        DO FOR R = 1 TO N;
          MAPMAT(MAP(R),C) = MAT(R,C);
          MAPLINK1(R,C) = MAP(LINK1(R,C));
        ENDDO;
      ENDDO;
```

Time: The estimated execution time is no more than 6N, derived from 4 Read operations and 2 Write operation, on M processors.

```
Code: DO FOR R = 1 TO SLC;     (use integrating processor)
        EVENTS(R) = 1;    (or MAPEVENTS(R) = 1;)
      ENDDO;
      DO FOR R = SLC + 1 TO N;
        EVENTS(R) = 2;    (or MAPEVENTS(R) = 2;)
      ENDDO;
```

Time: The estimated time is N Write operations.

Total Time: The total time for this step is obtained from the maximum (6N,N)=6N because of parallelism.

It should be clear to those skilled in the art that the integrating processor can execute this last code in parallel with the M processors executing the previous code. Also, matrix MAPEVENTS is unnecessary, since matrix EVENTS can be overwritten.

| STEP 9: Unmerge | |
|---|---|
| Data In: | Matrix MAPLINK1 |
| Data Out: | Matrix UNMERGEMAPLINK1 |
| Parameters: | SLC (sibling left count) |

Unmerge the right and left sibling cluster's new matrix LINK1 orders from their combined orders in matrix MAPLINK1. It should be noted that the Splitfeat order is already unmerged and this operation is redundant. The non-Splitfeat features, however, must be unmerged. COUNT1 and COUNT2 are initially 1.

```
Code: COUNT1 = COUNT2 = 1;
    DO FOR C = 1 TO M;    (parallel by feature)
        DO FOR R = 1 TO N;
            IF MAPLINK1(R,C) > SLC THEN
            DO;
                UNMERGEMAPLINK1(COUNT2 + SLC,C) =
                MAPLINK1(R,C);
                COUNT2 = COUNT2 + 1;
            ENDDO;
            ELSE
            DO;
                UNMERGEMAPLINK1(COUNT1,C) =
                MAPLINK1(R,C);
                COUNT1 = COUNT1 + 1;
            ENDDO;
        ENDDO;
    ENDDO;
```

Time: The estimated time is 4N, obtained from 1 Read operation, 1 If, and 2 Write operations.

If this code is combined with the first code from step 8, not only is time reduced, but also the need for matrix MAPLINK1 is eliminated. Thus, the total time expended during the execution of these combined DO LOOPs is no more than 9N.

| STEP 10: Rename and Loop | |
|---|---|
| Data In: | Matrices MAPMAT and UNMERGEMAPLINK1 (MAPEVENTS) |
| Data Out: | Matrices MAT and LINK1 |
| Parameters: | None |

Rename matrix MAPMAT to matrix MAT and matrix UNMERGEMAPLINK1 to matrix LINK1, and, if necessary, matrix MAPEVENTS to matrix EVENTS.

Time: Negligible

It should be noted that matrices MAT and LINK1 are ready for the next pass of FFC, which begins at step 3, bypassing steps 1 and 2.

Thus, to sum up the execution times in this 10-step embodiment of the present invention:

| Time | Function |
|---|---|
| STEP 1: 4N | Scaling |
| STEP 2: 12NlogN | Order |
| STEP 3: 6N | Gaps |
| STEP 4: 9N | Partial Order |
| STEP 5: 2N | Minimax: Find Tentative Splitgaps |
| STEP 6: 0 | Select Splitgap |
| STEP 7: 7N | Build MAP |
| STEP 8: 6N | Map Data |
| STEP 9: 4N | Unmerge |
| STEP 10: 0 | Rename and Loop to STEP 3 |

The sum of all these times is $12N\log N + 38N$. This is the number of clock ticks needed for the first pass of FFC using $M+1$ processors. This formula is naturally a function of N, the number of events. It is important to note, however, that this time estimate is not a function of M, the number of features.

The second and subsequent passes of FFC do NOT execute steps 1 or step 2, with the loop beginning at step 3. This is possible since the Unmerge step produces the new sibling cluster's matrix LINK1 orders. The sum of the times for steps 3 through 10 is 34N. This is linear in N, and much faster than the first pass which had to perform the first order.

Suppose that FFC is seeking CLUSMAX number of clusters, if they can be found. Consider the following over-simplified analysis of the time required to form CLUSMAX clusters. Let all clusters split exactly at the median with N regarded as a large power of two. Following the first pass of FFC there are two clusters each having N/2 events. Let one of these clusters split on pass two and the other split on pass three. The times required for the second and third passes of FFC are 34N/2 and 34N/2, hence the total time is 34N.

After pass three, there are four clusters each having N/4 events. Suppose these clusters split during passes 5 through 8. The times for these four passes are $34N/4 + 34N/4 + 34N/4 + 34N/4 = 34N$. Thus, for the same amount of time in passes 2 and 3, FFC produces twice as many clusters during passes 5 through 8.

It follows inductively, that the total time to produce CLUSMAX clusters depends upon log CLUSMAX, since each successive 34N clock ticks almost doubles the number of clusters. This follows because the number of events in each cluster is decreasing exponentially by a factor of 2, i.e., each cluster is split exactly in half.

Thus, the time required for CLUSMAX passes of FFC is the sum $12N\log N + 38N + (34N \log \text{CLUSMAX})$ which is much less than the sum $12N\log N + (38N \log \text{CLUSMAX})$. It should be apparent to those skilled in the art that this time estimate is a significant improvement over the prior art. Moreover, this time estimate is independent of M, the number of features.

It should be clearly understood that this pseudocode merely illustrates logic that may be used to implement the present invention, and does not limit the concept nor implementations thereof.

Illustrative 400-Point Application of FFC

As an illustration of the effectiveness and operation of the clustering means and method taught by the present invention, the application of FFC to a 400-point data space will be described in detail. The Statistical Analysis System (SAS), published by The SAS Institute, was used to construct this example and SAS/GRAPH was used to produce the graphs in FIGS. 11 through 25. This data space consists of 400 points lying in three dimensional Euclidean space. Each point is defined by an (x,y,z) triplet of coordinates. This data was recorded in RAWDATA, a 400×3 matrix. The 400 data points were distributed among 8 clusters, each cluster containing 50 points. The 8 cluster centers (centers of gravity) were chosen as the corners of a 6×6×6 cube. Around each corner thereof 50 points were randomly distributed using $N(0,1)*N(0,1)*N(0,1)$ for a spherical scatter. In this context, $N(0,1)$ denotes a normal distribution with mean=0 and standard deviation=1.

This artificial data space was constructed to exhibit the typical behavior of FFC. As clearly seen in FIG. 11 through FIG. 25 (Pass 1 Cluster 1–Pass 8 Cluster 8), FFC successfully clustered this data space, i.e., FFC found the eight constructed clusters, even though these clusters were minimally separated. It is an important aspect and advantage of the present invention that FFC has no a priori knowledge about how these clusters were constructed. FFC has no information about the size, shape, or location of these clusters. Indeed, the only data available to FFC is contained in matrix RAWDATA.

The data in RAWDATA was linearly scaled in each dimension to give a range from −32000 to +32000 (See FIG. 11 Projections (Pass 1 Cluster 1)). This scaled data is stored in matrix MAT, the hereinbefore described input to FFC. In the 3-D scatter graphs depicted in FIG. 11 Scatter, each data point is denoted with a unique symbol representing the cluster to which it belongs (triangles, circles, squares, crosses, hearts, spades, clubs, and stars). Again, these clusters are unknown to FFC. The object for FFC is to separate the data points into homogeneous classes of nearby points, using only the positions of the data points in the data space, but not their symbols. This omniscient symbol information can be used a posteriori to judge the results of FFC.

As should be evident to those skilled in the art, there should be 8 final clusters consisting of about 50 points each. The performance of the present invention can be measured as the homogeneity of the data point symbols representing each final cluster produced. Perfect clustering indicative of exactly matching or recovering the eight constructed clusters, i.e. unmixing the 400 data points into the 8 original clusters, is demonstrated by each cluster's scatter graph containing 50 identical symbols. This result is shown by the 8 final clusters in FIG. 16 (Pass 4 Cluster 3), FIG. 17 (Pass 4 Cluster 4), FIG. 20 (Pass 6 Cluster 2), FIG. 21 (Pass 6 Cluster 6), FIG. 22 (Pass 7 Cluster 5), FIG. 23 (Pass 7 Cluster 7), FIG. 24 (Pass 8 Cluster 1), and FIG. 25 (Pass 8 Cluster 8).

The input data contained in matrix MAT and portrayed in the scatter graph FIG. 11, could be generated as 400 signals or pulse trains having various shapes on an oscilloscope. Second, third, and fourth degree Chebyshev polynomials (with exponential dampening) can be combined in an X,Y,Z proportion to create these signals or waves (see FIG. 11 Waves (Pass 1 Cluster 1)). The 400 XYZ proportions are equal to the rows in matrix MAT. Since these Chebyshev polynomials are orthogonal, this process of using matrix MAT to build waveforms is invertable: the waves can be filtered to recover the XYZ coordinates in matrix MAT. Hence, the input to FFC could begin as a set of signals shown in the graph of all 400 waves superimposed. Both the 3-D scatters and the waveforms are simply different ways to graph the same matrix MAT data.

Instead of using the information in the scatter and waveform graphs, FFC operates on individual columns of matrix MAT, thereby reducing the three dimensional input to three one dimensional inputs. This approach alleviates the constraints associated with distance metrics. The projections of the data points onto the X, Y, and Z axes are the graphs of the individual variables. The spectrums used in FFC are simply these graphs of the columns in matrix MAT. The X feature spectrum is below, the Y feature spectrum is in the middle, and the Z feature spectrum is above. (see FIG. 11 Projections (Pass 1 Cluster 1)). As should be clear to those skilled in the art, these projection graphs contain less information than the scatter or wave graphs, since there is no way to associate points in the X spectrum with points in the Y or Z spectrum, without the complete matrix MAT. Only if the matrix MAT index for each point was written below the marks on all three projection graphs, would it be possible to recover matrix MAT from these three graphs.

Viewed from a distance or by squinting, it may be observed that each projection graph has two dark regions separated by a lighter region in between. Human visual judgement or the fluctuations of a scanning light meter, can be used to measure the contrast between these light and dark regions.

The definite contrast of light versus dark regions means that the three minimax parameters can be set as low as 4.0%=1/25. It should be clear that minimax parameters were used to segregate matrix LINK2 values and these segregated values were then used to find the left and right modes, the largest gap between these modes, and to mark the fuzz. Since each spectrum seems to have only two dark regions, the minimum number of clusters which FFC should seek can be set from two up to eight. Since minimax=1/25, each cluster must have a minimum of 50 data points for FFC to find right and left modes. Therefore, the maximum number of clusters is 400/50, or about 8.

The first pass of FFC finds three tentative splitgaps (which are stored in matrix BIGGAPS) from each spectrum located near their middles (see FIG. 11 Projections (Pass 1 Cluster 1)), i.e., near zero between the two dark areas. The right and left modes in each spectrum are marked with carets (" ") and the tentative splitgaps (biggaps) are denoted with horizontal lines. The biggap from the Y spectrum is clearly longer than the biggap from the Z spectrum which is slightly longer than the biggap from the X spectrum. Thus, the Y biggap is selected as the splitgap and FFC partitions Cluster 1 (see FIG. 11 (Pass 1 Cluster 1: the whole data space)) at the split-value=−2551 in the Y spectrum. This results in the formation of two new clusters shown in FIG. 12 (Pass 2 Cluster 1) and FIG. 13 (Pass 2 Cluster 2).

The second pass of FFC examines six spectrums and locates six tentative splitgaps. Four large biggaps and two small biggaps are marked on graphs FIG. 12 (Pass 2 Cluster 1) and FIG. 13 (Pass 2 Cluster 2). The biggap from the Z spectrum in graph FIG. 12 (Pass 2 Cluster 1) is the largest of the six, and therefore this biggap is picked at the splitgap. Cluster 1 in FIG. 12 (Pass 2 Cluster 1) is split at the split-value=−3703 in the Z spectrum, resulting in the formation of two new clusters shown in FIG. 14 (Pass 3 Cluster 1) and FIG. 15 (Pass 3 Cluster 3).

The third pass of FFC searches for six new tentative splitgaps in the new clusters shown in FIG. 14 (Pass 3 Cluster 1) and FIG. 15 (Pass 3 Cluster 3) created in pass two. Since each of these clusters contain 100 data points, FFC searches the bottom 4 rows in LINK2 (4=4% of 100) for medial large gaps. Referring to FIG. 14 Projections (Pass 3 Cluster 1), it is seen that the largest medial gaps, i.e., the gaps disposed between the carets, are marked with horizontal lines. It is also seen that the Y and the Z spectrums each contain at least four gaps which are longer than the longest medial gap which is marked. Thus, the medial gaps marked in the Y and Z spectrums are not among the bottom four rows in matrix LINK2 order, i.e., there exist at least four longer gaps in each spectrum which are not between the carets. Accordingly, the Y and Z spectrums in cluster FIG. 14 (Pass 3 Cluster 1) cannot be split and are marked with an asterisk to indicate NOGAP. The X spectrum in Cluster 1 in FIG. 14 (Pass 3 Cluster 1) contains a tentative splitgap since the longest medial gap is among the bottom four rows in matrix LINK2 order. Similarly, Cluster 3 in FIG. 15 (Pass 3 Cluster 3) has no splitgap in the Y spectrum and this spectrum is marked with an asterisk. However, both the X and Z spectrums contain tentative splitgaps. These three new tentative splitgaps one from Cluster 1 in FIG. 14 (Pass 3 Cluster 1) and two from Cluster 3 in FIG. 15 (Pass 3 Cluster 3) and the three previously found tentative splitgaps from Cluster 2 in FIG. 13 (Pass 2 Cluster 2), are the six candidates for splitgaps. The biggap in the X spectrum from Cluster 3 in FIG. 15 (Pass 3 Cluster 3) is the largest of these six tentative splitgaps. Therefore, FFC separates Cluster 3 in FIG. 15 (Pass 3 Cluster 3) at split-value = −4775 in the X spectrum resulting in two new clusters depicted in FIG. 16 (Pass 4 Cluster 3) and FIG. 17 (Pass 4 Cluster 4).

The fourth pass of FFC searches for six new tentative splitgaps in the new clusters shown in FIG. 16 (Pass 4 Cluster 3) and FIG. 17 (Pass 4 Cluster 4) created in pass three. Since each of these clusters contain 50 data points, FFC searches the bottom 2 rows in LINK2 (2=4% of 50) for medial large gaps. Referring to FIG. 16 Projections (Pass 4 Cluster 3), it is seen that the largest medial gaps, i.e., between the carets, are marked with horizontal lines. It is also seen that each of these spectrums contains at least two gaps which are longer than the longest medial gap which is marked. Thus, the medial gaps marked are not among the bottom two rows in matrix LINK2 order, i.e., there exist at least two longer gaps in each spectrum, which are not between the carets. Accordingly, all three spectrums in Cluster 3 in FIG. 16 (Pass 4 Cluster 3) cannot be further split and they are marked with an asterisk. In addition, Cluster 3 is marked with an asterisk in FIG. 10 to indicate a final cluster. Similarly, Cluster 4 in FIG. 17 (Pass 4 Cluster 4) has no tentative splitgaps and therefore is a final cluster. Thus, the four previously found tentative splitgaps, three from Cluster 2 in FIG. 13 (Pass 2 Cluster 2) and one from Cluster 1 in FIG. 14 (Pass 3 Cluster 1) are the only candidates for splitgaps. The biggap in the X spectrum from Cluster 2 in FIG. 13 (Pass 2 Cluster 2) is the largest tentative splitgap. Therefore, FFC separates Cluster 2 in FIG. 13 (Pass 2 Cluster 2) at split-value = −3098 in the X spectrum, resulting in the formation of two new clusters depicted in FIG. 18 (Pass 5 Cluster 2) and FIG. 19 (Pass 5 Cluster 5).

The fifth pass of FFC searches for six new tentative splitgaps in the new Clusters 2 and 5 in FIG. 18 (Pass 5 Cluster 2) and FIG. 19 (Pass 5 Cluster 5) created in pass four. Since each of these clusters contains 100 data points, FFC searches the bottom 4 rows in matrix LINK2 (4=4% of 100) for medial large gaps. Referring to FIG. 18 Projections (Pass 5 Cluster 2), it is seen that the largest medial gaps (i.e., between the carets) are marked with horizontal lines. It is also seen that the X and Y spectrums contain at least four gaps which are longer than the longest medial gap which is marked. Thus, the medial gaps marked are not among the bottom four rows in matrix LINK2 order, i.e., there exist at least four longer gaps in these two spectrums, which are not between the carets. Accordingly, these two spectrums in Cluster 2 in FIG. 18 (Pass 5 Cluster 2) cannot be further split and they are marked with an asterisk. However, the Z spectrum in Cluster 2 in FIG. 18 (Pass 5 Cluster 2) contains a tentative splitgap. Similarly, Cluster 5 in FIG. 19 (Pass 5 Cluster 5) has a single tentative splitgap in the Z spectrum. These two new tentative splitgaps, one from Cluster 2 in FIG. 18 (Pass 5 Cluster 2) and one from Cluster 5 in FIG. 19 (Pass 5 Cluster 5) along with one previous tentative splitgap from Cluster 1 in FIG. 14 (Pass 3 Cluster 1), comprise three candidates for splitgaps. The biggap in the Z spectrum from Cluster 2 in FIG. 18 (Pass 5 Cluster 2) is the largest of these three tentative splitgaps. Therefore, FFC separates Cluster 2 in FIG. 18 (Pass 5 Cluster 2) at split-value= −420 in the Z spectrum, resulting in the formation of two new clusters shown in FIG. 20 (Pass 6 Cluster 2) and FIG. 21 (Pass 6 Cluster 6).

The sixth pass of FFC searches for six new tentative splitgaps in the new clusters shown in FIG. 20 (Pass 6 Cluster 2) and FIG. 21 (Pass 6 Cluster 6) created in pass five. Since each of these clusters contain 50 data points, FFC searches the bottom 2 rows in matrix LINK2 (2=4% of 50) for medial large gaps. Referring to FIG. 20 Projections (Pass 6 Cluster 2), it is seen that the largest medial gaps, i.e., between the carets, are marked with horizontal lines. It is also seen that each of these spectrums contain at least two gaps which are longer than the longest medial gap which is marked. Thus the medial gaps marked are not among the bottom two rows in LINK2 order, i.e., there exist at least two longer gaps in each spectrum, which are not between the carets. Accordingly, all three spectrums in Cluster 2 in FIG. 20 (Pass 6 Cluster 2) cannot be further split and they are marked with an asterisk. In addition, Cluster 2 is marked with an asterisk in FIG. 10 to indicate a final cluster. Similarly, Cluster 6 in FIG. 21 (Pass 6 Cluster 6) has no tentative splitgaps and therefore is a final cluster. Thus, the two previously found tentative splitgaps (one from Cluster 1 in FIG. 14 (Pass 3 Cluster 1) and one from Cluster 5 in FIG. 19 (Pass 5 Cluster 5)) are the only candidates for splitgaps. The biggap in the Z spectrum from Cluster 5 in FIG. 19 (Pass 5 Cluster 5) is the largest tentative splitgap. Therefore, FFC separates Cluster 5 in FIG. 19 (Pass 5 Cluster 5) at split-value= −4319 in the Z spectrum, resulting in the formation of two new clusters shown in FIG. 22 (Pass 7 Cluster 5) and FIG. 23 (Pass 7 Cluster 7).

The seventh pass of FFC searches for six new tentative splitgaps in the new clusters shown in FIG. 22 (Pass 7 Cluster 5) and FIG. 23 (Pass 7 Cluster 7) created in pass six. Since each of these clusters contain 50 data points, FFC searches the bottom 2 rows in matrix LINK2 (2=4% of 50) for medial large gaps. Referring to FIG. 22 Projections (Pass 7 Cluster 5), it is seen that the largest medial gaps, i.e., between the carets, are marked with horizontal lines. It is also seen that each of these spectrums contain at least two gaps which are longer than the longest medial gap which is marked. Thus, the medial gaps marked are not among the bottom two rows in matrix LINK2 order, i.e., there exist at least two longer gaps in each spectrum, which are not between the carets. Accordingly, all three spectrums in Cluster 5 in FIG. 22 (Pass 7 Cluster 5) cannot be further split and they are marked with an asterisk. In addition, Cluster 5 is marked with an asterisk in FIG. 10 to indicate a final cluster. Similarly, Cluster 7 in FIG. 23 (Pass 7 Cluster 7) has no tentative splitgaps and therefore is a final cluster. Thus, the one previously found tentative splitgap from Cluster 1 in FIG. 14 (Pass 3 Cluster 1), is the only candidate for splitgap. The biggap in the X spectrum from Cluster 1 in FIG. 14 (Pass 3 Cluster 1) is the largest tentative splitgap (it is the only candidate). Therefore, FFC separates Cluster 1 in FIG. 14 (Pass 3 Cluster 1) at split-value= −1933 in the X spectrum, resulting in the formation of two new clusters shown in FIG. 24 (Pass 8 Cluster 1) and FIG. 25 (Pass 8 Cluster 8).

The eighth pass of FFC searches for six new tentative splitgaps in the new clusters shown in FIG. 24 (Pass 8

Cluster 1) and FIG. 25 (Pass 8 Cluster 8) created in pass seven. Since each of these clusters contain 50 data points, FFC searches the bottom 2 rows in matrix LINK2 (2=4% of 50) for medial large gaps. Referring to FIG. 24 Projections (Pass 8 Cluster 1), it is also seen that the largest medial gaps (i.e., between the carets) are marked with horizontal lines. It is also seen that each of these spectrums contain at least two gaps which are longer than the longest medial gap which is marked. Thus, the medial gaps marked are not among the bottom two rows in matrix LINK2 order, i.e., there exist at least two longer gaps in each spectrum which are not between the carets. Thus, all three spectrums in Cluster 1 in FIG. 24 (Pass 8 Cluster 1) cannot be further split and they are marked with an asterisk. In addition, Cluster 1 is marked with an asterisk in FIG. 10 to indicate a final cluster. Similarly, Cluster 8 in FIG. 25 (Pass 8 Cluster 8) has no tentative splitgaps and therefore is a final cluster. Thus there are no candidates for splitgaps and FFC halts.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the scope of the appended claims herein.

What is claimed is:

1. A parallel processing computer system for clustering N data points in real numerical M-dimensional feature space by adaptively separating classes of patterns, said computer system comprising:
   a plurality of processors;
   means for decomposing said M-dimensional feature space into M 1-dimensional feature spaces, with each said 1-dimensional feature space having a range of feature values;
   means for numerically ordering each said feature value in each of said 1-dimensional feature spaces in ascending sort sequence;
   means for calculating the gap lengths for said ordered feature values;
   means for partially-ordering said gap lengths within each of said 1-dimensional feature spaces;
   means for selecting a plurality of tentative split-gaps from said partially-ordered gap lengths, and means for further selecting a split-gap from said plurality of tentative split-gaps;
   means for splitting a portion of said N data points corresponding to said split-gap on its associated feature; and
   means for iteratively repeating said calculating, partially-ordering, selecting and splitting until said classes of patterns are separated.

2. The system recited in claim 1 wherein said means for decomposing comprises:
   means for linearly scaling said range of feature values in each said one-dimensional feature space between the range of integers expressible on said computer system, and then assigning one of said integers to each said feature value in each said feature space.

3. The system recited in claim 2 wherein said means for calculating comprises:
   means for subtracting each said ordered feature value from its successive feature value, to obtain a sequence of N−1 said gap lengths for each said M 1-dimensional feature space.

4. The system recited in claim 3 wherein said means for partially-ordering comprises:
   means for segregating M first portions from M sequences of gap lengths, each of said M first portions consisting of all of the smallest of said gap lengths from one of said M sequences of gap lengths, and means for further segregating M second portions from said M sequences of gap lengths, each of said M second portions consisting of all of the largest of said gap lengths from said one of said M sequences of gap lengths.

5. The system recited in claim 4 wherein said means for selecting comprises:
   means for searching said first portion of an smallest of said gap lengths as a Gestalt for the extreme left mode and the extreme right mode thereof; and
   means for searching said second portion of the largest of said gap lengths sequentially from the largest to the smallest thereof, until a gap length corresponding to a tentative said split-gap is obtained which is disposed medially of said extreme left mode and said extreme right mode.

6. The system recited in claim 1 wherein said plurality of processors has a minimum of one processor assigned to each said 1-dimensional feature space.

7. The system recited in claim 1 wherein said plurality of processors includes an integrating processor.

8. A parallel processing computer system for clustering N data points in real numerical M-dimensional feature space corresponding to a plurality of M features by adaptively separating classes of patterns, with M and N being positive integer values, said computer system comprising:
   a plurality of processors;
   means for decomposing said M-dimensional feature space into a plurality of M one-dimensional feature spaces, with each said one-dimensional feature space having a range of feature values for each of said plurality of M features, each of said one-dimensional feature spaces comprising all of the values of a single feature of said N data points;
   said means for decomposing comprising means for linearly scaling said range of feature values in each said one-dimensional feature space between the range of integers expressible on said parallel processing computer system, and then assigning one of said integers to each said feature value in each said feature space;
   means for numerically ordering each said feature value in each of said one-dimensional feature spaces in ascending sort sequence;
   means for calculating gap lengths for said ordered feature values comprising means for subtracting each said ordered feature value from its successive feature value, to obtain a sequence of N−1 said gap lengths for each said M one-dimensional feature space;
   means for partially-ordering said gap lengths within each of said one-dimensional feature spaces comprising means for segregating M first portions from M sequences of gap lengths, each of said M first portions consisting of all of the smallest of said gap lengths from one of said M sequences of gap lengths, and means for further segregating M second portions from said M sequences of gap lengths, each of said M second portions consisting of all of the largest of said gap lengths from said one of said M sequences of gap lengths;

means for selecting a plurality of tentative split-gaps from said partially-ordered gap lengths, with each said selected tentative split-gap selected for each said one-dimensional feature space, comprising means for searching for an extreme left mode and the extreme right mode among all of said gaps lengths within each of said M first portions of the smallest of said gap lengths, and means for searching said M second portions of the largest of said gap lengths sequentially from the largest to the smallest thereof, until a gap length representing a said tentative split-gap is obtained which is disposed medially of said extreme left mode and said extreme right mode;

means for choosing a split-gap from said plurality of tentative split-gaps comprising means for picking a split-gap corresponding to the largest of an aggregation of said plurality of tentative split-gaps obtained by said iterative repetitions of said means for partially-ordering and of said means for selecting;

means for splitting a portion of said N data points corresponding to said split-gap on its associated feature; and means for iteratively repeating said calculating, partially-ordering, selecting, choosing and splitting until said classes of patterns are separated.

9. A parallel processing computer system for clustering N data points in real numerical M-dimensional feature space by adaptively separating classes of patterns, said computer system comprising:

a plurality of processors;

means for decomposing said M-dimensional feature space into M 1-dimensional feature spaces, with each said 1-dimensional feature space having a range of feature values;

said plurality of processors having a minimum of one processor assigned to each said 1-dimensional feature space;

means for numerically ordering each said feature value in each of said 1-dimensional feature spaces in ascending sort sequence;

means for calculating the gap lengths for said ordered feature values;

means for partially-ordering said gap lengths within each of said 1-dimensional feature spaces;

means for selecting a plurality of tentative split-gaps from said partially-ordered gap lengths, and means for further selecting a split-gap from said plurality of tentative split-gaps;

means for splitting a portion of said N data points corresponding to said split-gap on its associated feature; and means for iteratively repeating said calculating, partially-ordering, selecting and splitting until said classes of patterns are separated.

10. The system recited in claim 9 wherein said means for decomposing comprises:

means for linearly scaling said range of feature values in each said one-dimensional feature space between the range of integers expressible on said computer system, and then assigning one of said integers to each said feature value in each said feature space.

11. The system recited in claim 10 wherein said means for calculating comprises:

means for subtracting each said ordered feature value from its successive feature value, to obtain a sequence of $N-1$ said gap lengths for each said M 1-dimensional feature space.

12. The system recited in claim 11 wherein said means for partially-ordering comprises:

means for segregating M first portions from M sequences of gap lengths, each of said M first portions consisting of all of the smallest of said gap lengths from one of said M sequences of gap lengths, and means for further segregating M second portions from said M sequences of gap lengths, each of said M second portions consisting of all of the largest of said gap lengths from said one of said M sequences of gap lengths.

13. The system recited in claim 12 wherein said means for selecting comprises:

means for searching said first portion of the smallest of said gap lengths as a Gestalt for the extreme left mode and an extreme right mode thereof; and means for searching said second portion of the largest of said gap lengths sequentially from the largest to the smallest thereof, until a gap length corresponding to a tentative said split-gap is obtained which is disposed medially of said extreme left mode and said extreme right mode.

14. The system recited in claim 9 wherein said plurality of processors includes an integrating processor.

* * * * *